United States Patent
Yamaoka et al.

(10) Patent No.: US 10,736,403 B2
(45) Date of Patent: *Aug. 11, 2020

(54) BACK-MOUNTED POWER TOOL SYSTEMS AND METHODS OF USE

(71) Applicant: Chervon (HK) Limited, Wanchai (HK)

(72) Inventors: Toshinari Yamaoka, Nanjing (CN); Fangjie Nie, Nanjing (CN); Jianpeng Guo, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 218 days.

This patent is subject to a terminal disclaimer.

(21) Appl. No.: 15/935,572

(22) Filed: Mar. 26, 2018

(65) Prior Publication Data

US 2018/0206620 A1 Jul. 26, 2018

Related U.S. Application Data

(63) Continuation of application No. 15/098,898, filed on Apr. 14, 2016, now Pat. No. 10,039,367.

(30) Foreign Application Priority Data

May 25, 2015 (CN) .......................... 2015 1 0272506
May 25, 2015 (CN) .......................... 2015 1 0272609
(Continued)

(51) Int. Cl.
*A45F 3/14* (2006.01)
*B25F 5/02* (2006.01)
(Continued)

(52) U.S. Cl.
CPC .................................... *A45F 3/14* (2013.01); *A47L 5/14* (2013.01); *B25F 5/02* (2013.01); *E01H 1/0809* (2013.01); *A45F 2003/146* (2013.01)

(58) Field of Classification Search
CPC ........ A45F 3/14; A45F 2003/146; A47L 5/14; B25F 5/02; E01H 1/0809
(Continued)

(56) References Cited

U.S. PATENT DOCUMENTS 4,325,163 A 4/1982 Mattson et al.
4,723,893 A 2/1988 Kiyooka et al.
(Continued)

FOREIGN PATENT DOCUMENTS

| CN | 100351469 C | 11/2007 |
|---|---|---|
| CN | 1939673 B | 3/2011 |

(Continued)

OTHER PUBLICATIONS

Extended European Search Report and the European Search Opinion issued in European Patent Application No. 16169934.3, dated Jun. 8, 2017 (10 pages).

*Primary Examiner* — Corey N Skurdal
(74) *Attorney, Agent, or Firm* — Finnegan, Henderson, Farabow, Garrett & Dunner, LLP

(57) ABSTRACT

Embodiments of the disclosure are directed to a back-mounted power tool system. The power tool system includes a battery package that can be used on other power tool systems, a backpack apparatus, a power tool, and a connecting member. The backpack apparatus includes a backpack harness to mount the backpack apparatus onto a user's body and a first connector to removably couple the battery package to the backpack apparatus. The power tool includes a motor driven by a power supply from the battery package. The connecting member transfers a weight of the power tool and/or a force received from the power tool to the backpack apparatus by rotatably coupling the power tool to the backpack apparatus. The connecting member further enables the power tool to rotate about a first rotation axis or a second (Continued)

rotation axis, the first rotation axis being perpendicular to the second rotation axis.

29 Claims, 56 Drawing Sheets

(30) Foreign Application Priority Data

| May 29, 2015 | (CN) | .......................... 2015 1 0287347 |
| Sep. 25, 2015 | (CN) | .......................... 2015 1 0621441 |
| Sep. 25, 2015 | (CN) | .......................... 2015 1 0623933 |
| Sep. 25, 2015 | (CN) | .......................... 2015 1 0624884 |
| Feb. 1, 2016 | (CN) | .......................... 2016 1 0070425 |

(51) Int. Cl.
*E01H 1/08* (2006.01)
*A47L 5/14* (2006.01)

(58) Field of Classification Search
USPC ........................................................ 224/257
See application file for complete search history.

(56) References Cited

U.S. PATENT DOCUMENTS

| 5,620,121 | A | 4/1997 | Watson |
| 6,105,206 | A | 8/2000 | Tokumaru et al. |
| 6,928,693 | B1 | 8/2005 | Ericson |
| 7,015,675 | B1 | 3/2006 | Andre |
| 7,600,290 | B1 | 10/2009 | Peters |
| 7,845,048 | B1 | 12/2010 | Bailey et al. |
| 8,032,980 | B2 | 10/2011 | Basenberg, Jr. et al. |
| 8,549,699 | B1 | 10/2013 | Domingo |
| 8,671,516 | B1 | 3/2014 | Mendez |
| 9,192,222 | B2 | 11/2015 | Nashimoto et al. |
| 9,277,844 | B1 | 3/2016 | Millan |
| 9,689,126 | B2 | 6/2017 | Barth et al. |
| 9,907,234 | B2 * | 3/2018 | Poole .................. A47L 5/14 |
| 2011/0198103 | A1 | 8/2011 | Suzuki |
| 2014/0115835 | A1 | 5/2014 | Kolb |
| 2014/0154106 | A1 | 6/2014 | Notaras et al. |
| 2014/0291362 | A1 | 10/2014 | Victor |
| 2015/0113758 | A1 | 4/2015 | Nashimoto et al. |
| 2015/0113760 | A1 | 4/2015 | Fukunaga |
| 2015/0237808 | A1 | 8/2015 | Prager |
| 2016/0107202 | A1 | 4/2016 | Suzuki et al. |
| 2016/0198636 | A1 | 7/2016 | Poole et al. |
| 2016/0208449 | A1 | 7/2016 | Barth et al. |
| 2016/0345714 | A1 | 12/2016 | Yamaoka et al. |
| 2017/0042096 | A1 | 2/2017 | Bylund et al. |

FOREIGN PATENT DOCUMENTS

| CN | 102011371 A | 4/2011 |
| CN | 102011664 A | 4/2011 |
| CN | 102102683 A | 6/2011 |
| CN | 201898179 U | 7/2011 |
| CN | 103154375 A | 6/2013 |
| CN | 101634309 B | 9/2013 |
| CN | 103534413 A | 1/2014 |
| CN | 203412787 U | 1/2014 |
| DE | 201 21 013 U1 | 4/2002 |
| DE | 20 2013 011 447 U1 | 2/2014 |
| EP | 3047944 A1 | 7/2016 |
| WO | WO 2004/072383 A1 | 8/2004 |
| WO | WO 2013/139371 A1 | 9/2013 |
| WO | WO 2014/159608 A1 | 10/2014 |

* cited by examiner

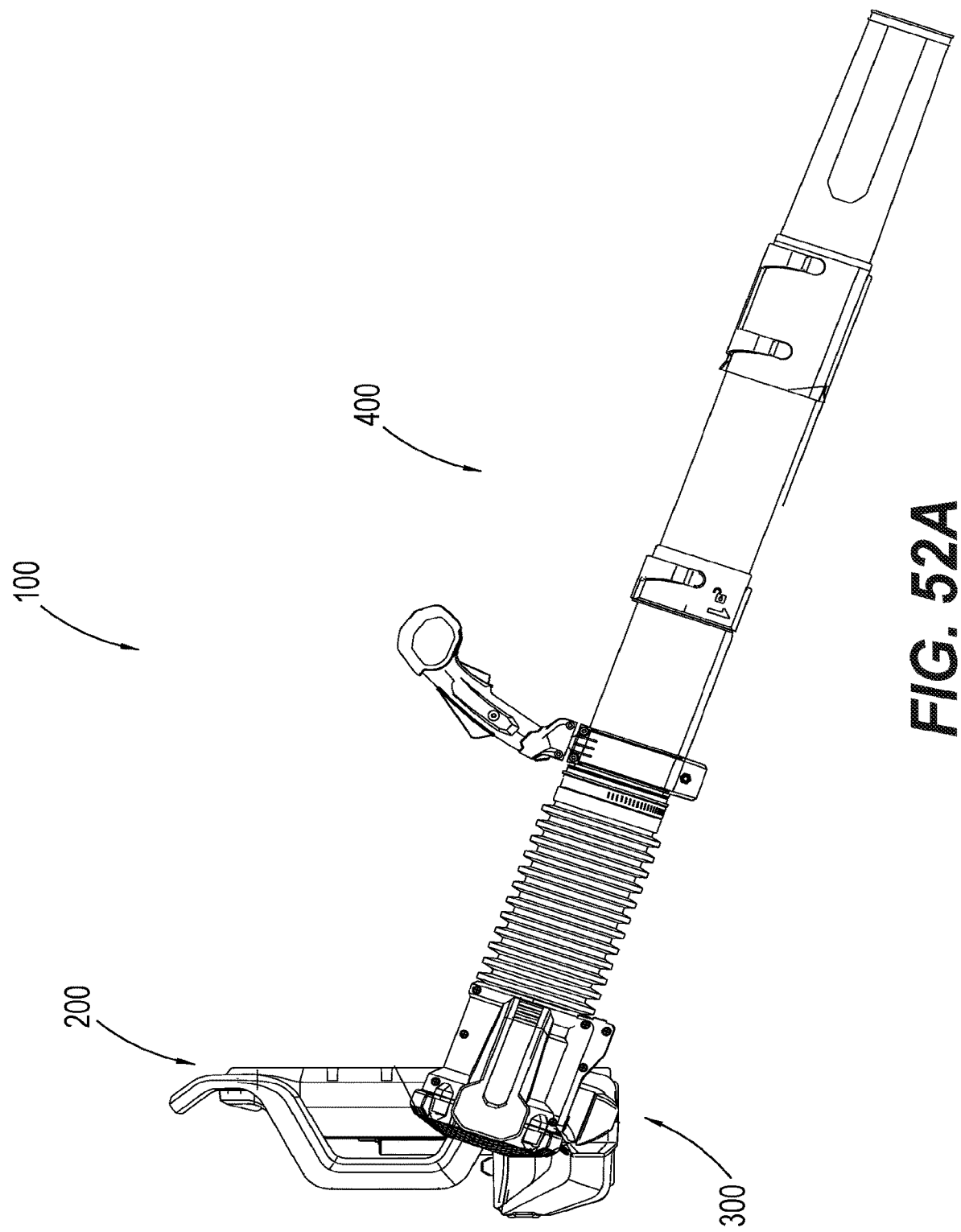

BACK-MOUNTED POWER TOOL SYSTEMS AND METHODS OF USE

CROSS-REFERENCE TO RELATED APPLICATIONS

The present application is a continuation of U.S. patent application Ser. No. 15/098,898, filed Apr. 14, 2016, which is based upon and claims priority to Chinese Patent Application No. 201510272609.9 filed May 25, 2015, Chinese Patent Application No. 201510272506.2 filed May 25, 2015, Chinese Patent Application No. 201510287347.3 filed May 29, 2015, Chinese Patent Application No. 201510623933.0 filed Sep. 25, 2015, Chinese Patent Application No. 201510621441.8 filed Sep. 25, 2015, Chinese Patent Application No. 201510624884.2 filed Sep. 25, 2015, and Chinese Patent Application No. 201610070425.9 filed Feb. 1, 2016. The contents of the above-referenced applications are herein incorporated by reference in their entirety.

TECHNICAL FIELD

The present disclosure relates to power tool systems in general, and more particularly, to back-mounted power tool systems.

BACKGROUND

Power tool systems, such as garden machines, typically include a motor or an engine powered by electricity or fossil fuels. The power tool systems that use fossil fuels typically have a combustion engine that can generate undesirable smells, emissions, noise, and/or vibration. Some power tool systems have the combustion engine designed to be mountable on the back of a user to increase convenience, but the weight of the combustion engine of such power tool systems make the user tire easily over time. Electrical power tool systems have sustainable benefits over power tool systems using fossil fuels by not having to use a combustion engine. For example, power tool systems powered by portable batteries have the advantages of reduced or eliminated smell, noise, and emissions, reduced weight and size, no risk of mixing or spilling fuel, and/or increased safety.

In a battery-powered power tool system, the power supplied to the motor or engine depends on the voltage of the battery. If the voltage of the battery is low, the power supplied to the power tool system may not be enough to operate the power tool, or may result in limited amount of operation time. Increasing the voltage of the battery may increase the power supplied to the motor or the engine, and thus may increase the efficiency and performance of the power tool system. But a trade-off for increased power is increased weight. For example, a target high voltage may be achieved by increasing the number of battery cells connected in sequence. Increasing the number of battery cells may increase the overall weight and size of the battery and/or the power tool system, which may increase inconvenience, fatigue, and amount of work for the user to operate the power tool system, particularly over long periods of time. The increased weight and size of the battery and/or the power tool system may also reduce the flexibility for operating the power tool system, and may render the power tool system not suitable for use over long periods of time.

Additionally, conventional battery-powered tool systems have one or more disadvantages that may affect the applications of these systems. In some situations, the battery of such battery-powered tool system cannot be replaced. In other situations, the battery forms part of the system and cannot be modified to add or reduce battery cells, or the battery is specially made for a particular type of power tools and cannot be used for other power tools. These advantages may limit the life of the system, affect the flexibility and convenience for operating the power tool, and limit the application of the system to particular applications, e.g., one or limited number of specific power tools.

The disclosed power tool systems and methods for using these power tool systems are directed to overcoming one or more of the problems or disadvantages set forth above and/or other problems of existing power tool systems.

SUMMARY

In one aspect, the present disclosure is directed to a back-mounted power tool system. The back-mounted power tool system may include a battery package that can be used on other power tool systems, a backpack apparatus, a power tool, and a connecting member. The backpack apparatus may include a backpack harness to mount the backpack apparatus onto a user's body and a first connector to removably couple the battery package to the backpack apparatus. The power tool may include a motor driven by a power supply from the battery package. The connecting member may transfer a weight of the power tool and/or a force received from the power tool to the backpack apparatus by rotatably coupling the power tool to the backpack apparatus. The connecting member may further enable the power tool to rotate about a first rotation axis or a second rotation axis, the first rotation axis being perpendicular to the second rotation axis.

In another aspect, the present disclosure is directed to a back-mounted power tool system. The back-mounted power tool system may include a battery package that may be used on other power tool systems, a backpack apparatus, a power tool coupled to the backpack apparatus, and a connecting member. The battery package may include a case enclosing one or more battery cells. The backpack apparatus may include a backpack harness to mount the backpack apparatus onto a user's body. The power tool may include a motor, driven by a power supply from the battery package, to operate the power tool. The backpack apparatus may further include a connector to removably couple the battery package to the backpack apparatus. The case of the battery package may further include fitting structures to couple the battery package to the connector. The fitting structures may include one or more fitting slots complementary to one or more fitting members of the connector. A ratio between a weight of the battery package and a total weight of the power tool with or without the battery package may be equal to or greater than 30%.

In another aspect, the present disclosure is directed to a back-mounted power tool system. The back-mounted power tool system may include a battery package to provide a power supply, a backpack apparatus, a power tool, a connecting member. The backpack apparatus may include a backpack harness to mount the backpack apparatus onto a user's body. The backpack apparatus may further include a first connector to couple the battery package to the backpack apparatus. The power tool may include a motor driven by the power supply. The connecting member may transfer a weight of the power tool and/or a force received from the power tool to the backpack apparatus by rotatably coupling the power tool to the backpack apparatus. The connecting member may include a first arm coupled to the power tool and a second arm coupled to the backpack apparatus. The first arm may be rotatably joined with the second arm. The first arm may operate to rotate about a first rotation axis passing through a joint of the first arm and the second arm. The second arm may operate to rotate about a second rotation axis extending through the second arm and perpendicular to the first rotation axis.

The details of one or more variations of the subject matter disclosed herein are set forth below and the accompanying drawings. Other features and advantages of the subject matter disclosed herein will be apparent from the detailed description below and drawings, and from the claims.

Further modifications and alternative embodiments will be apparent to those of ordinary skill in the art in view of the disclosure herein. For example, the systems and the methods may include additional components or steps that are omitted from the diagrams and description for clarity of operation. Accordingly, the detailed description below is to be construed as illustrative only and is for the purpose of teaching those skilled in the art the general manner of carrying out the present disclosure. It is to be understood that the various embodiments disclosed herein are to be taken as exemplary. Elements and materials, and arrangements of those elements and materials, may be substituted for those illustrated and disclosed herein, objects and processes may be reversed, and certain features of the present teachings may be utilized independently, all as would be apparent to one skilled in the art after having the benefit of the disclosure herein.

BRIEF DESCRIPTION OF THE DRAWINGS

The accompanying drawings, which are incorporated in and constitute a part of this specification, illustrate exemplary embodiments of the present disclosure, and together with the description, serve to explain the principles of the disclosure.

FIG. 52A illustrates a side view of an exemplary power tool of the back-mounted power tool system of FIG. 50.

DETAILED DESCRIPTION

Figure 1:
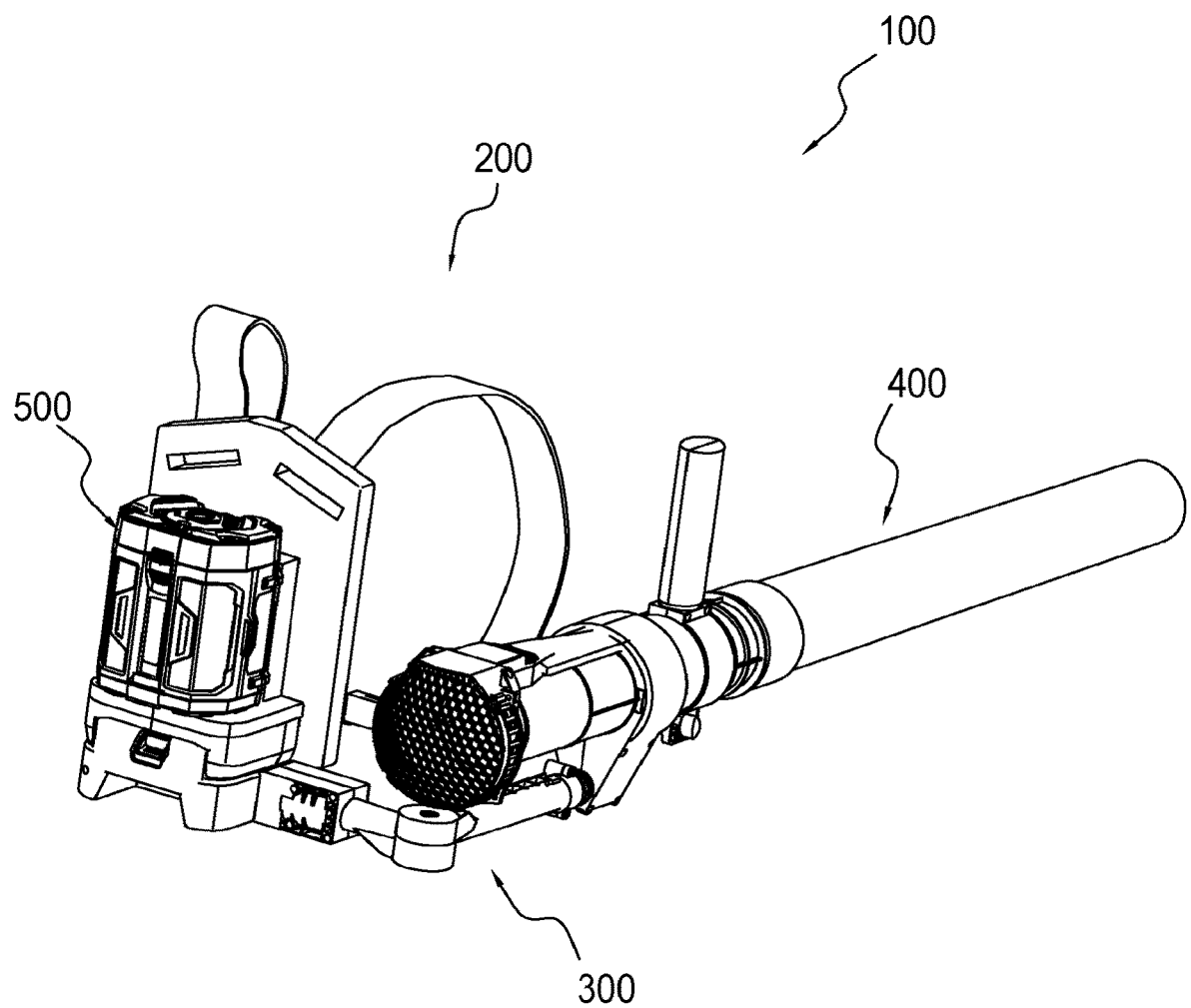
FIG. 1 illustrates a perspective view of an exemplary back-mounted power tool system, according to embodiments of the present disclosure.

This description and the accompanying drawings that illustrate exemplary embodiments should not be taken as limiting. Various mechanical, compositional, structural, chemical, electrical, and operational changes may be made without departing from the scope of this description and the claims, including equivalents. In some instances, well-known structures and techniques have not been shown or described in detail so as not to obscure the disclosure. Similar reference numbers in two or more figures represent the same or similar elements. Furthermore, elements and their associated features that are disclosed in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages, or proportions, and other numerical values used in the specification and claims, are to be understood as being modified in all instances by the term "about," to the extent they are not already so modified. Accordingly, unless indicated to the contrary, the numerical parameters set forth in the following specification and attached claims are approximations that may vary depending upon the desired properties sought to be obtained.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

Those having ordinary skill in the art and access to the teachings provided herein will recognize additional modifications, applications, embodiments, and substitution of equivalents that all fall with the scope of the present disclosure.

As described above, to increase the power and/or voltage supplied by a battery to a power tool system, and/or to increase the amount of electricity or energy stored in a battery so as to increase the duration for operating the power tool system, the number of battery cells, and thus the weight and/or size of the battery may be increased. In some situations, more than one battery with increased weight may be used. For a hand-held or portable power tool that is powered by and combined with one or more batteries, the weight of the batteries may affect the operation of the power tool by the user, for example, by increasing the burden and fatigue of the user's arm when over time. In some situations, the weight of the one or more batteries may be, for example, equal to about 30% to about 150%, of that of the power tool, or greater than that of the power tool by from about 30% to about 150%, and/or may be equal to or greater than 0.5 kg. Thus a back-mounted power tool system that has at least one or more batteries mounted to the shoulders, back, and/or waist of the user may reduce the burden on the user's arm, and thus may reduce fatigue of the user's arm, increase the duration for operating the power tool, and/or increase the flexibility for operating the power tool. Further, the back-mounted power tool system may also allow using batteries of greater weight to increase the power and/or voltage supplied to the power tool, which may increase the effectiveness and/or efficiency of the power tool.

Figure 2:
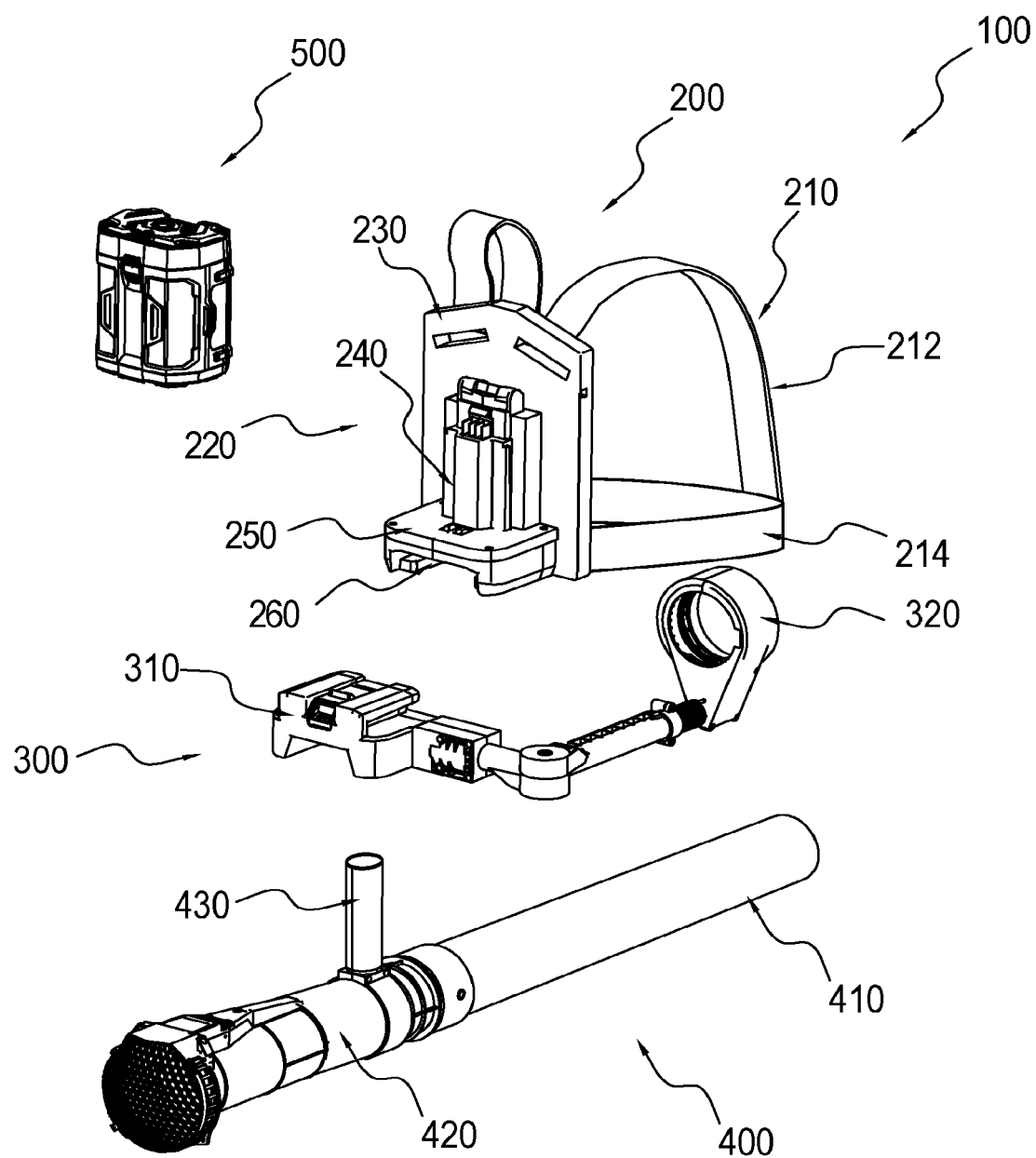
FIG. 2 illustrates an exploded perspective view of the exemplary back-mounted power tool system of FIG. 1.

FIGS. 1 and 2 illustrate an exemplary back-mounted power tool system 100. FIG. 1 illustrates a perspective view of system 100 and FIG. 2 illustrates an exploded perspective view of system 100. As shown in FIGS. 1 and 2, system 100 includes a backpack apparatus 200, a connecting member 300, a power tool 400, and a battery package 500. Backpack apparatus 200 may be mounted to a user of system 100 to allow the weight of one or more parts of system 100 to be carried by the user when operating system 100. In some embodiments, battery package 500 is coupled to backpack apparatus 200, whose weight is transferred to backpack apparatus 200, and then spread over the shoulders, back, and/or waist of the user when backpack apparatus 200 is mounted. Power tool 400 may be any suitable type of hand-held or portable power tool or machine. Power tool 400 may need to be flexibly operated by the user, and/or may be operated while the user moves around.

The mounting of backpack apparatus 200 on the shoulders, back, and/or waist of the user may reduce fatigue of the user when using system 100 for long lengths of time, increase the flexibility and/or efficiency for using power tool 400, and improve user experience. Such mountable design may also allow the weight of battery package 500 to be augmented to increase the power and/or voltage supplied to power tool 400 without causing substantial fatigue and/or inconvenience for the user, and thus may improve the efficiency and/or flexibility for operating power tool 400.

System 100 may include more than one battery packages 500 to supply power to power tool 400. In some embodiments, battery package 500 may be disposable after one or more uses. In other embodiments, battery package 500 may be rechargeable and may be used for a plurality of times. In other embodiments, battery package 500 and/or its battery cells may be used for other power tool systems as well. Parameters of battery package 500, such as the weight, number of battery cells, and/or voltage, may be designed such that the power tool 400 may be operated over a predetermined period of time before battery package 500 is fully discharged. Additionally or alternatively, one or more of these parameters may be determined such that the output voltage of battery package 500 may be equal to or above a target level or a predetermined threshold.

In some embodiments, the weight of battery package 500 or the total weight of multiple battery packages 500 may constitute various percentage of the weight of power tool 400, such as ranging from about 30% to about 35%, from about 35% to about 40%, from about 40% to about 45%, from about 45% to about 50%, from about 50% to about 55%, from about 55% to about 60%, from about 60% to about 65%, from about 65% to about 70%, from about 70% to about 75%, from about 75% to about 80%, from about 80% to about 85%, from about 85% to about 90%, from about 90% to about 95%, from about 95% to about 100%, from about 30% to about 40%, from about 40% to about 50%, from about 50% to about 60%, from about 60% to about 70%, from about 70% to about 80%, from about 80% to about 90%, from about 90% to about 100%, from about 100% to about 110%, from about 110% to about 120%, from about 120% to about 130%, from about 130% to about 140%, from about 140% to about 150%, from about 30% to about 50%, from about 50% to about 70%, from about 70% to about 90%, from about 90% to about 110%, from about 110% to about 130%, from about 130% to about 150%, from about 30% to about 60%, from about 60% to about 90%, from about 90% to about 120%, from about 120% to about 150%, from about 30% to about 80%, from about 80% to about 120%, from about 120% to about 150%, from about 30% to about 100%, from about 30% to about 150% of the weight of power tool 400. Additionally or alternatively, the weight of battery package 500 or the total weight of multiple battery packages 500 may vary depending on the user's weight-load capacity and convenience, such as ranging from about 0.5 kg to about 1 kg, from about 1 kg to about 1.5 kg, from about 1.5 kg to about 2 kg, from about 2 kg to about 2.5 kg, from about 2.5 kg to about 3 kg, from about 3 kg to about 3.5 kg, from about 1 kg to about 2 kg, from about 2 kg to about 3 kg, etc. In some embodiments, the output voltage of battery package 500 may vary also, such as ranging from about 10 V to about 30 V, from about 30 V to about 50 V, from about 50 V to about 70 V, from about 70 V to about 90 V, from about 90 V to about 130 V, or from about 50 V to about 130 V.

As shown in FIG. 2, in some embodiments, backpack apparatus 200 includes a backpack harness 210 and a body 220. Backpack harness 210 may include one or more shoulder straps 212 and/or at least one waist belt 214 for mounting backpack apparatus 200 onto the user's body, e.g., one or both shoulders, back, and/or waist. Shoulder straps 212 may each have one end connected to waist belt 214. When one shoulder strap 212 is used, backpack apparatus 200 may be mounted on one shoulder of the user and/or may be mounted diagonally over a user's body.

Body 220 of backpack apparatus 200 includes a frame 230, a connector 240 to couple battery package 500 to backpack apparatus 200, and/or a base member 250. Frame 230 has a surface that at least partially contacts the back of the user and another surface having connector 240 attached thereto. Increasing the area for the surface of frame 230 contacting the back of the user may increase the support and comfort for the user to wear backpack apparatus 200. Frame 230 includes connecting structures that connect to shoulder straps 212 and waist belts 214 of backpack harness 210, such as fixtures, clamps, and holes. Connector 240 may be removably or fixedly attached to frame 230. Base member 250 is located below connector 240 and is attached to frame 230 on the surface that is not in contact with the user. Base member 250 includes a connecting portion 260 to connect to connecting member 300.

Frame 230, shoulder straps 212, and waist belt 214 may have ergonomic shapes, sizes, structures, and components to reduce strain and improve the comfort for the user to carry backpack apparatus 200 for an extended period of time. For example, frame 230, shoulder straps 212, and waist belt 214 may be made of breathable, light weight, and/or flexible materials, and/or may have paddings on the surface facing or contacting the user. The paddings may include a compliant and/or resilient material, such as foam or sponge. The paddings may reduce the pressure caused by backpack apparatus 200, e.g., frame 230, on the back and/or shoulders of the user. Shoulder straps 212 and waist belt 214 may have adjustable structures installed thereon, such as buckles, clasps, slips, clamps, nonslip fasteners, or hooks to adjust their lengths and fitting around the user.

As shown in FIGS. 1 and 2, connecting member 300 connects backpack apparatus 200 to power tool 400. For example, as shown in FIG. 2, on one end, connecting member 300 has a fitting member 310 that interlocks or forms a complementary fit with connecting portion 260 of base member 250. On the other end, connecting member 300 has a power tool connector 320 that connects to power tool 400. In some embodiments, power tool connector 320 is a clamp that fastens a part 420 of the body of power tool 400. Connecting member 300 may support the weight of power tool 400, and may transfer the weight of power tool 400 to backpack apparatus 200 when mounted on the user. Connecting member 300 may also transfer a reaction force received from the power tool to the backpack apparatus when the apparatus is mounted on the user to operate. More details are described below. Such configuration of connecting member 300 may allow at least a part of the weight or reaction force of power tool 400 to be transferred to and spread over the shoulders, back, and/or waist of the user, which may reduce the work of the user's arm for holding power tool 400, and may thus increase the flexibility and/or period of time for operating power tool 400.

In some embodiments, power tool 400 is a hand-held machine that includes a body and a handle 430. Handle 430 may be used for carrying, steering, cruising, and/or controlling power tool 400. For example, handle 430 may be held by a user to adjust the angle, movement, and/or position of power tool 400. Handle 430 may be designed to be suitable or adjustable for left and/or right hand use. In some embodiments, handle 430 has electronic control circuits and one or more user controls (not shown), such as switches or buttons, to control the operation of power tool 400. The control circuits and one or more user controls may have one or more functions, such as turning on or off power tool 400, or boosting the power or acceleration of power tool 400. Handle 430 may further include a display, such as an LED display, to show the status and/or operational parameters of power tool 400, such as speed, strength, temperature, etc. The display may be connected to the control circuits. In some embodiments, the display may also show the remaining capacity of battery package 500, for example, in percentage in relation to its initial full capacity.

In some embodiments, when power tool 400 operates and thus generates an action force, a reaction force is generated. For example, when power tool 400 is a blower, the body of power tool 400 includes a pipe 410. Power tool 400 may propel air out of pipe 410. Such propelling to move air forward with an action force created by, e.g., motor and a propeller, generates a reaction force. Connecting member 300 may transfer the reaction force from the body of power tool 400 to backpack apparatus 200, which may reduce the work and/or increase the flexibility for the user to control and/or hold power tool 400, which may reduce the fatigue, increase the during for the user to operate power tool 400, and improve user experience. More details of the structures and functions of the components of system 100 are described below.

Figure 3:
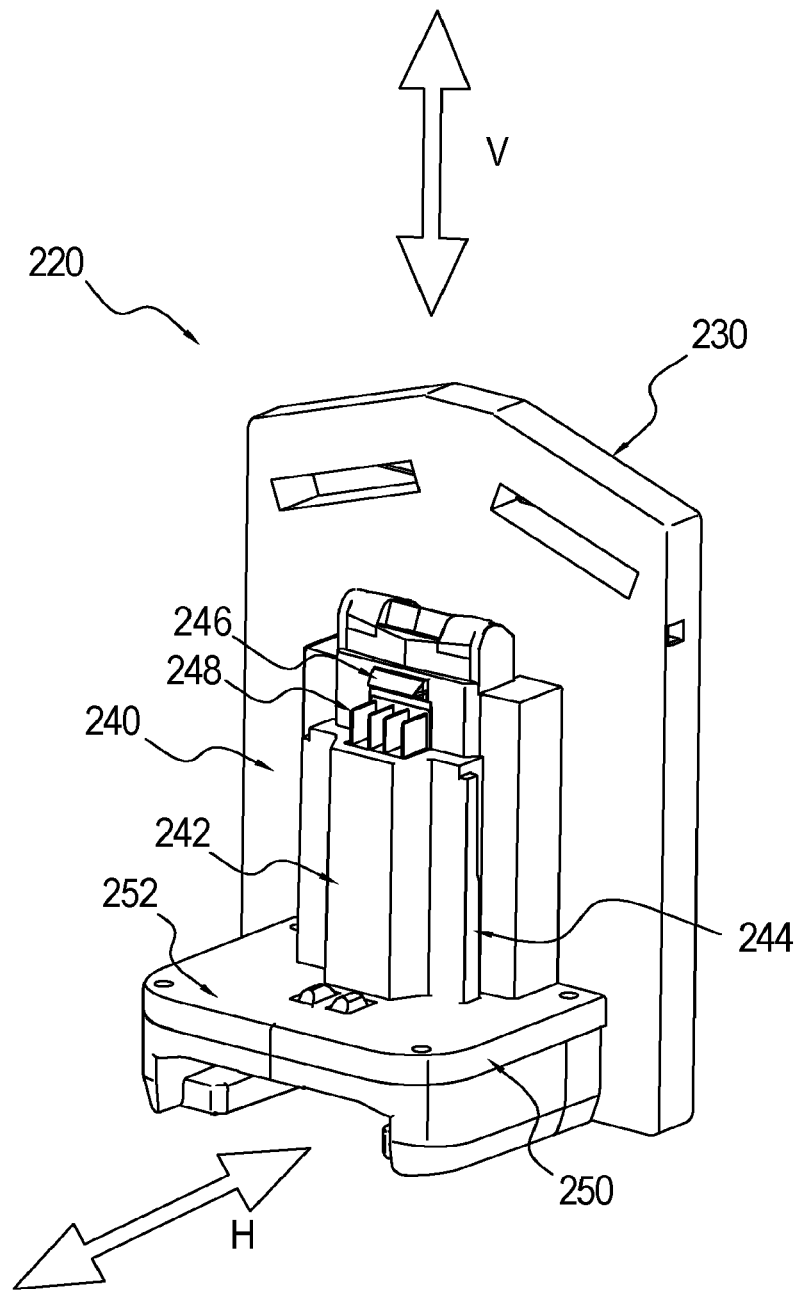
FIG. 3 illustrates a perspective view of an exemplary part of the exemplary back-mounted power tool system of FIG. 1.

FIG. 3 illustrates a perspective view of body 220 of backpack apparatus 200. To illustrate the locations of different components of body 220 of backpack apparatus 200, a first double-headed arrow shown in FIG. 3 illustrates a vertical direction V, and a second double-headed arrow shown in FIG. 3 illustrates a horizontal direction H. When backpack apparatus 200 is mounted on a user, direction V is substantially parallel to the direction of the gravitational force. Direction H is perpendicular to V direction.

In some embodiments, as shown in FIG. 3, connector 240 is attached to frame 230 on one side and has coupling structures on the opposite side. For example, the coupling structures include an elongated protrusion 242, two elongated guiding bars 244, a fastener 246 (such as a lock, a clasp, or a hook), and an electrical terminal 248. Protrusion 242 and guiding bars 244 may have any suitable elongated shape, e.g., rectangular or cylindrical. Guiding bars 244 are located on two sides of protrusion 242 respectively, and may each be attached to protrusion 242.

As shown in FIG. 3, base member 250 of backpack apparatus 200 has a surface 252 facing connector 240. Surface 252 may be flat or curved, and at least a part of surface 252 is perpendicular to direction V. Protrusion 242 and guiding bars 244 may be attached to surface 252 of base member 250 at the bottom in direction V. In some embodiments, protrusion 242, guiding bars 244, and base member 250 may be formed as separate parts or an integral part. Electrical terminal 248 may be any suitable type of electrical connector. For example, electrical terminal 248 has one or more connecting fins or plates made of electrical conducting material, such as copper or aluminum. Electrical terminal 248 forms electrical connection with battery package 500 when battery package 500 is coupled to connector 240.

Figure 4:
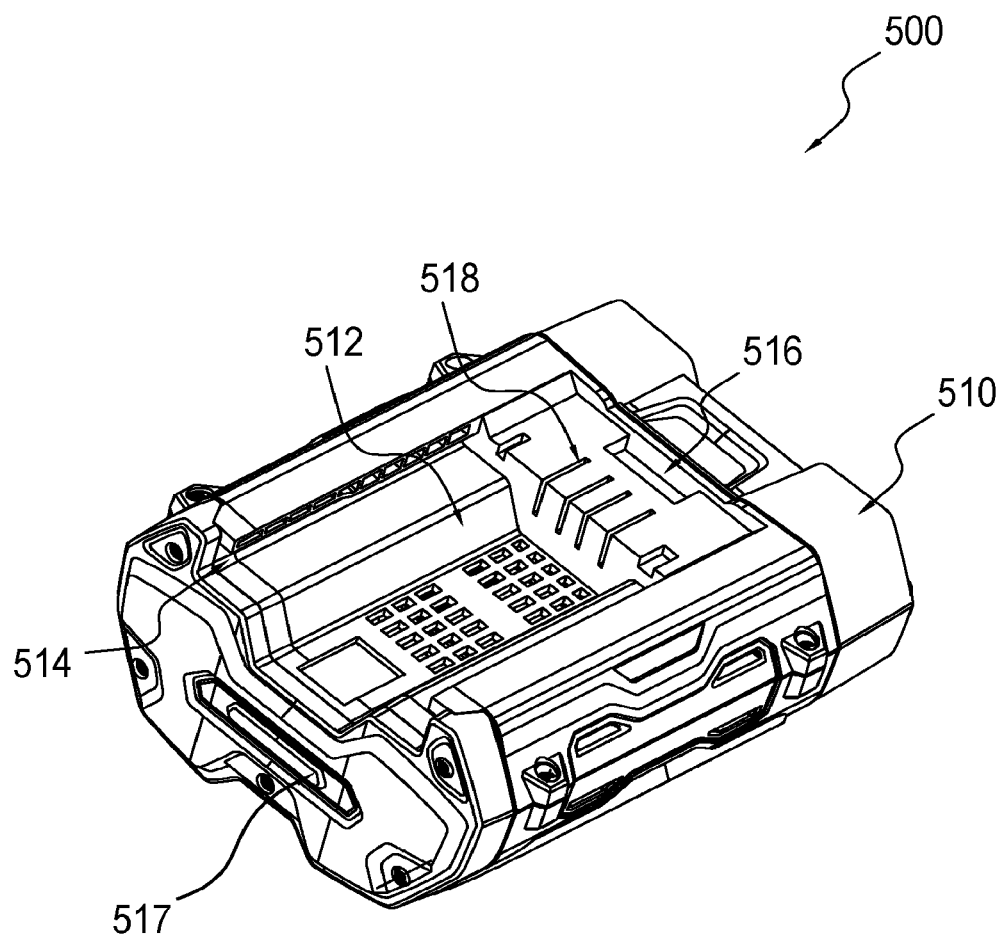
FIG. 4 illustrates a perspective view of an exemplary battery package of the exemplary back-mounted power tool system of FIG. 1, according to embodiments of the present disclosure.

FIG. 4 illustrates a perspective view of battery package 500. Battery package 500 includes a case 510 enclosing or housing one or more battery cells (not shown). In some embodiments, as shown in FIG. 4, to couple to backpack apparatus 200, battery package 500 includes fitting structures complementary to the coupling structures of connector 240. For example, case 510 is designed to have fitting structures complementary to the coupling structures of connector 240. Case 510 includes an elongated channel 512, two elongated slots 514, a locking slot 516, and an electrical terminal 518. Elongated slots 514 are located at two sides of channel 512 respectively, and are each partially enclosed. Channel 512 is shaped to at least partially enclose or surround protrusion 242. Elongated slots 514 are each shaped to at least partially enclose or surround a corresponding guiding bar 244. Locking slot 516 has a shape that allows fastener 246 of connector 240 to fit into. For example, fastener 246 has a clasp that interlocks locking slot 516. Electrical terminal 518 may have complimentary structures to electrical terminal 248. For example, electrical terminal 518 has one or more slots that fit or receive the one or more connecting fins or plates of electrical terminal 248. The slots of electrical terminal 518 may have electrical connecting materials forming their bottom or side walls such that electrical connection can be formed between electrical terminal 518 of battery package 500 and electrical terminal 248 of connector 240.

Referring to FIGS. 3 and 4, in some embodiments, battery package 500 may be coupled to or removed from connector 240 by moving battery package 500 along connector 240 in direction V, with the fitting structures of case 510 facing the coupling structures of connector 240. For example, as battery package 500 moves from the top to the bottom direction V, the fitting structures of case 510 of battery package 500 and the coupling structures of connector 240 may couple battery package 500 to backpack apparatus 200 by sliding protrusion 242 into channel 512, sliding guiding bars 244 into elongated slots 514, sliding connecting fins or plates of electrical terminal 248 into slots of electrical terminal 518, and fitting fastener 246 into locking slot 516.

In some embodiments, fastener 246 includes a clasp (not shown in FIG. 3) made of a flexible material and biased towards battery package 500 in direction H. The clasp may deflect when battery package 500 is moved along connector 240 until it meets and fits into locking slot 516 to lock battery package in position in direction V and/or direction H. Additionally or alternatively, fastener 246 may have a flexible member (not shown) rotatably connected to body 220 of backpack apparatus 200. The flexible member of fastener 246 may be protruded from body 220, and may clasp, lock, and/or fit into locking slot 516 when fastener 246 is rotated to a predetermined position. Fastener 246 is unlocked or released from locking slot 516 when the flexible member of fastener 246 is rotated to another position where the flexible member is retracted into body 220. Fastener 246 may be controlled by the user and at least be partially accessible to the user of power tool system 100. Thus, the user may lock or unlock battery package 500 from backpack apparatus 200 by interlocking or unlocking fastener 246 and locking slot 516.

In some embodiments, when battery package 500 is installed and coupled to connector 240, the bottom side of battery package 500 along direction V is supported by surface 252 of base member 250. In such instances, the weight of battery package 500 is received by base member 250, which is connected to frame 230 of backpack apparatus 200. Thus, the weight of battery package 500 is then transferred to frame 230, from which transferred to backpack harness 210, and is then received and carried by the user on the shoulders, back, and/or waist. In some embodiments, backpack apparatus 200 may have a plurality of connectors 240 that can receive a number of battery packages 500. In such instances, base member 250 may support at least a number of the battery packages 500 coupled to backpack apparatus 200, and may transfer the weight of the coupled battery packages 500 to backpack harness 210.

Figure 5:
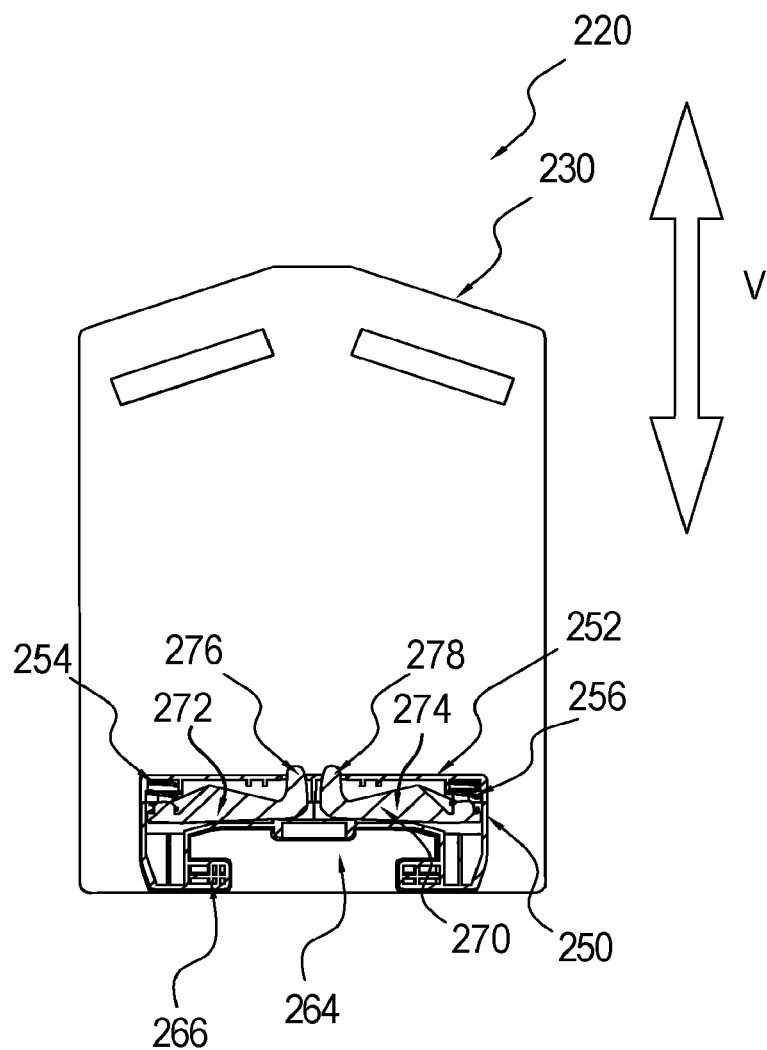
FIG. 5 illustrates a rear view of the exemplary part of FIG. 3.

As described above, battery package 500 may be removed from connector 240 by moving battery package 500 along connector 240 from the bottom to the top in direction V. However, when fastener 246 and locking slot 516 are interlocked, battery package 500 is locked in position and may not be removed. In some embodiments, as shown in FIG. 5, backpack apparatus 200 further includes an ejecting apparatus 270 that ejects and/or releases battery package 500 from backpack apparatus 200 when fastener 246 and locking slot 516 are unlocked. Ejecting apparatus 270 may reduce the effort for removing battery package 500 from backpack apparatus 200, e.g., connector 240.

Exemplary embodiments of the structure of ejecting apparatus 270 are described herein with reference to FIG. 5, which illustrates a rear view of backpack apparatus 200. As shown in FIG. 5, ejecting apparatus 270 is installed in base member 250. In some embodiments, ejecting apparatus 270 includes two levers 272 and 274 and two bias elements 254 and 256. On one end, each lever may have a protruding element extending above surface 252. For example, as shown in FIG. 5, lever 272 has a protruding element 276 extended above surface 252 and lever 274 has a protruding element 278 extended above surface 252. On the other end, each level may connect to or be in contact to a corresponding bias element, such as a spring. Bias elements 254 and 256 may be attached to a bottom side of surface 252. For example, as shown in FIG. 5, bias elements 254 and 256 are attached to a bottom side of surface 252 along direction V. A left end of lever 272 is in contact with bias element 254 and a right end of lever 274 is in contact with bias element 256. Protruding elements 276 and 278 are located near the center of the bottom of battery package 500 when installed. Bias elements 254 and 256 are located on either the right or left side of base member 250 below surface 252. In some embodiments, as shown in FIG. 4, case 510 of battery package of 500 may further include a recess 517 that at least partially receives protruding elements 276 and 278 when battery package 500 is coupled to connector 240.

Exemplary embodiments of the working mechanism of ejecting apparatus 270 are described herein, in view of FIGS. 3 through 5. When battery package 500 is coupled to connector 240, the bottom surface of battery package 500 may rest upon surface 252. Fastener 246 and locking slot 516 may then lock battery package 500 in position along direction V. In such instances, the weight of battery package 500 and/or the locking of battery package 500 along direction V apply a pressure on protruding elements 276 and 278 such that protruding elements 276 and 278 are pressed to be below or flat with surface 252. This causes the left or right end of levers 272 and 274 that is connected to or in contact with bias element 254 or bias element 256 to be raised because of the leverage applied by lever 272 or lever 274. Bias elements 254 and 256 are then deformed, e.g., compressed, by the raised left or right end of levers 272 and 274, and thus each apply a pressure to the corresponding lever. But because the position of battery package 500 is locked by fastener 246 and locking slot 516, bias elements 254 and 256 remain deformed and store some amounts of elastic potential energy, and protruding elements 276 and 278 remain below or flat with surface 252.

When battery package 500 is to be removed from backpack apparatus 200, fastener 246 and locking slot 516 are unlocked. Because the pressure on protruding elements 276 and 278 is reduced when fastener 246 and locking slot 516 unlock, bias elements 254 and 256 then unload the amounts of stored elastic potential energy and each apply a pressure to push levers 272 and 274 respectively. The left end of lever 272 and the right end of lever 274 are then lowered, causing protruding elements 276 and 278 to be elevated because of the leverage applied by levers 272 and 274. The elevated protruding elements 276 and 278 then eject battery package 500 from the bottom to the top of connector 240. In some embodiments, because of the elasticity of bias elements 254 and 256, the ejection of battery package 500 may be performed with a speed and/or in a short time. The amounts of elastic potential energy stored in bias elements 254 and 256 may allow battery package 500 to be ejected over a certain distance by at least partially sliding over connector 240. In such embodiments, ejecting apparatus 270 facilitates the removal of battery package 500 from connector 240 by reducing the effort of the user to decouple, remove, and/or slide battery package 500 away from connector 240.

Figure 6:
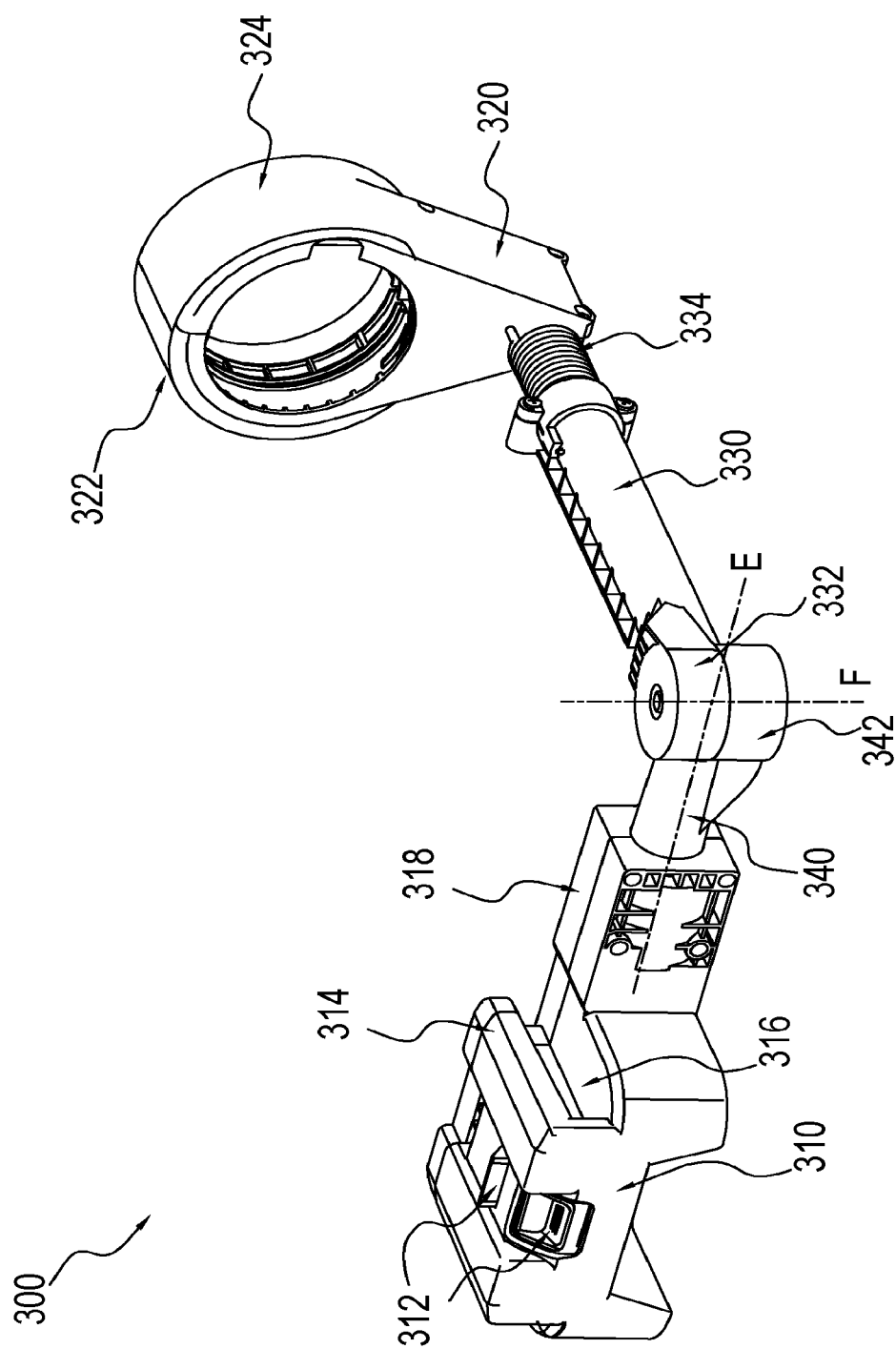
FIG. 6 illustrates a perspective view of an exemplary connecting member of the exemplary back-mounted power tool system of FIG. 1.

FIG. 6 illustrates a perspective view of connecting member 300 of system 100. Connecting member 300 may be removably or fixedly connected to backpack apparatus 200. As described above, in some embodiments, connecting member 300 includes fitting member 310 to couple to backpack apparatus 200 and power tool connector 320 to couple to power tool 400. Connecting member 300 further includes a first arm 330 and a second arm 340 that are rotatably connected. For example, as shown in FIG. 6, an end 332 of first arm 330 is rotatably coupled to or joined with an end 342 of second arm 340. The other end of first arm 330 connects to power tool connector 320, and the other end of second arm 340 connects to fitting member 310.

In some embodiments, power tool connector 320 includes a ring shaped clamp assembled with two half members 322 and 324. Half members 322 and 324 may be partially or completely separated, and may be assembled into one integrated part. Half members 322 and 324 may be separated or assembled via any suitable mechanical structure that allows for quick assembly and release, e.g., structures that use friction fit, press fit, twist fit, or snap fit to assemble half members 322 and 324. As illustrated in FIGS. 2 and 6, to couple power tool connector 320 to power tool 400, part 420 of the body of power tool 400 may be placed between at least partially separated half members 322 and 324, which then are closed and assembled into an integrated part, e.g., the clamp. Half members 322 and 324 of the assembled clamp may tightly hold power tool 400. In some embodiments, power tool connector 320 may include adjustment structures to adjust the tightness of holding or clamping power tool 400. In some embodiments, power tool connector 320 may include surfaces made of materials that increase the friction between half members 322 and 324 and power tool 400. In other embodiments, the connection between power tool connector 320 and power tool 400 may be substantially similar to that between fitting member 310 and base member 250 of backpack apparatus 200, which is described further below with respect to FIG. 7.

As shown in FIG. 6, in some embodiments, first arm 330 has a compliant member 334 between a fixture of first arm 330 and power tool connector 320 to damp a force generated during the operation of power tool 400, such as a reaction force or vibration force between power tool 400 and backpack apparatus 200. For example, a reaction force caused by an action force generated by the operation of power tool 400 may be damped or retarded and then received by first arm 330, and then transferred to backpack apparatus 200 via connecting member 300. Compliant member 334 may be a spring that when applied a force deforms and stores an elastic potential energy caused by the deformation. The spring may reform and release the elastic potential energy when the force applied decreases and/or no longer exists. Thus compliant member 334 may damp or retard the interaction between power tool 400 and connecting member 300, between power tool 400 and backpack apparatus 200, and/or between power tool 400 and the user's hand holding handle 430. In some embodiments, power tool 400 may include more than one compliant members 334 between power tool 400 and connecting member 300.

Connecting member 300, including at least first arm 330, second arm 340, compliant member 334, and power tool connector 320, allows both a pulling force and a pushing force to be transferred between power tool 400 and backpack apparatus 200. In some instances, connecting member 300 may transfer a pushing force, e.g., a reaction force received by first arm 330 from power tool 400, to backpack apparatus 200. For example, compliant member 334 may be elastically compressed, and may transfer the reaction force to first arm 330. First arm 330 may transfer the reaction force to second arm 340, which may transfer the reaction force to fitting member 310. Fitting member 310 then may transfer the reaction force to base member 250 of backpack apparatus 200. In other instances, connecting member 300 may transfer a pulling force, e.g., the weight of power tool 400, to backpack apparatus 200. For example, compliant member 334 may be elastically elongated, and may transfer the gravitational force by pulling compliant member 334, which transfers the pulling force to first arm 330. First arm 330 may transfer the pulling force to second arm 340, which may transfer the pulling force to fitting member 310. Fitting member 310 may then transfer the pulling force to base member 250 of backpack apparatus 200. The force transferred to base member 250 is then transferred to backpack harness 210 and applied to the shoulders, back, and/or waist of the user. The above-described transferring and/or damping or retarding of one or more types of force by connecting member 300 may reduce the user's work and/or fatigue for operating power tool 400, and increase the convenience, flexibility, comfort, and/or control for operating power tool 400.

Figure 7:
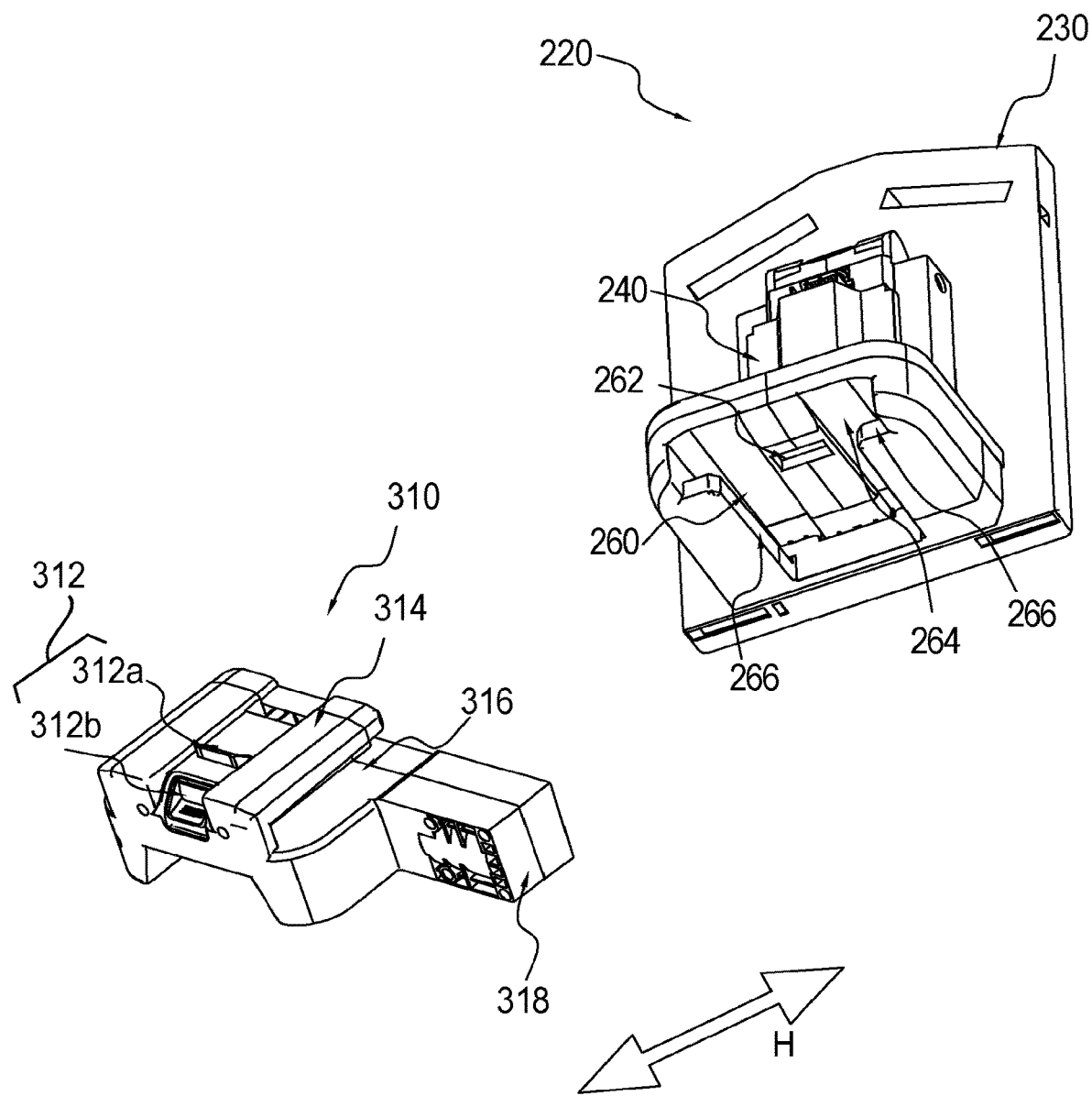
FIG. 7 illustrates perspective views of an exemplary fitting member of the exemplary connecting member of FIG. 6 and the exemplary part of FIG. 3.

Exemplary embodiments of the connection between fitting member 310 and backpack apparatus 200 are described herein with reference to FIG. 7. FIG. 7 illustrates perspective views of fitting member 310 of connecting member 300 and body 220 of backpack apparatus 200. As shown in FIG. 7, in some embodiments, fitting member 310 may include structural components that are complementary to connecting portion 260 of base member 250 of backpack apparatus 200 such that connecting member 300 may be removably or fixedly coupled to backpack apparatus 200.

For example, fitting member 310 includes one or more elongated spines 314, one or more guiding slots 316, and a locking structure 312. Locking structure 312 locks fitting member 310 to connecting portion 260 in position when fitting member 310 is fitted into connecting portion 260 of base member 250 of backpack apparatus 200. Connecting portion 260 includes one or more receiving slots 264, one or more guiding ribs 266, and a locking slot 262. To couple fitting member 310 to connecting portion 260, fitting member 310 may be aligned with base member 250 and/or be fit into connecting portion 260, e.g., by a slidable fitting. For example, as fitting member 310 is slid into connecting portion 260, elongated spines 314 are received by receiving slots 264 and guiding ribs 266 are received by guiding slots 316. When fitting member 310 is fit into connecting portion 260, locking structure 312 interlocks locking slot 262, and thus locks the position of fitting member 310, e.g., in direction H.

As shown in FIG. 7, in some embodiments, locking structure 312 of fitting member 310 includes two parts, a hook 312a and a release 312b. Hook 312a may stick into locking slot 262 as fitting member 310 moves into connecting portion 260 along direction H. When fitting member 310 is locked in position, fitting member 310 and backpack apparatus 200 become one integrated part. Hook 312a may be at least partially retractable into fitting member 310. For example, to remove fitting member 310 from backpack apparatus 200, release 312b may be adjusted by, such as sliding, rotating, or pressing, such that hook 312a is retracted from locking slot 262 and/or at least partially into fitting member 310. Then, fitting member 310 may be unlocked and may be removed from connecting portion 260. The mechanical connection (not shown) between hook 312a and release 312b may be located inside or below fitting member 310. In other embodiments, connecting portion 260 may have a locking structure similar to structure 312 and fitting member 310 may have a locking slot similar to slot 262.

The connection between fitting member 310 and connecting portion 260 of base member 250 allows the two parts to become an integrated part, in which fitting member 310 is a supporting platform for backpack apparatus 200. This connection facilitates the transfer of force from connecting member 300 to backpack apparatus 200 and thus improves user experience. For example, when backpack apparatus 200 coupled with fitting member 310 is mounted on the user, fitting member 310 and/or connecting member 300 bearing the weight of battery package 500 and/or other types of force may be at about the height of the waist of the user. This height may be suitable for transferring the weight and/or force to frame 230 and then to backpack harness 210 without substantially compromising the comfort of the user. Additionally, the use of fitting member 310 may allow the length of backpack apparatus 200, e.g., frame 230, to be shorter along direction V, and improves the comfort of wearing backpack apparatus 200 by the user. Thus, fitting member 310 may provide more comfort and/or reduce fatigue for the user by improving the ergonomics of system 100.

Figure 8:
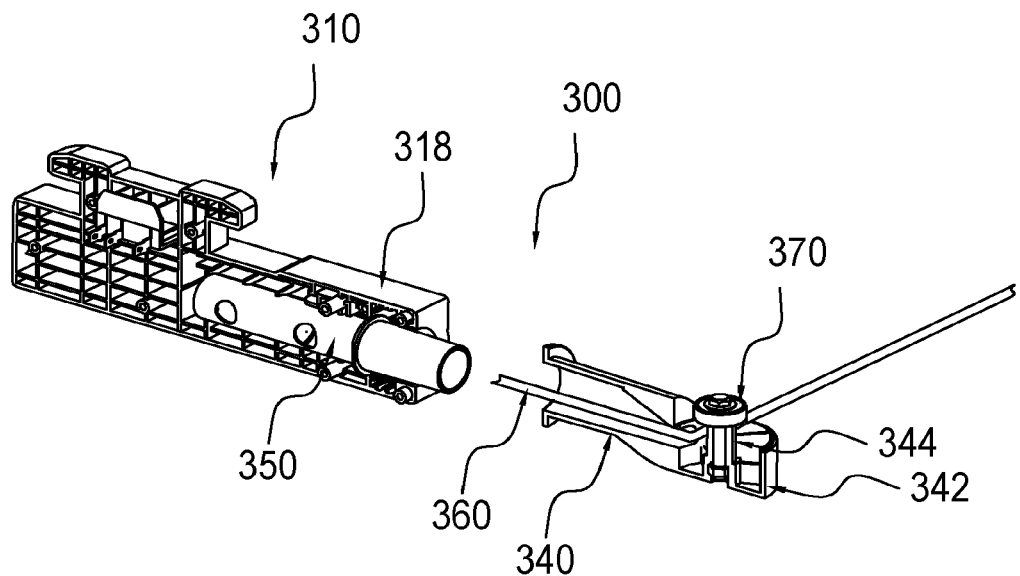
FIG. 8 illustrates a perspective view of a cross-section of the exemplary connecting member of FIG. 6 with some parts illustrated in a partially exploded view.
Figure 9:
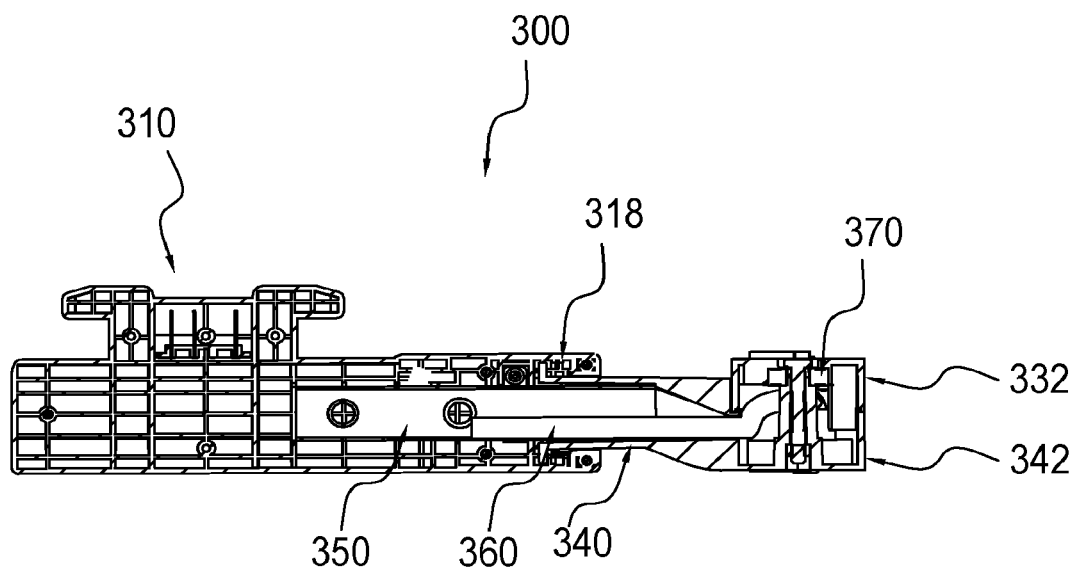
FIG. 9 illustrates a cross-section of the exemplary connecting member of FIG. 6.

As described above, in some embodiments, first arm 330 and second arm 340 of connecting member 300 in FIG. 6 are rotatably connected. The rotational connection between first arm 330 and second arm 340 are further described below with reference to FIGS. 6, 8, and 9. FIG. 6 illustrates a first axis "E" and a second axis "F." Axis E is perpendicular to Axis F. FIG. 8 illustrates a perspective view of a cross-section of connecting member 300 with some parts illustrated in a partially exploded view. FIG. 9 illustrates a cross-section of connecting member 300.

As shown in FIG. 6, end 332 of first arm 330 rotatably connects to end 342 of second arm 340 such that first arm 330 may rotate relative to second arm 340 around or about the F axis, and vice versa. For example, as shown in FIGS.

8 and 9, end 342 is a half shell having an opening facing up. End 342 has a connecting pillar 344 inside of the shell and extending above the opening. A bearing 370, e.g., a ball bearing, is installed on a top part of connecting pillar 344. In some embodiments, end 332 of first arm 330 is a half shell with a hole or recess to receive bearing 370. End 332 of first arm 330 is placed on top of end 342 of second arm 340 such that first arm 330 can rotate about pillar 344 of second arm 340. Bearing 370 may reduce the rotational friction between end 332 of first arm 330 and end 342 of second arm 340. In other embodiments, end 342 of second arm 340 may be placed on top of end 332 of first arm 330, which may have pillar 344 and bearing 370 installed thereupon.

In some embodiments, because both ends 342 and 332 are half shells, when they are closed and joined, a cavity is formed by the closing and/or joining the half shells. As shown in FIGS. 8 and 9, this cavity may be used for laying a power cord 360 to conduct electricity, e.g., current, from battery package 500 to power tool 400. Placing power cord 360 inside first arm 330 and second arm 340 may reduce the effect of external wires on the operation of power tool 400 and improves user experience. For example, the placement of power cord 360 inside connecting member 300 may at least reduce obstruction and/or restriction of the movement of the user's arm and/or power tool 400 that may be caused by power cord 360 laying outside of connecting member 300. More details about the electrical connection between battery package 500 and power tool 400 are further described below.

In some embodiments, as shown in FIG. 8, second arm 340 is rotatably connected to a fitting portion 318 of fitting member 310. Fitting portion 318 may include a cavity to at least partially receive second arm 340. Second arm 340 may be removably and/or frictionally fit into the cavity of fitting portion 318. In some embodiments, as shown in FIGS. 8 and 9, connecting member 300 further includes an reinforcement arm 350 fixedly or removably installed in the cavity of fitting portion 318. Reinforcement arm 350 may have any shape that can fit into second arm 340 via a suitable mechanical means, e.g., friction fit, press fit, twist fit, snap fit, overmolding or molding, thermal bonding, adhesive bonding, and/or welding. For example, reinforcement arm 350 may have a tapered tubular shape substantially complementary to the inner perimeters of at least a part of second arm 340 such that reinforcement arm 350 may be at least partially inserted into second arm 340. In such instances, second arm 340 is supported by reinforcement arm 350 from the inside and by fitting portion 318 on the outside. The fitting between second arm 340 and reinforcement arm 350, and/or the fitting between second arm 340 and fitting portion 318 allow second arm 340 to be rotatable relative to reinforcement arm 350 and/or fitting portion 318 around or about axis E.

The above described rotational connections between first arm 330 and second arm 340 and between second arm 340 and fitting member 310 (reinforcement arm 350 and/or fitting portion 318) allow the user to rotate power tool 400 around or about axes E and F as needed. In some embodiments, the rotational angle of both first arm 330 and second arm 340 may range up to about 360° such that power tool 400 may be operated or oriented towards any direction over a spherical space. In other embodiments, power tool 400 may not need to operate or orient over a spherical space, and may be designed to rotate within predetermined ranges to improve safety of the user during operation and/or control of power tool 400. For example, the rotational angle of first arm 330 relative to second arm 340 may range from about 60° to about 90°, from about 90° to about 120°, from about 120° to about 150°, from about 150° to about 180°, from about 60° to about 120°, from about 60° to about 150°, from about 90° to about 150°, or from about 90° to about 180°. The rotational angle of second arm 340 relative to fitting member 310 may range from about 30° to about 60°, from about 60° to about 90°, from about 90° to about 120°, from about 120° to about 150°, from about 150° to about 180°, from about 40° to about 90°, from about 40° to about 120°, from about 60° to about 120°, or from about 60° to about 180°.

The rotation of power tool 400 with first arm 330 and/or second arm 340 increases the flexibility and dynamic range for the user to operate power tool 400. For instance, when the user stays at one location, the rotation of power tool 400 executed by the user allows the user to use power tool 400 across a certain space, e.g., a fan-shaped region, around or about axis E and/or axis F. When power tool 400 is a blower, a user may sweep leaves and/or debris of a certain area before moving to a next standing location. Thus, the rotational connections of connecting member 300 with power tool 400 and backpack apparatus 200 increase the flexibility for operating power tool 400 and/or save the energy for the user operating power tool 400.

As described herein, power tool 400 may refer to any suitable power tool that can be powered by a battery and/or held by a user in their hands, such as a blower, a vacuum, a blower vacuum, a mulcher, a trimmer, a chainsaw, a grass cutter, a brush cutter, a tying machine, a drill, a lawn mower, a circular saw, an angle grinder, a sander, reciprocating saws, etc. In some embodiments, power tool 400 is a blower, such as a leaf blower or a garden blower. As described herein, reference below to power tool 400 may refer to a blower for illustrating exemplary embodiments of system 100.

Figure 10:
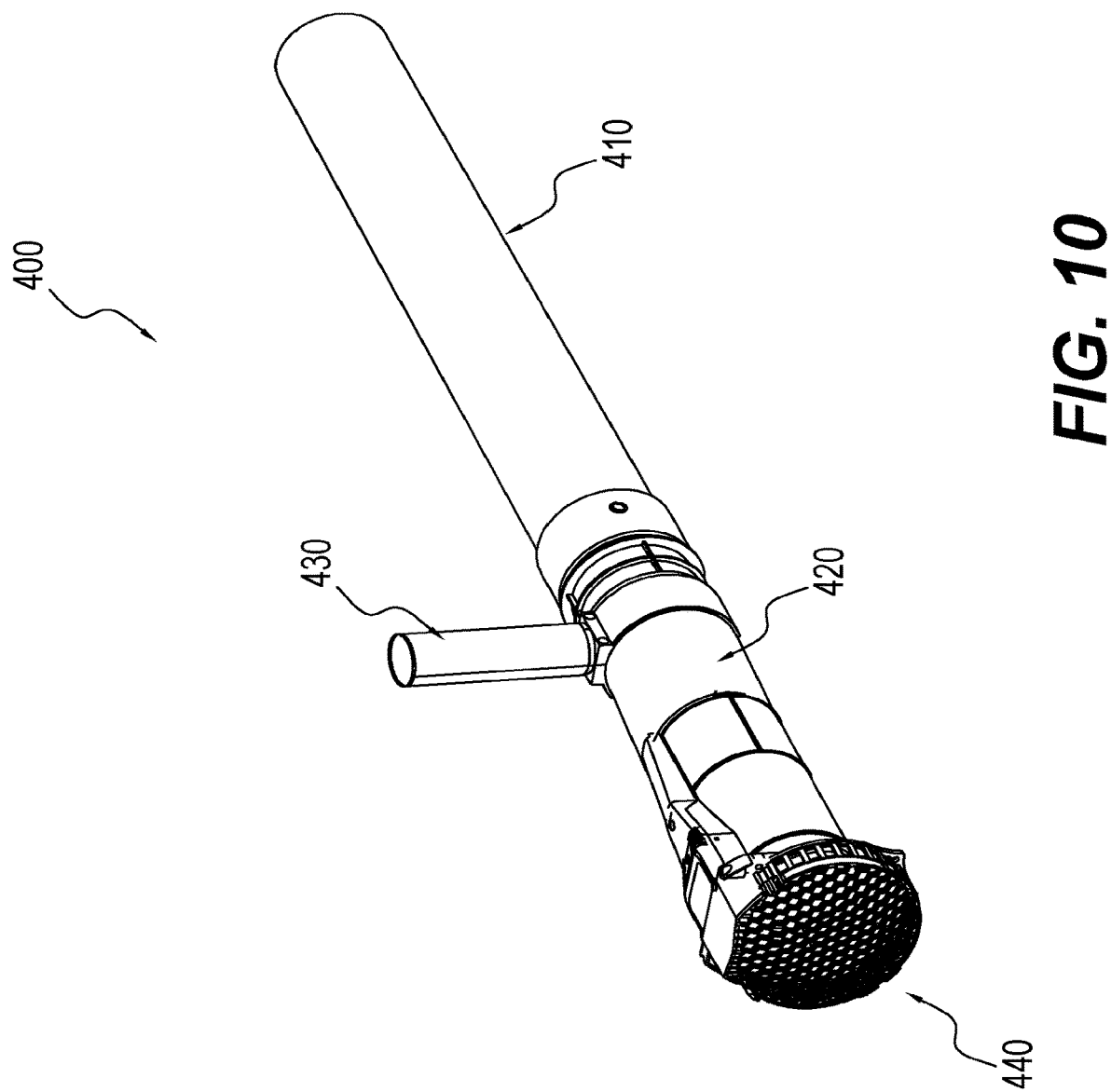
FIG. 10 illustrates a perspective view of an exemplary power tool of the exemplary back-mounted power tool system of FIG. 1, according to embodiments of the present disclosure.

FIG. 10 illustrates a perspective view of an exemplary power tool 400. As shown in FIG. 10, power tool 400 includes a pipe 410, handle 430, and a protective mesh 440. Pipe 410 provides a passage for an air flow generated by an engine or motor in power tool 400. Pipe 410 may be formed as one integrated part, such as by injection molding, or may be assembled from a plurality of individual parts. In some embodiments, pipe 410 has a tubular shape, such as a hollow cylinder. Pipe 410 may be made of a plastic material. The plastic material may be light-weight, durable, non-conductive, heat-resistant, and/or stress-resistant. For example, the material of pipe 410 may include one of polyvinyl chloride (PVC), polyethylene (PE), polypropylene (PP), and/or carbon fiber (CF). In other embodiments, the material of pipe 410 may be selected to be suitable for the application of power tool 400.

As describe above and illustrated in FIGS. 2 and 10, power tool 400 may further include part 420 that connect to power tool connector 320 of connecting member 300. Handle 430 may be used for carrying, cruising, steering, adjusting, and/or controlling power tool 400. For example, handle 430 may be held by the user to adjust the angle, movement, and/or position of pipe 410 such that the air flow ejected from pipe 410 may orient towards a direction at the control of the user. Mesh 440 includes a plurality of openings sized to allow air flow to go through but to block objects from entering pipe 410. For example, these objects may interrupt the operation of and/or damage power tool 400, such as by affecting or damaging the motor, blade, vane, fan, and/or electronic boards located in pipe 410. Thus mesh 440 may reduce the potential risks to the safety of the user that may be caused by undesirable objects that may enter, interrupt, and/or damage power tool 400. In some embodiments, mesh 440 may be removed for a user to inspect the inside of power tool 400, e.g., inside of pipe 410. Mesh 440 may be made of a plastic or other material, such as the material of pipe 410, and may be replaceable.

Figure 11:
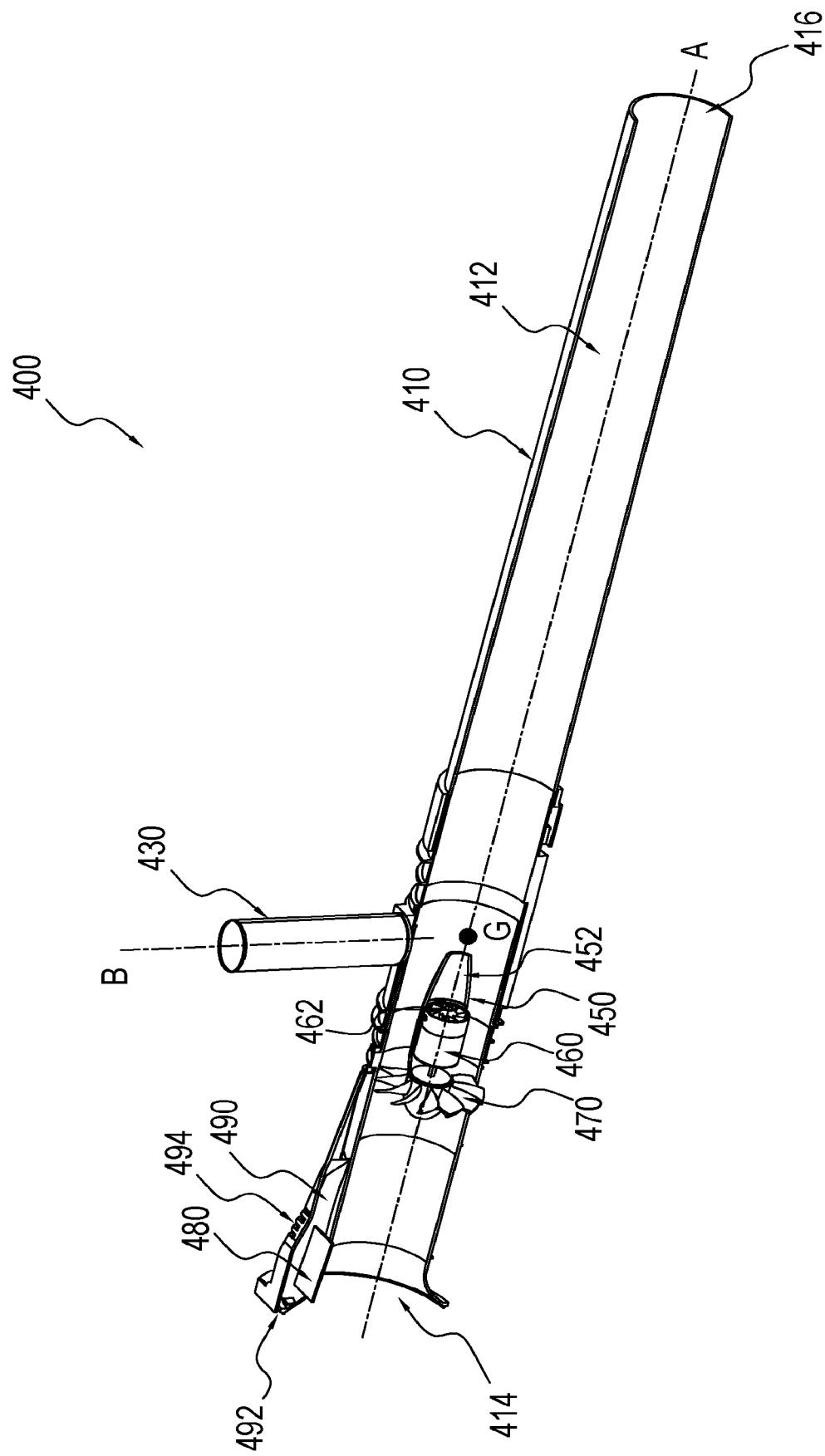
FIG. 11 illustrates a perspective view of a cross-section of the exemplary power tool of FIG. 10.
Figure 12:
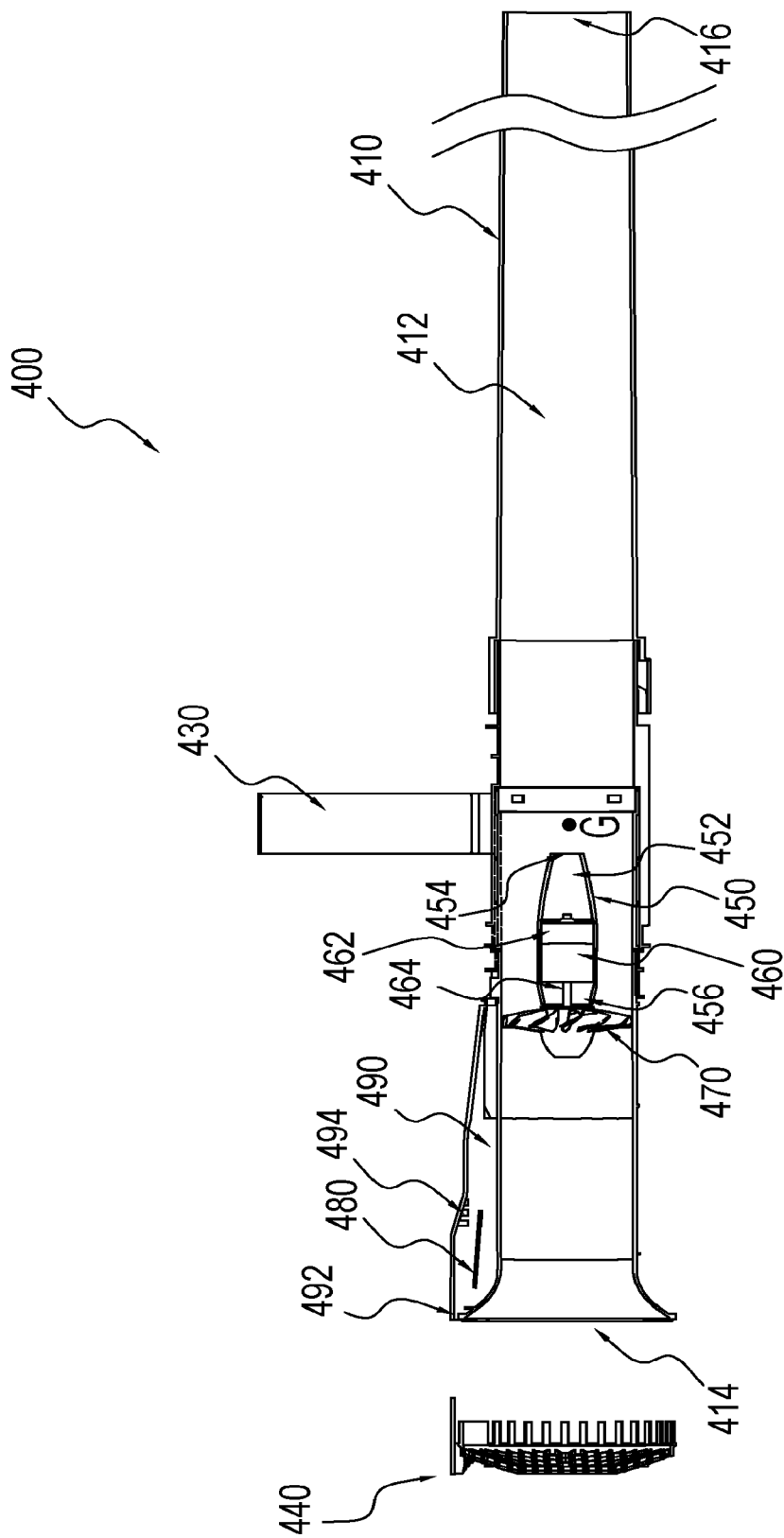
FIG. 12 illustrates a cross-section of the exemplary power tool of FIG. 10.

One or more additional exemplary parts of power tool 400 are described below with reference to FIGS. 11-18. FIG. 11 illustrates a perspective view of a cross-section of power tool 400. FIG. 12 illustrates a cross-section of power tool 400 with mesh 440 detached. As shown in FIGS. 11 and 12, power tool 400 includes a motor 460 connected to an air-generating device 470 via a motor shaft 464. Air-generating device 470 may be a fan or a propeller with one or more blades. The rotation of motor 460 provides the torque, force, and/or moment driving air-generating device 470 via motor shaft 464 to generate an air flow. The speed and/or strength of the generated air flow may be determined by the voltage and/or power supplied to motor 460, the shape and size of air-generating device 470, and/or the length and shapes of pipe 410. For example, the speed of the air flow generated by power tool 400 may range from about 40 mph to about 80 mph, from about 80 mph to about 120 mph, from about 120 mph to about 160 mph, from about 40 mph to about 130 mph, or from about 50 mph to about 120 mph.

As shown in FIGS. 11 and 12, pipe 410 has an airway 412 with an air inlet 414 and an air outlet 416. Airway 412 provides a passage for the air flow generated by air-generating device 470 and motor 460. When power tool 400 is a blower, the air flow moves from inlet 414 to outlet 416. When power tool 400 is a vacuum, the air flow moves from outlet 416 to inlet 414. In some embodiments, the length of pipe 410 and/or the distance between inlet 414 and outlet 416 may be predetermined, and may not change as power tool 400 moves or operates. In some embodiments, the length of pipe 410 and/or the distance between inlet 414 and outlet 416 may be adjustable. For example, the distance between inlet 414 and outlet 416 may be adjusted by the user to be suitable for a particular application and/or to increase the comfort or ease for operating power tool 400. The sizes and shapes of airway 412, inlet 414, and/or outlet 416 may affect the direction, the speed, and/or strength of the generated air flow, and may be designed to generate an air flow suitable for a particular application, e.g., sweeping debris and/or leaves in a private or public area.

Some conventional blowers or vacuums have their motors and/or air inlets mounted on the pack of the user and use soft flexible tubes to connect the air inlet with a pipe that guides the air flow. In those conventional blowers or vacuums, a user cannot see the motors and/or air inlets mounted on the back. However, in system 100 of the present disclosure, the location of inlet 414 of power tool 400 allows the user to observe power tool 400, inlet 414, and/or outlet 416 while operating power tool 400. Compared to those above-mentioned conventional blowers or vacuums, the design of system 100 increases the safety of using power tool 400 by allowing the user to observe and avoid inlet 414 from hazardous locations. Further, system 100 does not require using a flexible tube to connect inlet 414 to pipe 410, and thus reduces or eliminates the problems that may result from the damage of such flexible tube, and increases the life of power tool 400. Also, as described above, the distance between inlet 414 and outlet 416 of pipe 410 may be adjusted, e.g., shortened or extended, to a suitable length. Pipe 410 may be fixed at the adjusted suitable length or at a predetermined length during the operation of power tool 400, which may increase the consistency and/or steadiness of the air flow in pipe 410. The increased consistency and/or steadiness of the air flow in pipe 410 may also increase the life of power tool 400.

In some embodiments, handle 430 is connected to the outside surface of pipe 410. Handle 430 may be placed at a location convenient for the user to execute movement and/or control of power tool 400, e.g., within an arm's length of the user. In some embodiments, handle 430 is located above the center of gravity of power tool 400 to reduce the effect of the weight of power tool 400 on the movement and/or control of handle 430. In other embodiments, handle 430 is adjustable by the user to be at a convenient and/or suitable position to reduce fatigue, increase flexibility, and improves user experience for the user operating power tool 400. In some embodiments, handle 430 is located between inlet 414 and outlet 416. In some instances, the distance between the handle 430 and inlet 414 and/or the distance between handle 430 and outlet 416 may be adjustable or fixed. In other instances, the distance between the handle 430 and inlet 414 and/or the distance between handle 430 and outlet 416 may be adjusted along with the adjustment of the distance between inlet 414 and outlet 416.

In some embodiments, motor 460 is a brushless motor, such as a brushless motor in an external-rotor configuration. Brushless motors do not have mechanical brush contacts with the commutator, i.e., the moving part of a rotary electrical switch. This may reduce the probability of discharging electrons and/or generating electric sparks, e.g., by friction. Thus, in some embodiments, using a brushless motor 460 may increase the safety of using power tool 400.

In some embodiments, air-generating device 470 is an axial fan or an axial propeller having a plurality of blades that can spin around an axis of rotation. The blades of air-generating device 470 may be any suitable shape, such as aerofoil, sickle, or paddle, and may have variable or uniform pitch. An axial fan or an axial propeller as air-generating device 470 is more suitable for generating an air flow in pipe 410 to achieve a greater amount of air volume, speed, and/or strength. As shown in FIG. 11, the axis of rotation of air-generating device 470 is illustrated as axis "A". In some embodiments, axis A is the central axis of pipe 410 and/or airway 412. When motor 460 operates and drives air-generating device 470, air-generating device 470 moves air and generates an air flow parallel to axis A.

Figure 13:
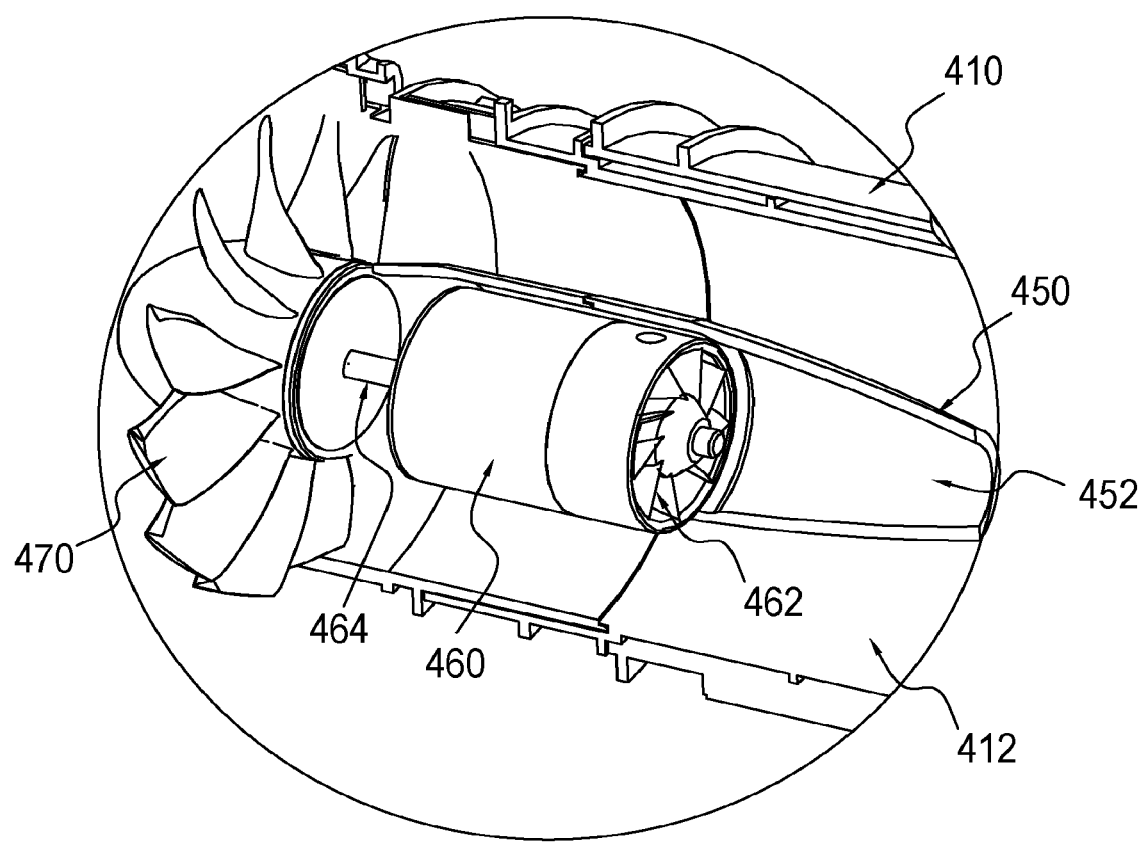
FIG. 13 illustrates a magnified perspective view of an exemplary part of the exemplary power tool of FIG. 10.
Figure 14:
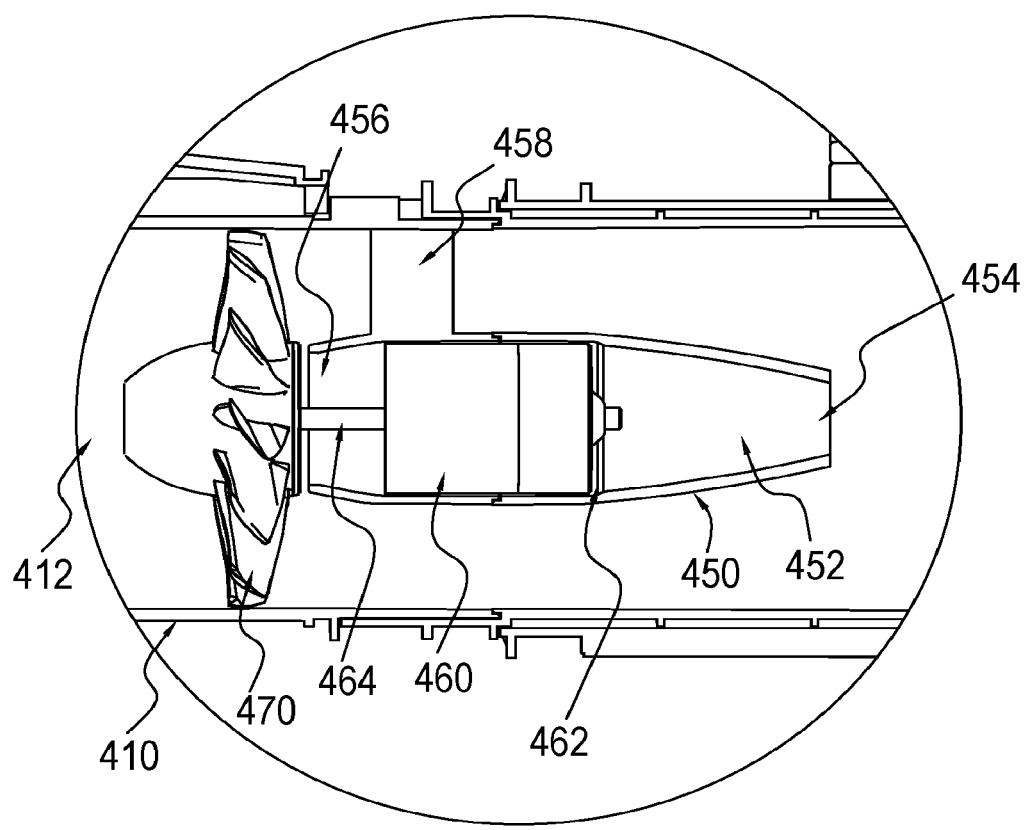
FIG. 14 illustrates a magnified view of a cross-section of the exemplary part of FIG. 13.

FIG. 13 illustrates a magnified perspective view of a part of power tool 400. FIG. 14 illustrates a magnified view of a cross-section of the part of FIG. 13. As shown in FIGS. 11-14, in some embodiments, power tool 400 has a motor housing 450 having motor 460 installed therein. Motor housing 450 is located in airway 412 such that the center of mass and/or the axis of rotation of motor 460 is aligned with axis A. In some embodiments, motor housing 450 is an integral part of pipe 410. In other embodiments, motor housing 450 is a separate part installed in airway 412 of pipe 410 via a suitable connective structure 458. In some embodiments, connective structure 458 between motor housing 450 and pipe 410 may provide a passage for electrical connections to motor 460, such as electrical wires connecting motor 460 to battery package 500 or other electronic circuits or components.

The structure of motor housing 450 and/or connective structure 458 between motor housing 450 and pipe 410 may allow force, e.g., force generated inside pipe 410, to be transferred to the walls and/or outside surface of pipe 410. The walls and/or surface of pipe 410 may then transfer the force to backpack apparatus 200 via connecting member 300. For example, the rotation of air-generating device 470 may generate a reaction force when propelling an air flow along axis A. The reaction force is transferred to motor 460 via motor shaft 464. Motor shaft 464 then transfers the reaction force to motor housing 450 and/or connective structure 458, which then transfers the reaction force to pipe 410. Pipe 410 than transfers the reaction force to backpack apparatus 200 via connecting member 300. Such transferring of a reaction force generated during the creating of the air flow to backpack apparatus 200 reduces the force transferred to handle 430 and the user, and thus increases comfort, reduces fatigue, and increases the period of time for the user to operate power tool 400.

The weight of motor 460 may constitute a large portion of the total weight of power tool 400. Thus the center of mass or center of gravity of power tool 400 may be adjacent or close to motor 460 and/or motor housing 450. In some embodiments, motor housing 450 may be installed at a location near handle 430 in airway 412 to reduce the effect of the weight of power tool 400 on the movement and/or control of handle 430. For example, as shown in FIGS. 11 and 12, the center of gravity of power tool 400, point "G," is located near motor housing 450 and below handle 430. In some embodiments, the location of motor 460 and/or motor housing 450 along pipe 410 may be where part 420 is located such that the weight of motor 460 and/or motor housing 450 may be substantially transferred to connecting member 300, and then to backpack apparatus 200, for example, to reduce fatigue of the user.

As shown in FIGS. 11-14, in some embodiments, power tool 400 includes an internal cooling fan 462 to generate an internal air flow to cool motor 460 and/or other components of power tool 400, such as electronic circuits or controls. Fan 462 may be an axial fan. As shown in FIGS. 11-14, fan 462 is connected to motor 460, e.g., by a shaft, and is powered or driven by motor 460.

In some embodiments, as shown in FIG. 14, motor housing 450 includes an inner chamber 452, a first opening 454, and a second opening 456. Fan 462 is positioned inside motor housing 450. In some embodiments, when power tool 400 is a blower, the air flow generated by fan 462 may flow from opening 454, into chamber 452, pass through motor 460, taking the heat generated by motor 460, and then exit from opening 456. In other embodiments, when power tool 400 is a vacuum, the air flow generated by fan 462 may flow from opening 456, pass through motor 460, taking the heat generated by motor 460, into chamber 452, and then exit from opening 454.

As shown in FIGS. 11-14, fan 462 and air-generating device 470 are designed to be located on two opposite sides of motor 460 along axis A. The structures and/or rotation of fan 462 are designed to generate an air flow that has an opposite direction from that generated by air-generating device 470. Thus at least a portion of the air flow generated by fan 462 and a portion of the air flow generated by air-generating device 470 form a circulating air flow around motor 460. For example, when power tool 400 is a blower, the direction of the air flow generated by air-generating device 470 is from inlet 414 to outlet 416. In such instances, the direction of the air flow generated by fan 462 is from opening 454 to opening 456. The air flow exiting from opening 456 is then propelled by air-generating device 470 towards outlet 416. Because a pressure difference exists between chamber 452 and airway 412 when fan 462 operates, at least a portion of the air flow propelled by air-generating device 470 towards outlet 416 enters opening 454 and then moves towards opening 456. Such circulated air flow surrounding motor 460 and/or other components inside motor housing 450 may increase dissipation of the heat generated by motor 460. This may increase the life of power tool 400, and may increase the safety for using power tool 400. When power tool 400 is a vacuum, the circulated air flow surrounding motor 460 is in the opposite direction from that described above.

In some embodiments, as shown in FIGS. 11 and 12, power tool 400 includes at least one electronic circuit board 480. Circuit board 480 is electrically connected to at least motor 460, user controls and/or control circuits in handle 430, and/or battery package 500 of backpack apparatus 200. Thus circuit board 480 may control the operation of motor 460. In some embodiments, to reduce the lengths of power cords between circuit board 480 and motor 460, handle 430, and/or battery package 500 of backpack apparatus 200, circuit board 480 is installed between inlet 414 and handle 430. In some embodiments, to increase the dissipation of the heat generated by circuit board 480, circuit board 480 is installed adjacent inlet 414 such that a portion of the air flow passing through inlet 414 may take away the heat.

Figure 15:
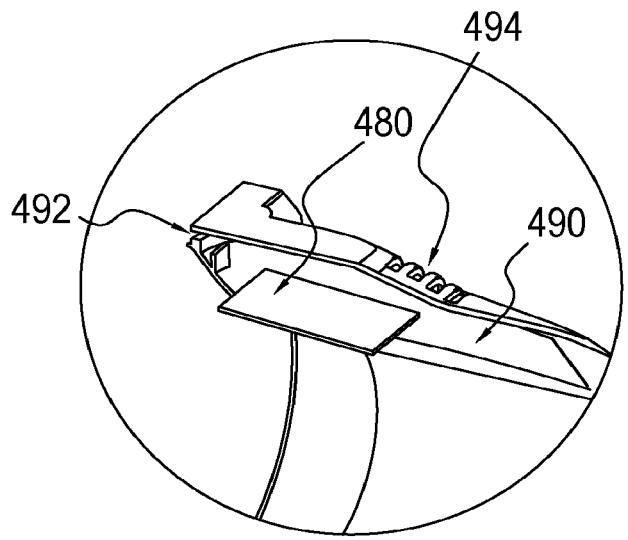
FIG. 15 illustrates a magnified perspective view of another exemplary part of the power tool of FIG. 10.
Figure 16:
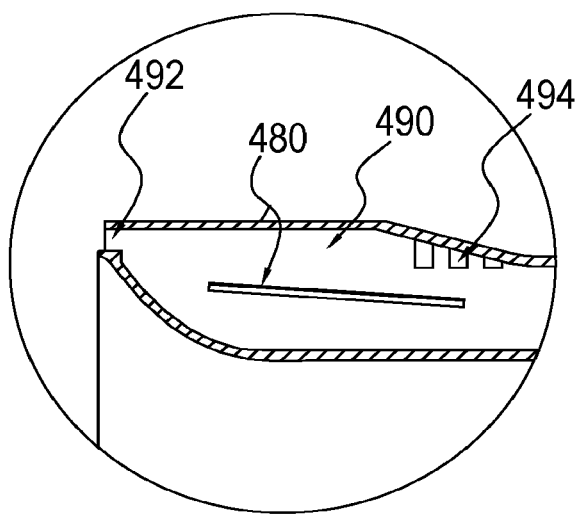
FIG. 16 illustrates a magnified view of a cross-section of the exemplary part of FIG. 15.

In some embodiments, as shown in FIGS. 11 and 12, power tool 400 further includes a ventilated chamber 490 having circuit board 480 installed therein. Chamber 490 may allow cooling of circuit board 480 when power tool 400 operates. FIG. 15 illustrates a magnified perspective view of circuit board 480 and chamber 490. FIG. 16 illustrates a magnified view of a cross-section of the part shown in FIG. 15.

As shown in FIGS. 15 and 16, chamber 490 is located adjacent to inlet 414 of pipe 410. Chamber 490 includes at least one air inlet 492 and at least one air outlet 494. Inlet 492 may be located at the edge of inlet 414. In some embodiments, mesh 440 covers inlet 414 including inlet 492. Outlet 494 may be located between inlet 414 and outlet 416, e.g., between inlet 414 and handle 430. When motor 460 of power tool 400 drives air-generating device 470 to create an air flow, the pressure in airway 412, e.g., near inlet 414, decreases and become lower than that outside pipe 410. This pressure difference between airway 412 and outside environment of pipe 410 drives an air flow into inlet 492, which then flows out of outlet 494.

Circuit board 480 may be installed by any suitable mechanical means inside chamber 490 between inlet 492 and outlet 494. For example, circuit board 480 may be installed at a place such that the air flow from inlet 492 to outlet 494 passes by circuit board 480, thereby taking away the heat generated by circuit board 480. In some embodiments, chamber 490 is separated from airway 412 so that the air flow to pass through chamber 490 does not enter airway 412, and thus is substantially restricted to flow from inlet 492 to outlet 494 to pass by and cool circuit board 480.

Figure 17A:
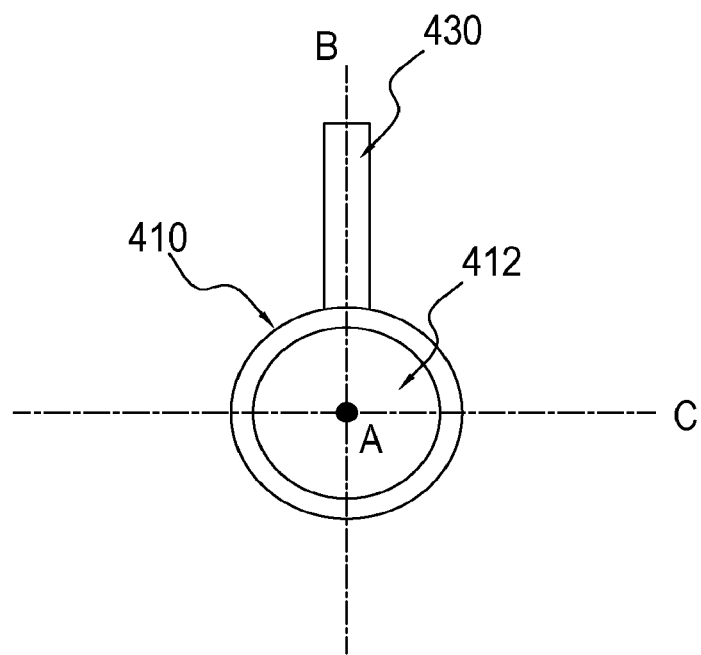
FIG. 17A illustrates an exemplary cross-section of the exemplary power tool of FIG. 10.
Figure 17B:
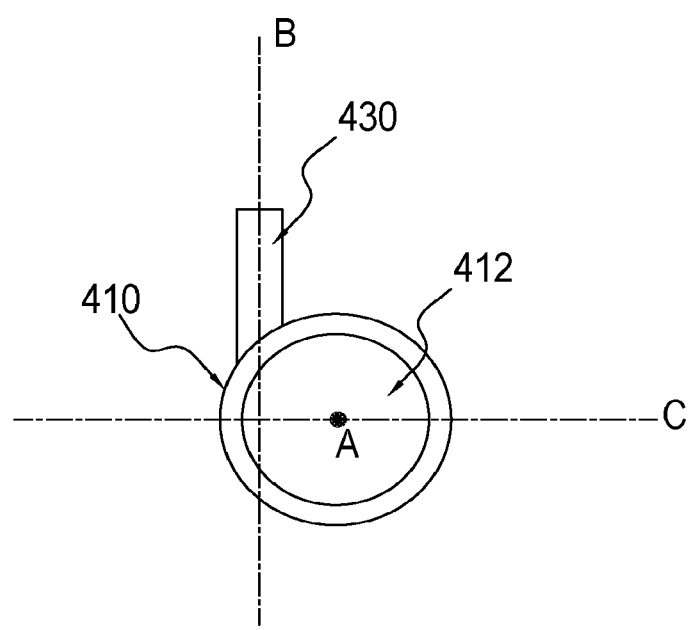
FIG. 17B illustrates another exemplary cross-section of the exemplary power tool of FIG. 10.

FIGS. 17A and 17B illustrate exemplary cross-sections of power tool 400 at the location of handle 430. The cross-sections shown in FIGS. 17A and 17B are perpendicular to axis A of pipe 410. To further illustrate various configurations of handle 430, axis B and axis C are shown in FIGS. 17A and 17B. Axis B is perpendicular to axis C in the plane of the cross-sections shown in FIGS. 17A and 17B. Both axes B and C are perpendicular to axis A. In some embodiments, axis B is a longitudinal axis of handle 430. In other embodiments, axis B is a projection of the longitudinal axis of handle 430 in the plane of the cross-sections shown in FIGS. 17A and 17B.

As shown in FIGS. 17A and 17B, axis B passes across the cross-section of airway 412. In some instances, axis B passes through the center of the cross-section of airway 412, as shown in FIG. 17A. In other instances, axis B passes across the cross-section of airway 412, but does not pass through the center of the cross-section of airway 412, as shown in FIG. 17B. In some embodiments, the position of axis B along axis C in the cross-sections shown in FIGS. 17A and 17B may be predetermined or adjustable by the user to increase the comfort and/or convenience for using power tool 400, and/or to reduce fatigue for long periods of operation of power tool 400. In other embodiments, the position of axis B along axis C may be changed to be suitable for particular types of power tool 400.

In some embodiments, the longitudinal axis of handle 430 is at an angle to axis A. The angle between the longitudinal axis of handle 430 and axis A may range from about 20° to about 40°, from about 40° to about 60°, from about 60° to about 80°, from about 45° to about 80°, from about 45° to about 90°, from about 30° to about 60°, from about 60° to about 90°, or from about 30° to about 90°. The angle between the longitudinal axis of handle 430 and axis A may be designed to increase the comfort, effectiveness, and/or flexibility for the user to control handle 430 and/or power tool 400. For example, the angle may be selected to allow the forearm of the user to be approximately parallel to axis A of pipe 410. In other embodiments, the angle may be adjustable based on the need of the user and/or the type of power tool 400.

Figure 18:
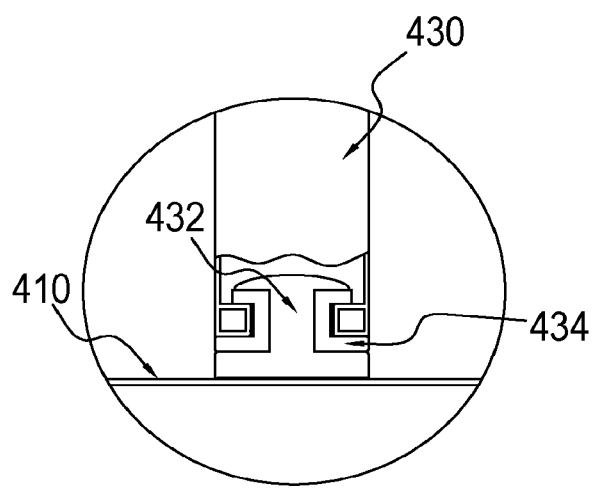
FIG. 18 illustrates a magnified view of a cross-section of an exemplary part of the exemplary power tool of FIG. 10.

FIG. 18 illustrates a magnified view of a cross-section of a part of handle 430. As shown in FIG. 18, in some embodiments, handle 430 includes a fixing pillar 432 and a damping element 434. Fixing pillar 432 is fixedly connected to the body of power tool 400, e.g., pipe 410 of power tool 400. Damping element 434 may be a compressible and resilient part, such as a gasket. Damping element 434 may be made a polymer material, such as rubber or polyethylene. In some embodiments, damping element 434 surrounds pillar 432 and damps the force transferred between power tool 400 and handle 430, such as the reaction force transferred from pipe 410 to handle 430 during the operation of power tool 400. Damping element 434 may reduce the fatigue and/or increase the flexibility for the user to operate and control power tool 400, and thus may increase the period of operation and/or may improve user experience.

As described herein, additional various embodiments of system 100 are described below. The modifications and changes in the additional embodiments may be made without departing from the scope of the above-described embodiments. Same reference numbers are used to represent the same or similar parts of system 100. The structures and functions of the parts represented by the same reference numbers are not reiterated below unless modifications are made to these parts, and/or additional structures or functions are included in the embodiments described below. Those of ordinary skill in the art in view of the disclosure herein will recognize that features of one or more of the embodiments described in the present disclosure may be selectively combined or alternatively used.

Figure 19:
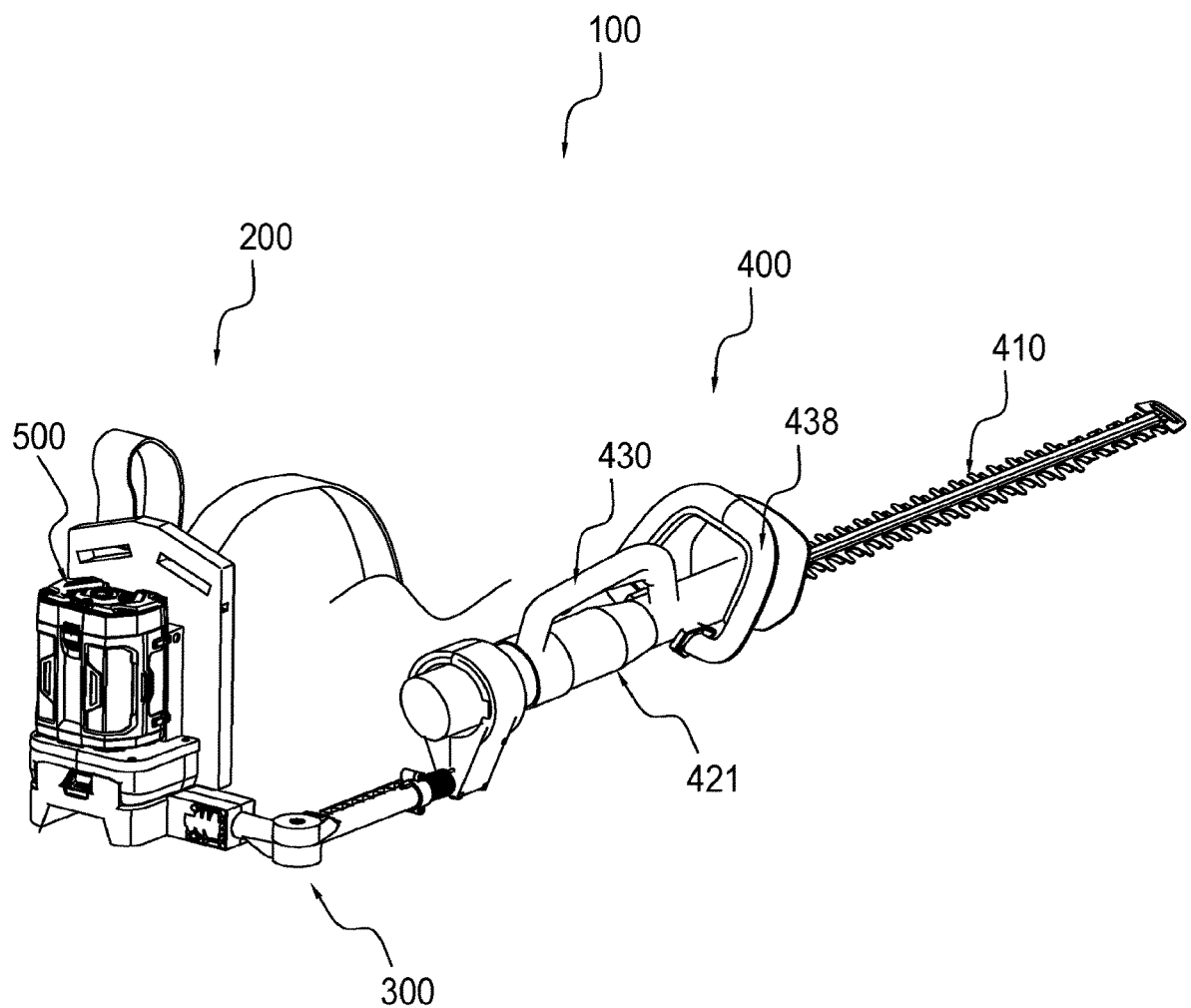
FIG. 19 illustrates a perspective view of another exemplary back-mounted power tool system, according to embodiments of the present disclosure.
Figure 20:
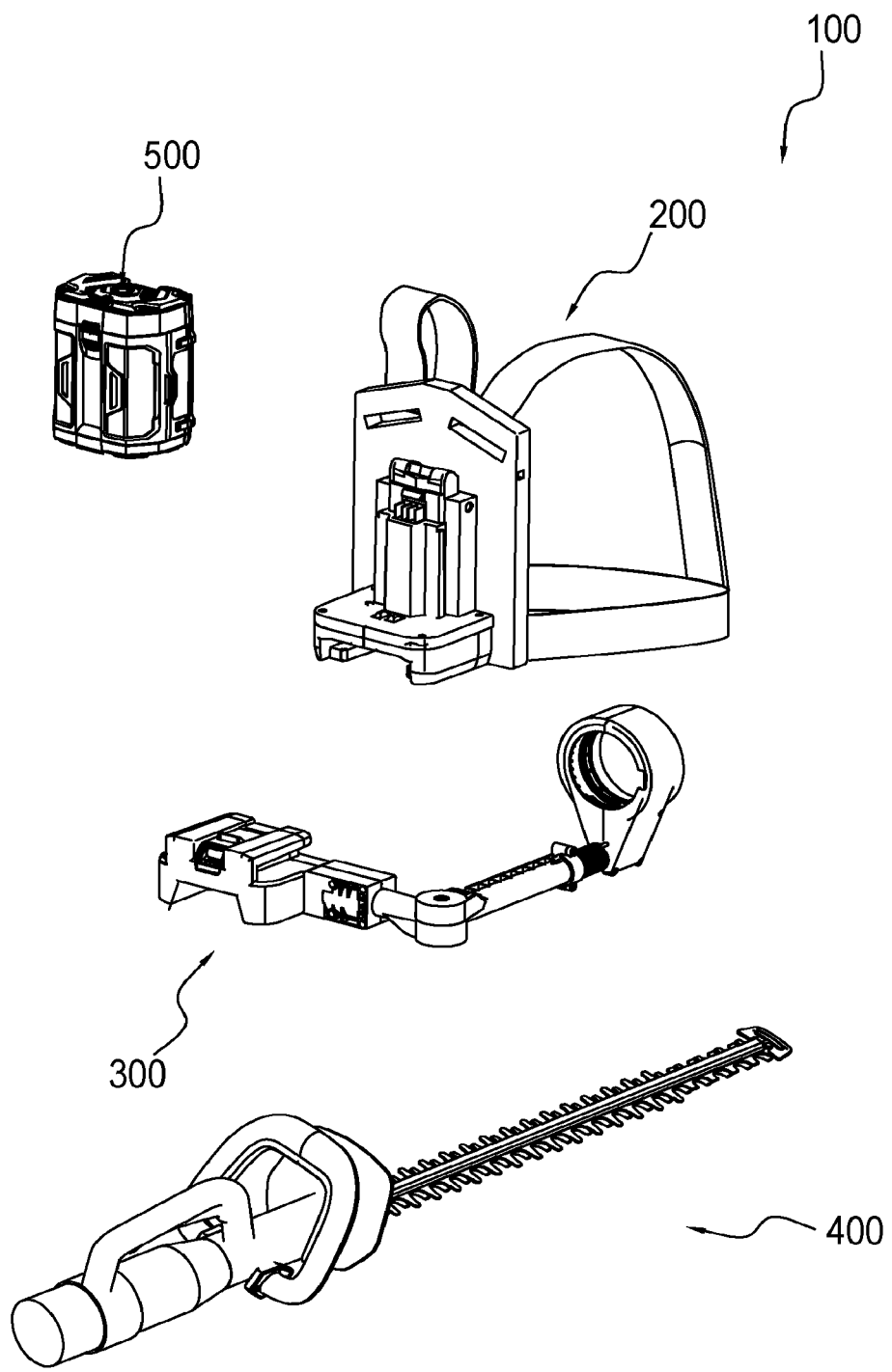
FIG. 20 illustrates an exploded perspective view of the exemplary back-mounted power tool system of FIG. 19.

FIGS. 19 and 20 illustrate an exemplary back-mounted power tool system 100. FIG. 19 illustrates a perspective view of system 100. FIG. 20 illustrates an exploded perspective view of system 100. As shown in FIGS. 19 and 20, power tool 400 is a hedge trimmer. Power tool 400 includes a cutting device 410, a body 421, and a handle 430. In some embodiments, cutting device 410 has an elongated shape and a plurality of blades 410 spaced along its length. Cutting device 410 may be removable and replaceable. Body 421 houses a motor that connects to cutting device 410 via any suitable transmission shaft to drive the blades to move back and forward along the length of cutting device 410. Handle 430 may have one or more features as described above. In some embodiments, power tool 400 may include a front handle 438 that can be used for holding and/or controlling power tool 400. The use of both handles 430 and 438 may increase the comfort, control, flexibility, convenience, and/or safety for the user while using power tool 400 to trim or prune hedges or trees in any direction.

As shown in FIGS. 19 and 20, connecting member 300 connects power tool 400 to backpack apparatus 200. Power tool connector 320 may connect to any suitable part of power tool 400. In some embodiments, power tool connector 320 clamps power tool 400 at a location near the center of gravity of power tool 400. In other embodiments, power tool connector 320 clamps at a location between one end of power tool 400 and handle 430. Connecting member 300 may transfer a force from power tool 400 to backpack apparatus 200. For example, when power tool 400 trims or cuts some trees or objects, movement of cutting device 410 generates an action force. Cutting device 410 and body 421 of power tool 400 thus receives a reaction force from the trees or objects. Connecting member 300 may transfer the received reaction force from power tool 400 to backpack apparatus 200, which may reduce the work of the user for controlling and/or holding power tool 400, which can improve user experience, reduce fatigue of the user's arms, and increase the time period for the user to operate power tool 400.

Figure 21:
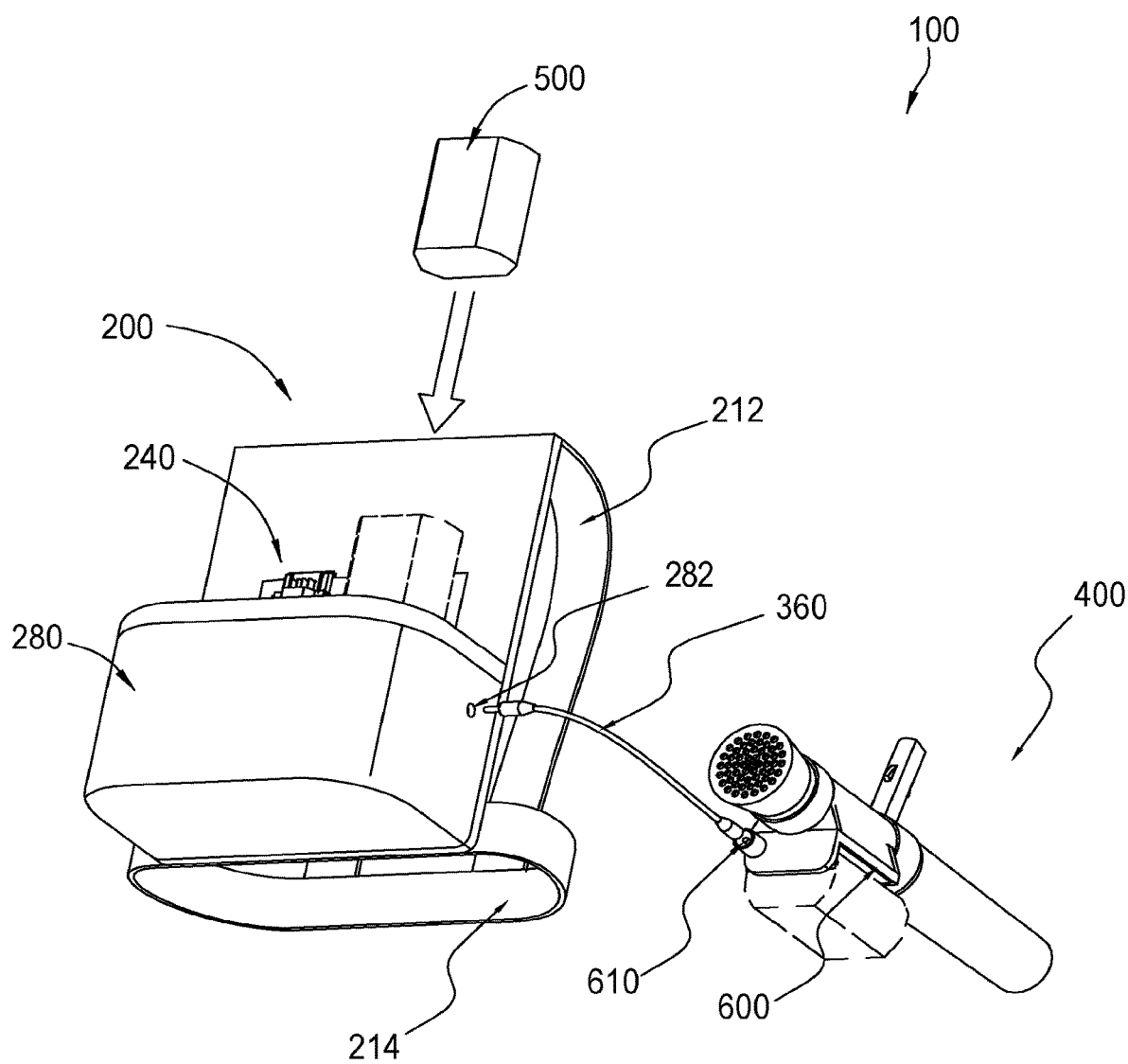
FIG. 21 illustrates a perspective view of another exemplary back-mounted power tool system, according to embodiments of the present disclosure.
Figure 22:
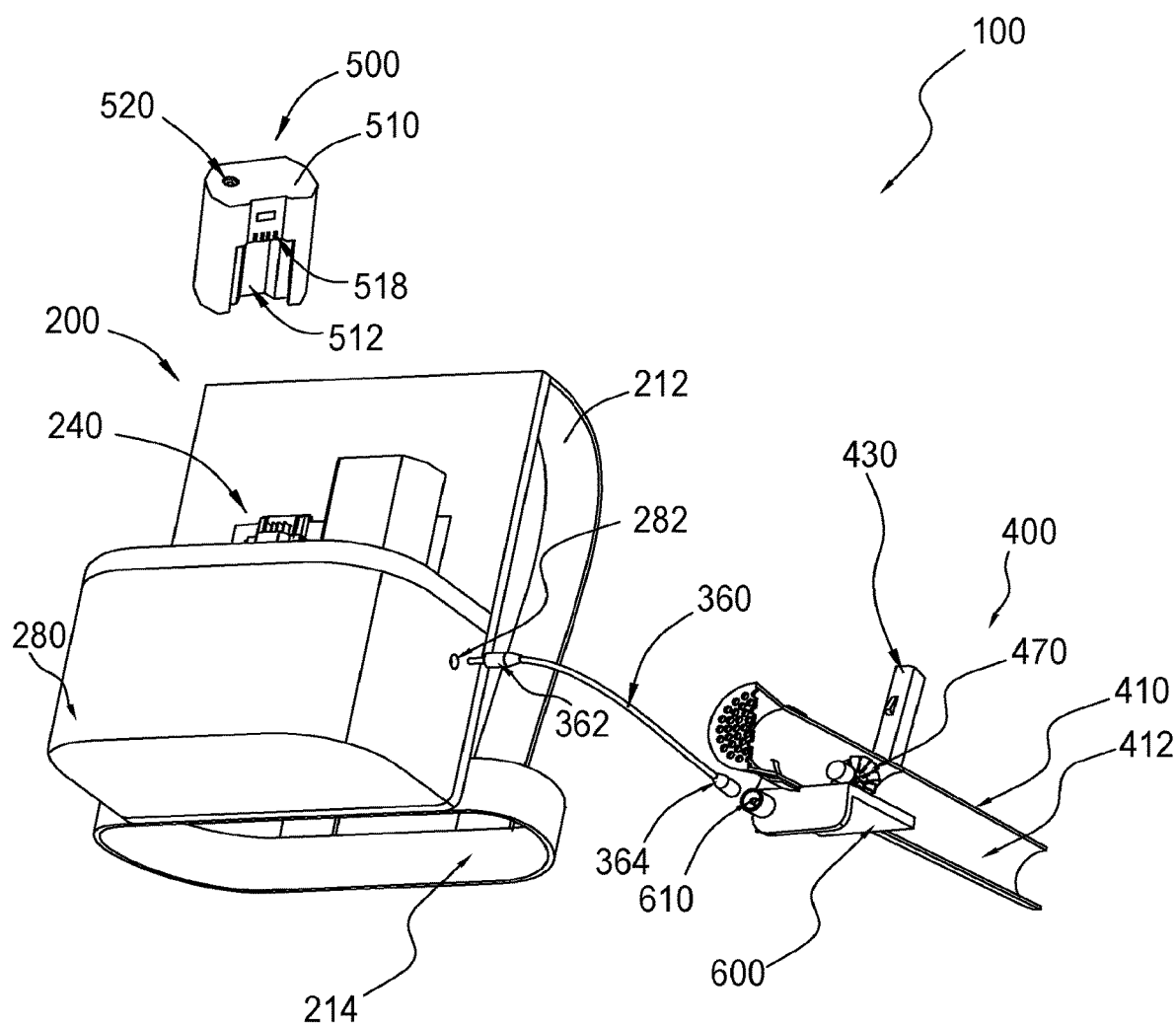
FIG. 22 illustrates another perspective view of the exemplary back-mounted power tool system of FIG. 21, according to embodiments of the present disclosure.

FIG. 21 illustrates a perspective view of an exemplary back-mounted power tool system 100. FIG. 22 illustrates a perspective view of embodiments of system 100 of FIG. 21. As shown in FIGS. 21 and 22, system 100 includes backpack apparatus 200, power tool 400, and power cord 360. Backpack apparatus 200 has two connectors 240 that may couple two battery packages 500. The coupling of battery package 500 to connector 240 may be substantially the same as described above. In some embodiments, backpack apparatus 200 further includes at least one chamber 280. Chamber 280 is enclosed by a casing. Chamber 280 may include electronic circuits and electronic components (not shown) that control and/or regulate the power supply from battery package 500 to backpack apparatus 200, and then to power tool 400. In some embodiments, the casing of chamber 280 may enclose base member 250 (shown in FIG. 2) of backpack apparatus 200.

In some embodiments, backpack apparatus 200 serves as a power supply to power tool 400 or a power transfer/adapter unit by conducting power supply from battery package 500 to power tool 400. For example, electrical terminal 248 (shown in FIG. 3) of connector 240 serves as a power inlet to receive power supply and/or current from battery package 500. As shown in FIGS. 21 and 22, backpack apparatus 200 includes a power outlet 282 to transfer power and/or current supplied by battery package 500 to power tool 400 via power cord 360, for example. In some embodiments, the electronic circuits contained in chamber 280 provide a passage for the transfer of the power and/or current. In other embodiments, an electrical wire (not shown) may connect electrical terminal 248 to outlet 282 to transfer the power and/or current of battery package 500 to power tool 400. As shown in FIGS. 21 and 22, in some embodiments, outlet 282 is placed in the casing of chamber 280.

In some embodiments, the electronic circuits contained in chamber 280 may control the transfer of power and/or current supplied by battery package 500 to power tool 400, such as by turning on or off of the conduction of current, regulating the magnitude of the output current or voltage of outlet 282, and/or adapting the output current or voltage of outlet 282 to a particular power tool 400. The power for the electronic circuits contained in chamber 280 may be supplied by battery package 500, or may be supplied by a battery included in chamber 280. The power supply to backpack apparatus 200 may come from any battery package 500 coupled to connector 240.

In some embodiments, backpack apparatus 200 includes built-in battery cells and an AC power inlet. The built-in battery cells may be charged and thus stores electrical energy by receiving AC power supply via the AC power inlet. The built-in battery cells may be contained in chamber 280. The built-in battery cells loaded with electrical energy may supply power and/or current to the electronic circuits contained in chamber 280, to battery package 500 via electrical terminal 248, and/or to power tool 400 via outlet 282. In other embodiments, the power received by the AC power inlet of backpack apparatus 200 may be used to charge battery package 500 via electrical terminal 248, and/or to supply power and/or current to power tool 400 via outlet 282. In some embodiments, backpack apparatus 200 includes cables and connectors to electrically connect the AC power inlet to an AC power supply. The cables and connectors may be placed in chamber 280 when not in use.

As shown in FIGS. 21 and 22, in some embodiments, power tool 400 includes a battery connector 600. Battery connector 600 may include a power inlet 610. Power cord 360 may connect power outlet 282 to power inlet 610 to supply power and/or current to power tool 400, e.g., a motor of a blower or trimmer. As shown in FIG. 22, power cord 360 has a first connector 362 at one end that is suitable for connecting to power outlet 282. Power cord 360 has a second connector 364 at the other end that is suitable for connecting to power inlet 610. The connectors of power outlet 282, power inlet 610, and connectors 362 and 364 may be any suitable type of electrical connectors.

Figure 23:
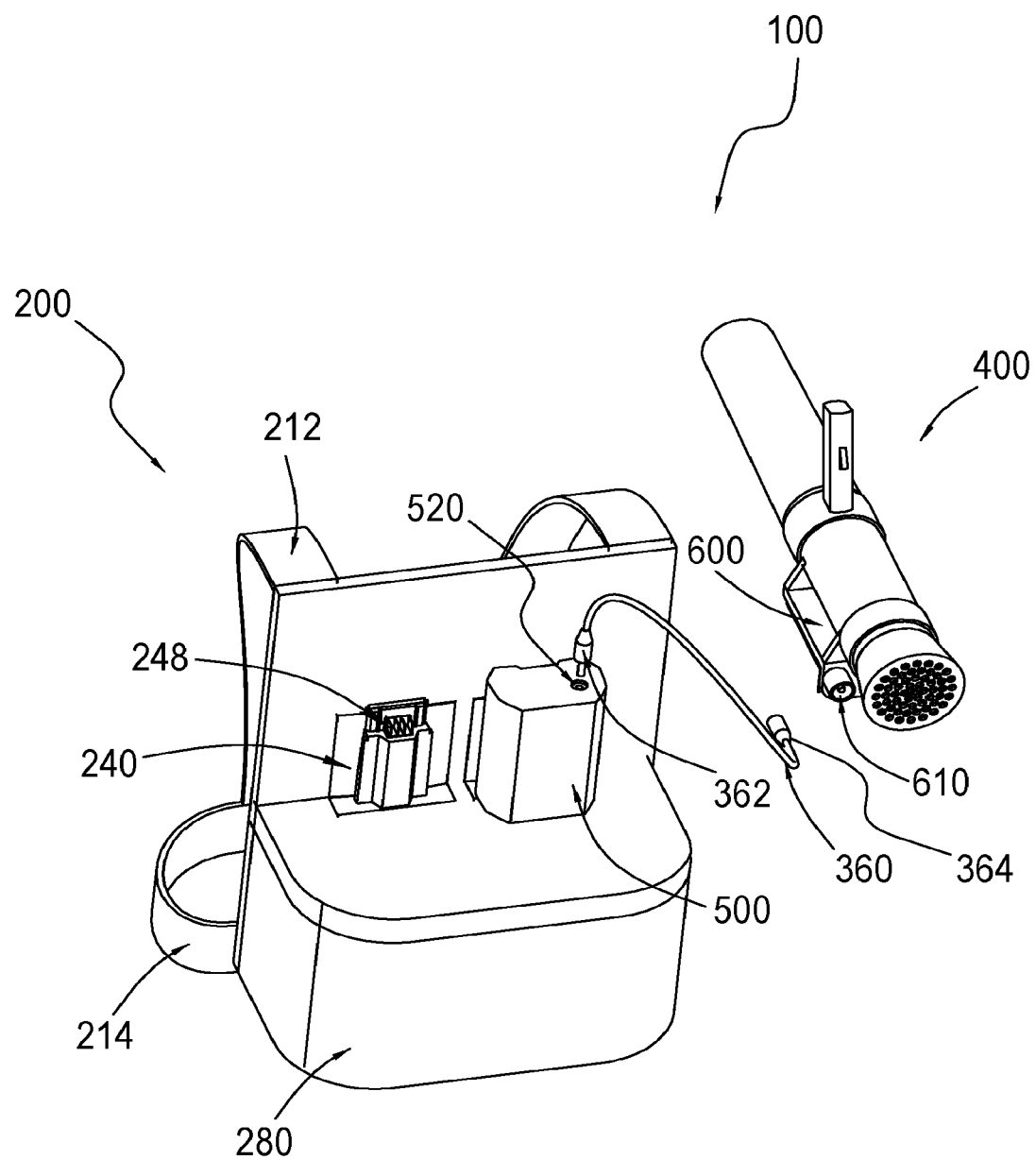
FIG. 23 illustrates another perspective view of the exemplary back-mounted power tool system of FIG. 21, according to embodiments of the present disclosure.

FIG. 23 illustrates another perspective view of system 100. In some embodiments, as shown in FIG. 23, battery package 500 includes a power outlet 520. In such instances, electrical power, energy, and/or current may be directly transferred from battery package 500 to power tool 400. For example, first connector 362 of power cord 360 may connect to power outlet 520 of battery package 500, and second connector 364 of power cord 360 may connect to power inlet 610 of power tool 400. In such instances, backpack apparatus 200 serves to provide support for battery package 500 and reduces the effect of the weight of battery package 500 on the operation of power tool 400.

Figure 24:
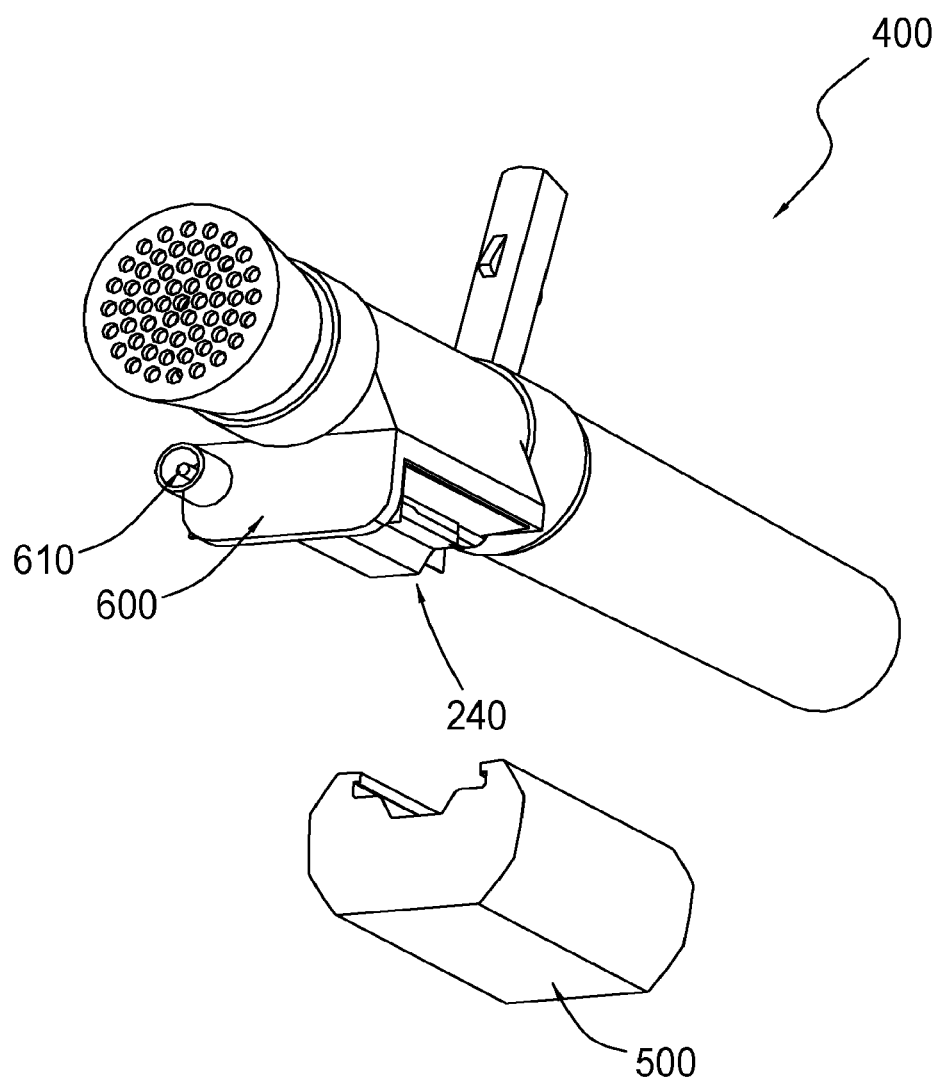
FIG. 24 illustrates perspective views of an exemplary power tool and an exemplary battery package of the exemplary back-mounted power tool system of FIG. 21, according to embodiments of the present disclosure.
Figure 25:
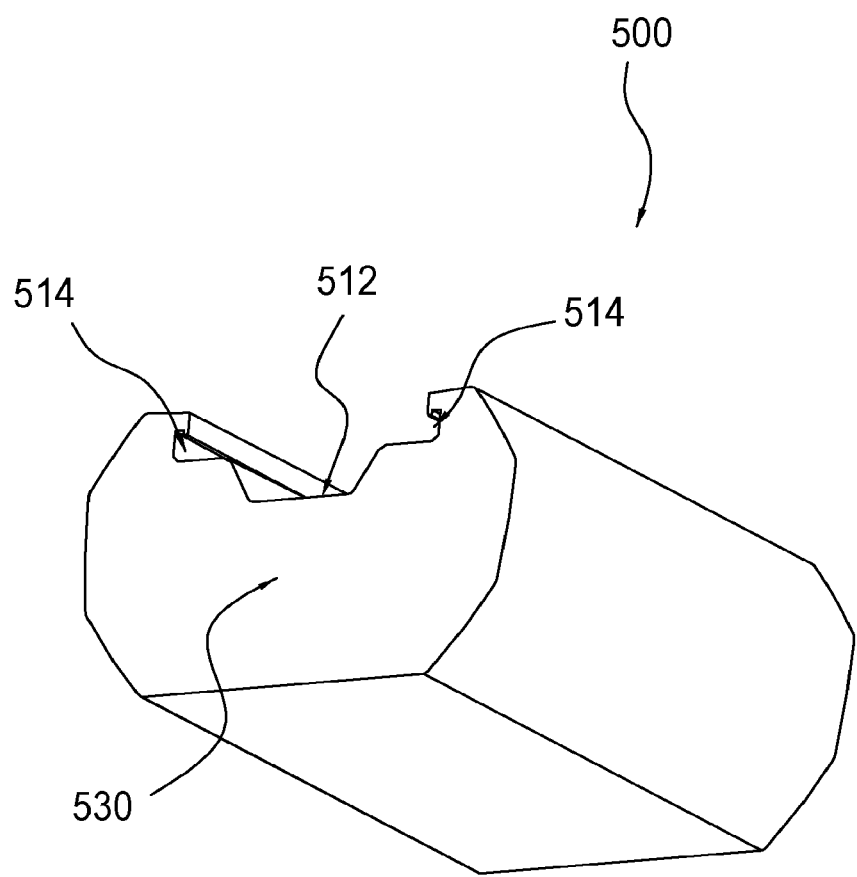
FIG. 25 illustrates a perspective view of the exemplary battery package of FIG. 24, according to embodiments of the present disclosure.
Figure 26:
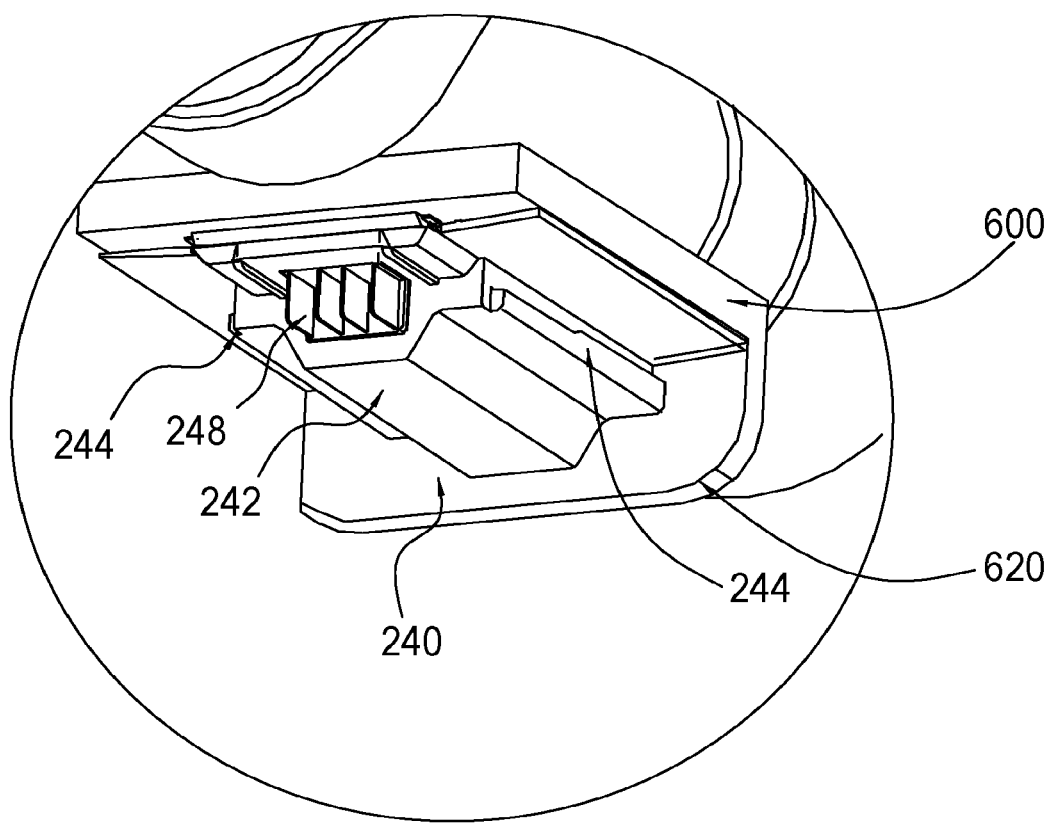
FIG. 26 illustrates a magnified perspective view of an exemplary part of the exemplary power tool of FIG. 24.

FIG. 24 illustrates perspective views of power tool 400 and battery package 500 of system 100. FIG. 25 illustrates a perspective view of battery package 500. FIG. 26 illustrates a magnified perspective view of battery connector 600 of power tool 400. In some embodiments, as shown in FIG. 24, battery connector 600 of power tool 400 includes connector 240 that may couple battery package 500. The coupling structures of connector 240 of battery connector 600 and the fitting structures of battery package 500 are substantially similar to those in the above-described embodiments. In some embodiments, as shown in FIGS. 25 and 26, as battery package 500 moves along connector 240 of battery connector 600, an end surface 530 of battery package 500 may be stopped by a stopping wall 620 of battery connector 600. When battery package 500 is stopped by end surface 530, fastener 246 of connector 240 and locking slot 516 of battery package 500 may interlock, which then locks the position of battery package 500 and prevents battery package 500 from decoupling from battery connector 600.

Figure 27:
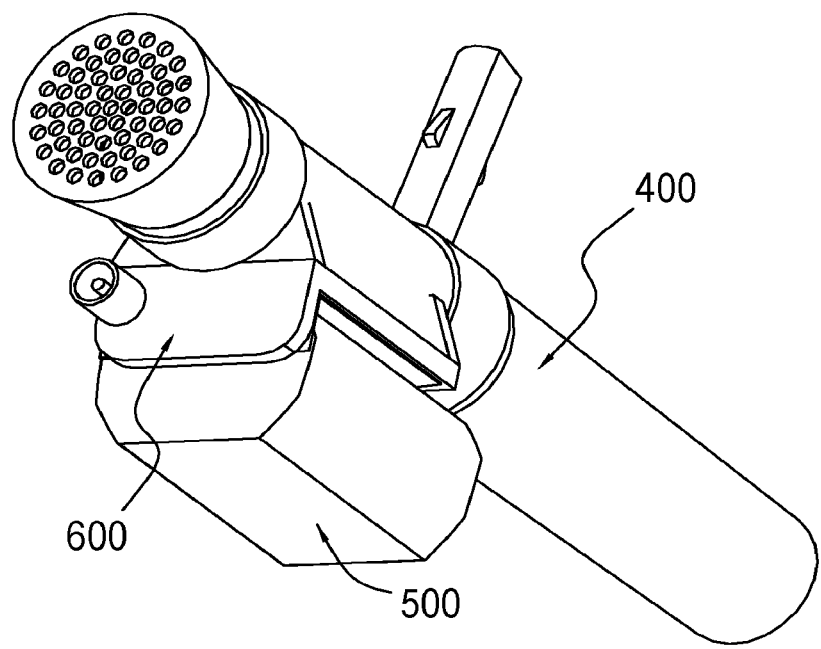
FIG. 27 illustrates a perspective view of the exemplary power tool and battery package of FIG. 24.

FIG. 27 illustrates a perspective view of power tool 400 having battery connector 600 coupled to battery package 500. The coupling of battery package 500 to battery connector 600 allows battery package 500 to directly supply electrical energy, power, and/or current to the motor and/or the electronic circuits of power tool 400. In such instances, power tool 400 and battery package 500 become an integrated part, and may be operated separately from backpack apparatus 200.

Figure 28:
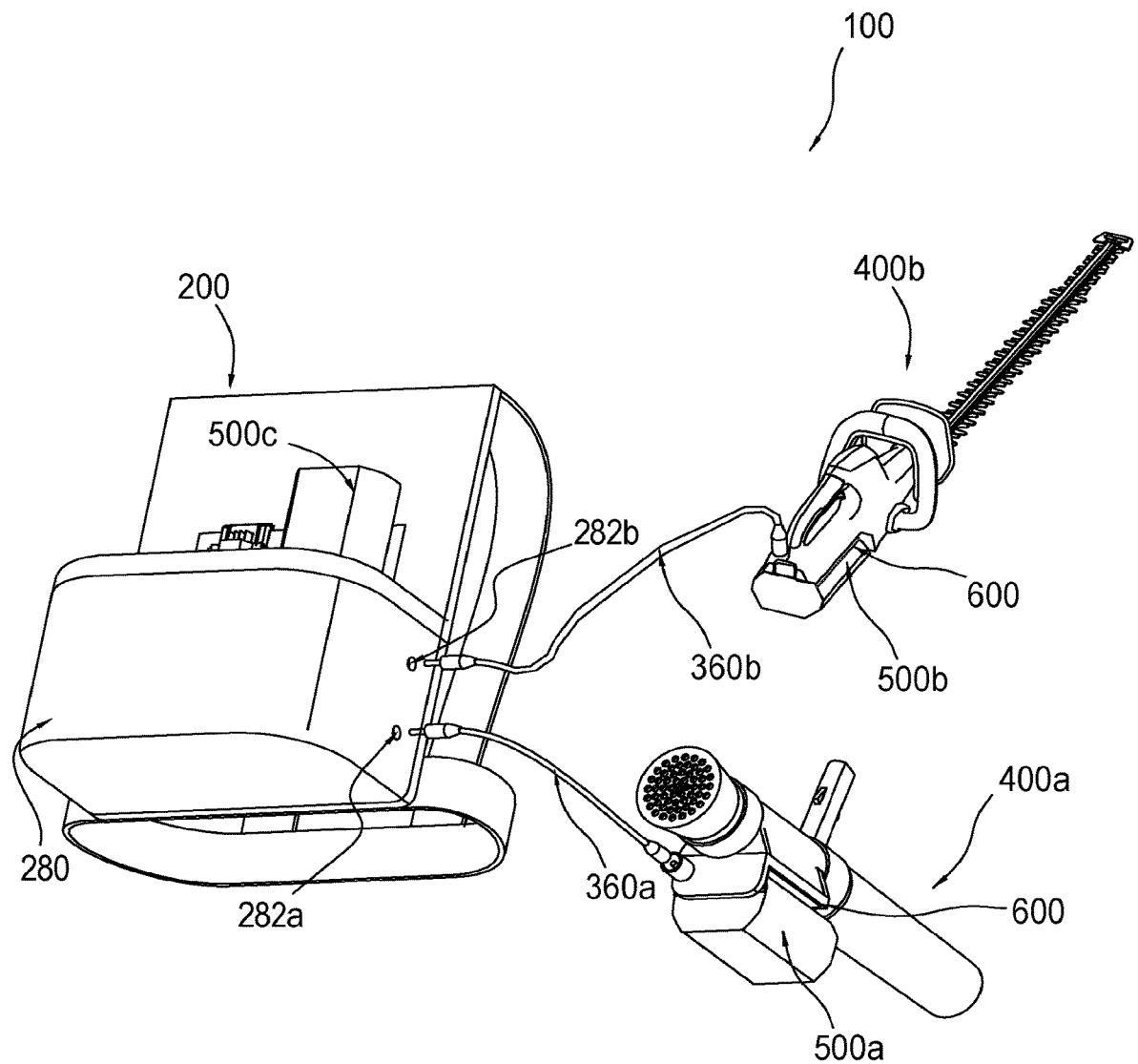
FIG. 28 illustrates a perspective view of another exemplary back-mounted power tool system, according to embodiments of the present disclosure.

As described above, system 100 may include more than one power tools 400. FIG. 28 illustrates a perspective view of an exemplary system 100 including two power tools 400, herein referred to as power tools 400a and 400b. Power tools 400a and 400b may be any type of power tool 400 described above. For example, power tool 400a is a blower and power tool 400b is a hedge trimmer. As shown in FIG. 28, system 100 may include more than one battery packages 500 to supply power to each power tool. For example, system 100 includes three battery packages, herein referred to as battery packages 500a, 500b, and 500c. Power tools 400a and 400b may each include a battery connector 600 to couple one of the battery packages. Backpack apparatus 200 may have one or more connectors 240. The connectors 240 of backpack apparatus 200 and battery connectors 600 are substantially the same. Thus, each battery package may be coupled to any of the connectors 240 of system 100. The interchangeability of the battery packages allows various types of power tools having battery connector 600 to be used in system 100, increasing the versatility and compatibility of system 100.

For example, as shown in FIG. 28, battery packages 500a and 500b are coupled to battery connectors 600 of power tools 400a and 400b respectively. The coupling of battery packages 500a and 500b to power tools 400a and 400b allows the battery packages to directly supply power to the power tools. Battery package 500c may be coupled to backpack apparatus 200 to be used as a backup when either battery package 500a or 500b is partially or fully discharged. In such instances, the discharged battery package 500a or 500b may be decoupled from the corresponding power tool, and may be coupled to connector 240 of backpack apparatus 200. In some embodiments, the discharged battery package 500a or 500b may be recharged when coupled to backpack apparatus 200. The use of backpack battery package 500c and/or recharging of the discharged battery packages may increase the periods of time for operating power tools 400a and 400b.

In some embodiments, as shown in FIG. 28, backpack apparatus 200 includes two power outlets 282, herein referred to as outlets 282a and 282b. System 100 includes two power cords 360, herein referred to as power cords 360a and 360b. As shown in FIG. 28, power cords 360a and 360b may connect outlets 282a and 282b to power inlets 610 of power tools 400a and 400b respectively. In such instances, backpack apparatus 200 may serves as the power supply or a power transfer unit to supply power and/or current to both power tools 400a and 400b. In some embodiments, when power tools 400a and 400b are both coupled to battery packages 500a and 500b respectively, or are connected to backpack apparatus 200 via power cords 360a and 360b respectively, power tools 400a and 400b may be used at the same time. For example, a user may use one hand to control power tool 400a and the other hand to control power tool 400b.

Figure 29:
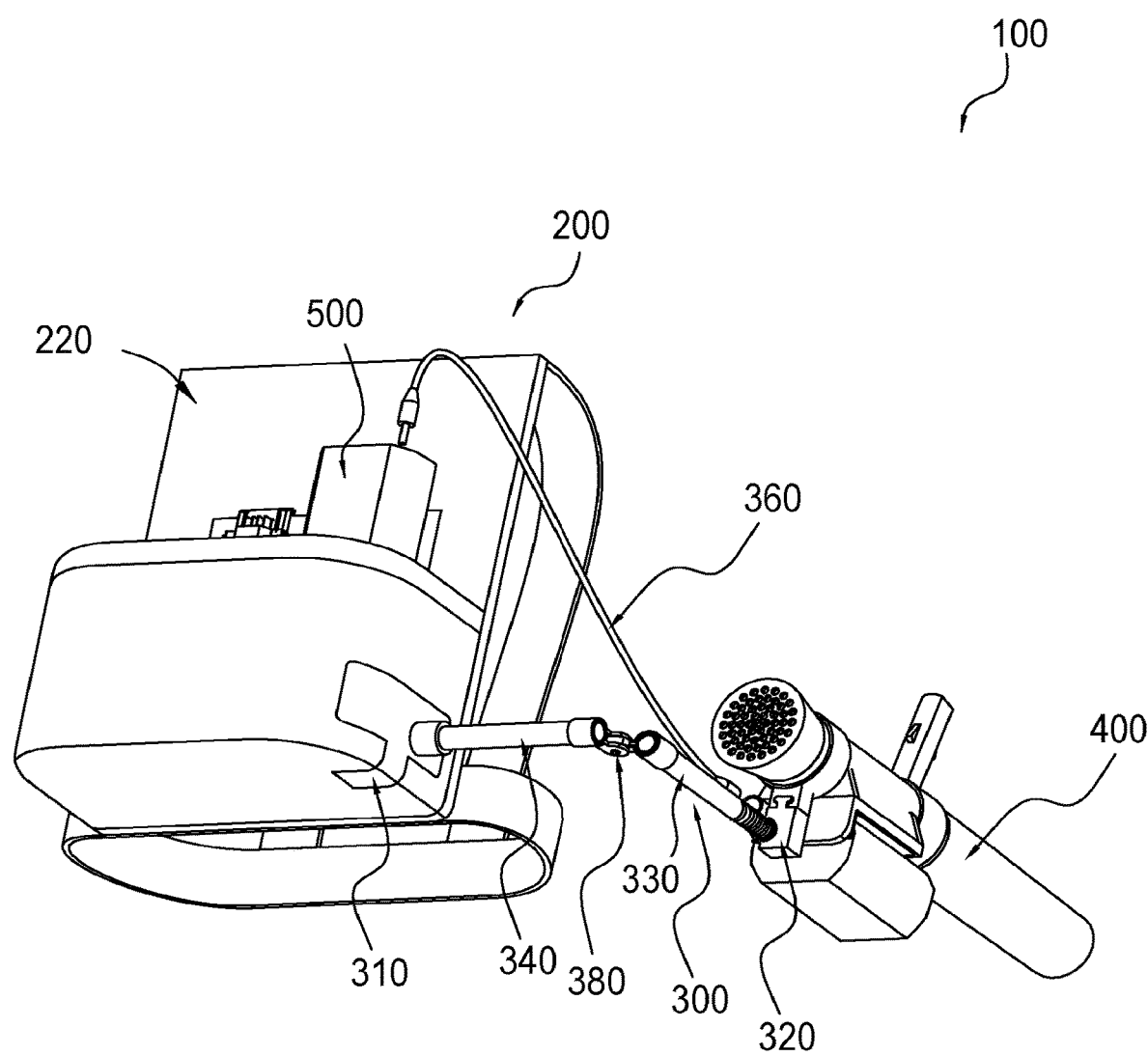
FIG. 29 illustrates a perspective view of another exemplary back-mounted power tool system, according to embodiments of the present disclosure.
Figure 30:
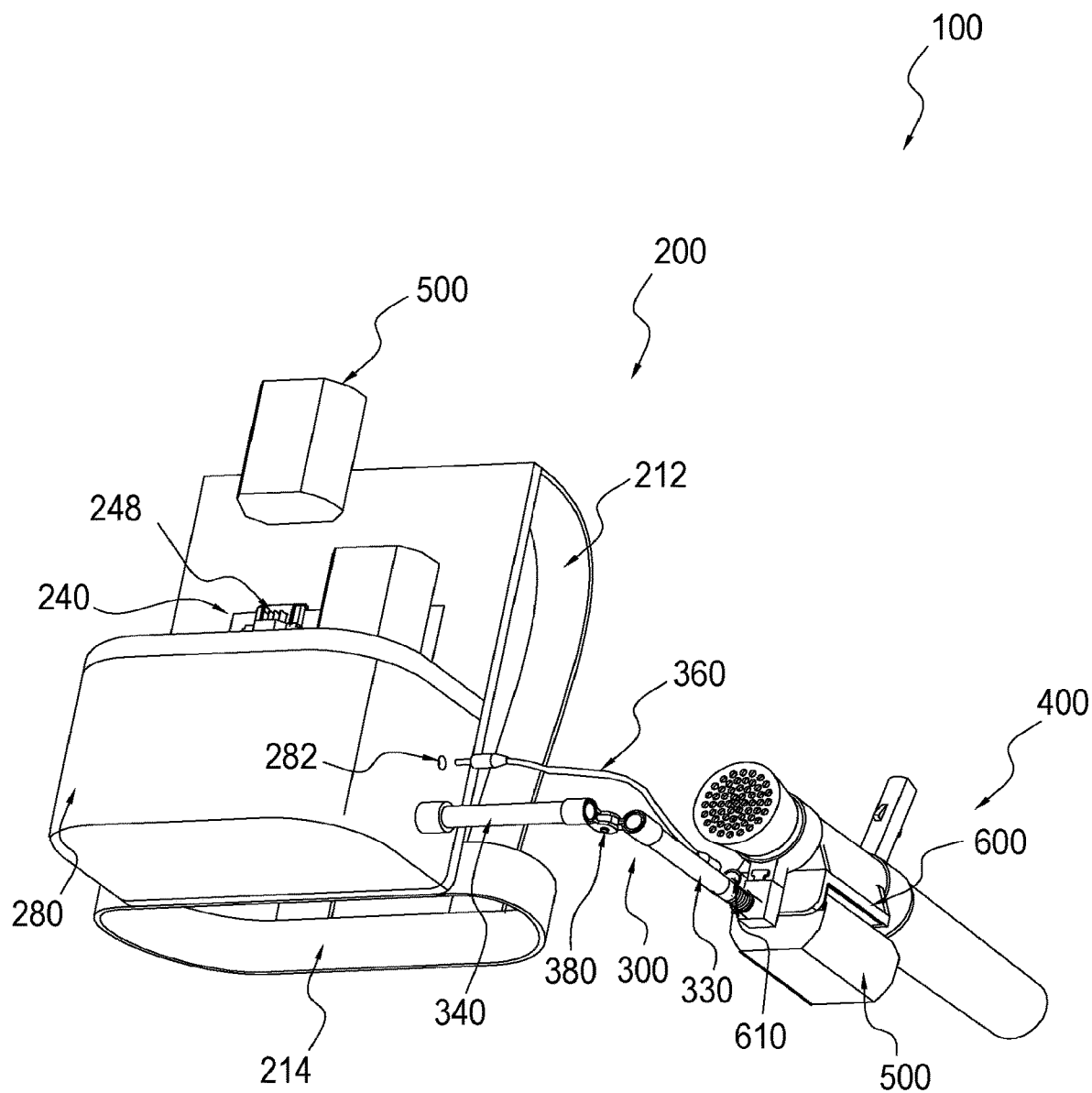
FIG. 30 illustrates another perspective view of the exemplary back-mounted power tool system of FIG. 29, according to embodiments of the present disclosure.

Power tool 400 coupled with battery package 500 may increase the overall weight to be carried with one's hand and arm when operating power tool 400, and thus increases fatigue and/or reduces flexibility of operating power tool 400. System 100 shown in FIGS. 21-23 and 28 may further include connecting member 300. FIGS. 29 and 30 illustrate perspective views of an exemplary back-mounted power tool system 100. System 100 includes backpack apparatus 200, connecting member 300, power tool 400, and power cord 360.

As described above, connecting member 300 may support the weight of power tool 400, and transfer the weight of power tool 400 to backpack apparatus 200 when mounted on the user. Connecting member 300 may allow at least a part of the weight of power tool 400 to be spread over the shoulders, back, and/or waist of the user. Additionally or alternatively, connecting member 300 may transfer a reaction force from power tool 400 to backpack apparatus 200, which may reduce the work of the user for controlling and/or holding power tool 400. Connecting member 300 may thus reduce fatigue of the user's arm and hand for holding power tool 400, improve user experience, and/or increase the flexibility and period of time for operating power tool 400.

As described above and shown in FIGS. 29 and 30, connecting member 300 includes a fitting member 310 that removably or fixedly connects to backpack apparatus 200, a power tool connector 320 that removably or fixedly connects to power tool 400, and a first arm 330 rotatably connected to a second arm 340. In some embodiments, first arm 330 connects to second arm 340 via a hinge 380 such that first arm 330 may rotate around second arm 340 or vice versa. Hinge 380 may be designed to limit the rotational angle between first arm 330 and second arm 340. For example, first arm 330 may rotate up to an angle ranging from about 100° to about 120°, from about 120° to about 140°, from about 140° to about 160°, or from about 160° to about 180° relative to second arm 340.

In some embodiments, fitting member 310 and power tool connector 320 may be substantially the same as described above. In other embodiments, as shown in FIGS. 29 and 30, fitting member 310 may be inserted into a recess of backpack apparatus 200 and then locked in position such that connecting member 300 and backpack apparatus 200 become one integrated part. Similarly, power tool connector 320 may be inserted into a recess of a fixture of power tool 400 and then locked in position such that connecting member 300, power tool 400, and backpack apparatus 200 become one integrated part. As shown in FIGS. 29 and 30, power cord 360 may connect backpack apparatus 200 to power tool 400 via outlet 282 or may connect battery package 500 to power tool 400 via outlet 520 (as shown in FIG. 23) of battery package 500 similarly as described above.

The exposure of battery package 500 and connector 240 on backpack apparatus 200 may not be suitable for using system 100 in outdoor environment, particularly in bad weather, for example, such as wet, humid, snowy, or windy days. Exposing battery package 500 and/or connector 240 to such bad weather may result in damage and/or shorter life of battery package 500 and/or backpack apparatus 200. Thus, in some embodiments, backpack apparatus 200 includes a protective cover that encloses battery package 500 and/or connector 240 in a chamber. The protective cover may be removed and/or openable for the user to retrieve or replace battery package 500.

Figure 31:
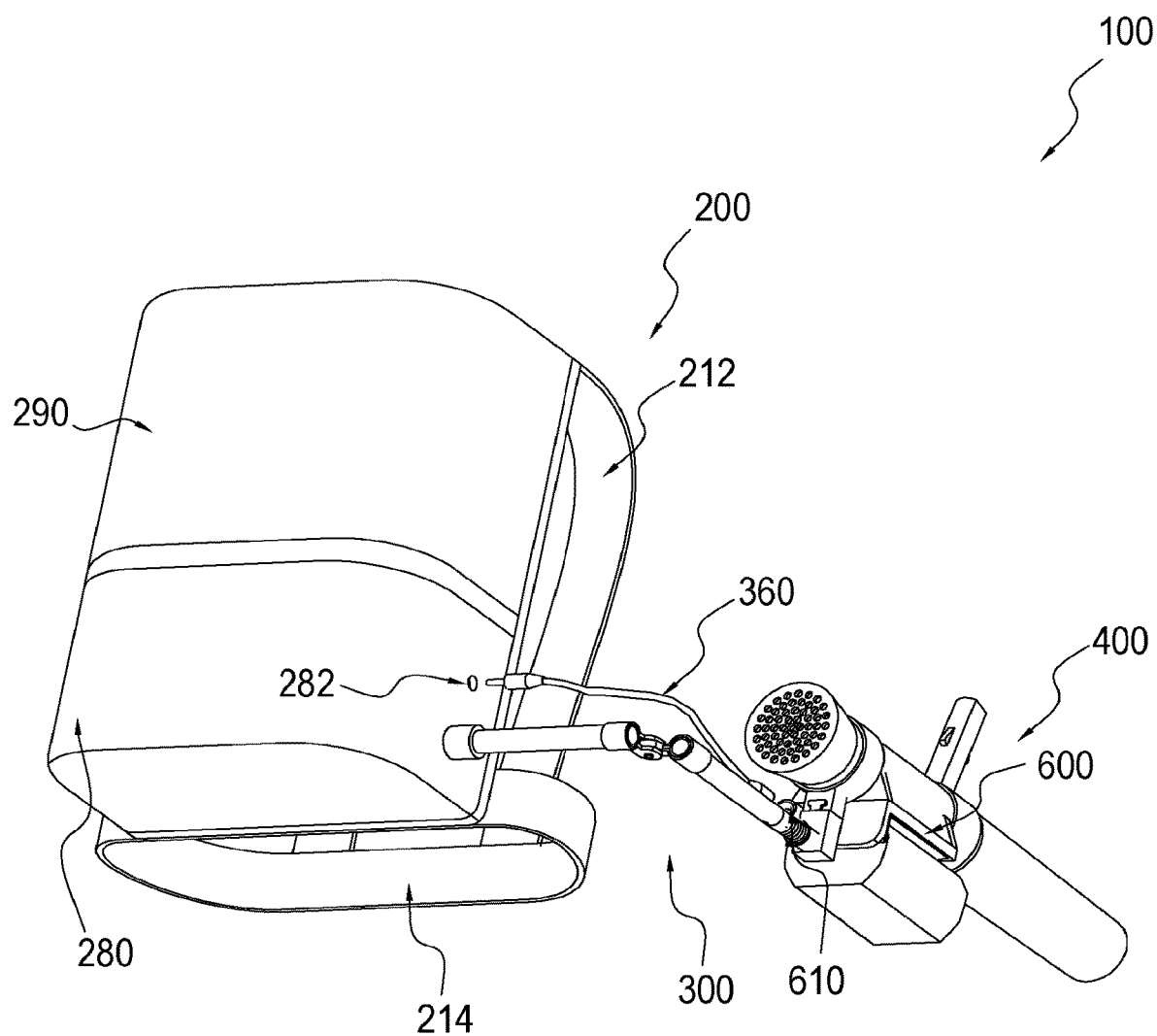
FIG. 31 illustrates a perspective view of another exemplary back-mounted power tool system, according to embodiments of the present disclosure.

FIG. 31 illustrates a perspective view of an exemplary back-mounted power tool system 100. System 100 may include a protective cover 290 that encloses one or more battery packages 500 and/or connectors 240 in a closed chamber. Additionally or alternatively, as described above, backpack apparatus 200 includes built-in battery cells (not shown). The built-in battery cells may be charged via an AC power inlet of backpack apparatus 200 and thus stores electrical energy. The built-in battery cells may be contained in the chamber enclosed by cover 290. In some embodiments, the built-in battery cells may supply electrical power and/or current to electronic circuits contained in backpack apparatus 200, and then to power tool 400. In other embodiments, the built-in battery cells may supply electrical power and/or current to power tool 400 via power cord 360, to battery package 500 coupled to connector 240, or to battery package 500 coupled to power tool 400 via outlet 282 and power cord 360.

In some embodiments, backpack apparatus 200 includes one or more displays, such as LED displays. The displays may indicate the capacity of one or more battery packages 500 coupled to backpack apparatus 200, and/or the capacity of the built-in battery cells of backpack apparatus 200. Additionally or alternatively, the displays may show the remaining capacity of one or more battery packages 500 and/or the built-in battery cells, for example, in percentage in relation to its initial full capacity.

Figure 32:
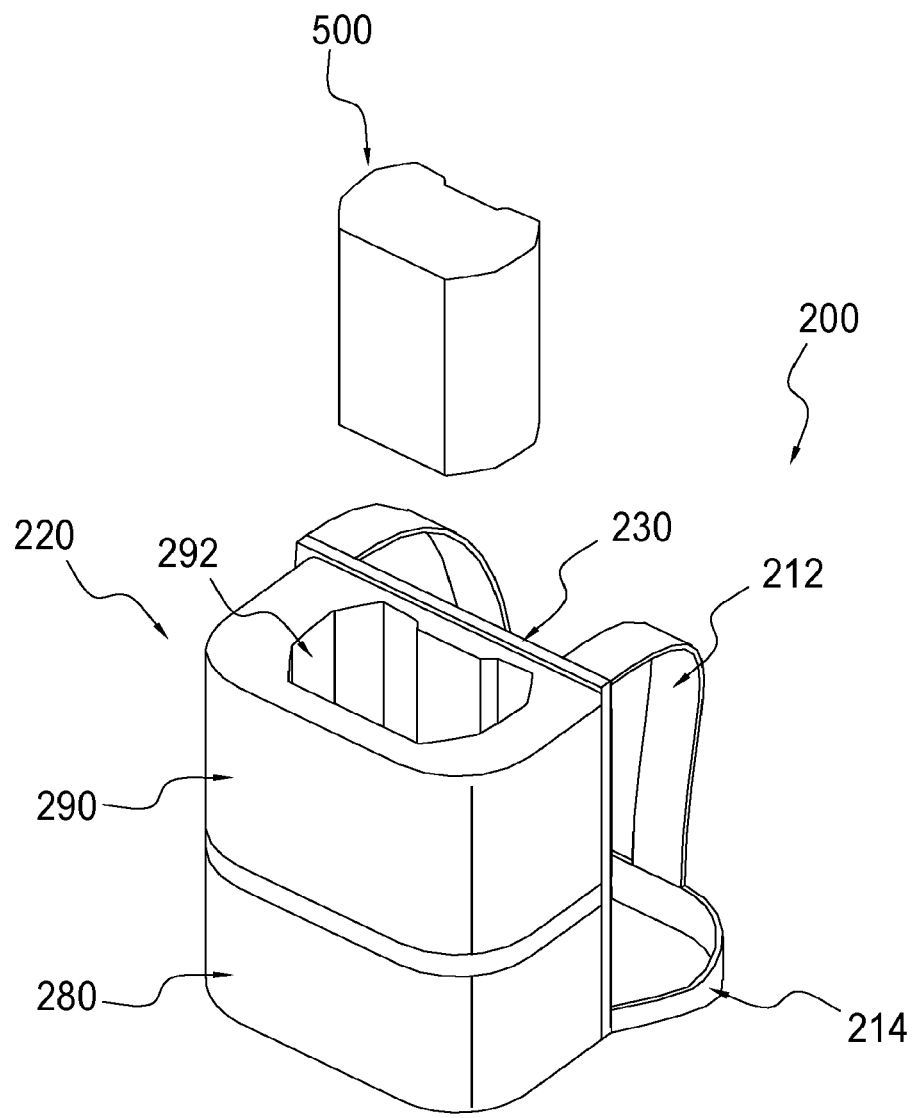
FIG. 32 illustrates a perspective view of another exemplary backpack apparatus, according to embodiments of the present disclosure.

FIG. 32 illustrates a perspective view of an exemplary backpack apparatus 200 of system 100. Backpack apparatus 200 includes an open slot 292 that receives and holds battery package 500. Open slot 292 is at least partially enclosed by cover 290. As shown in FIG. 32, open slot 292 includes connector 240 as one of its side walls to couple battery package 500. In some embodiments, backpack apparatus 200 may include one or more open slots 292 to receive and hold one or more battery packages 500. In some embodiments, backpack apparatus 200 may include one cover 290 that at least partially enclose one or more open slots 292. In other embodiments, backpack apparatus 200 may include one or more covers 290 to at least partially enclose each of the open slots 292 respectively.

Figure 33:
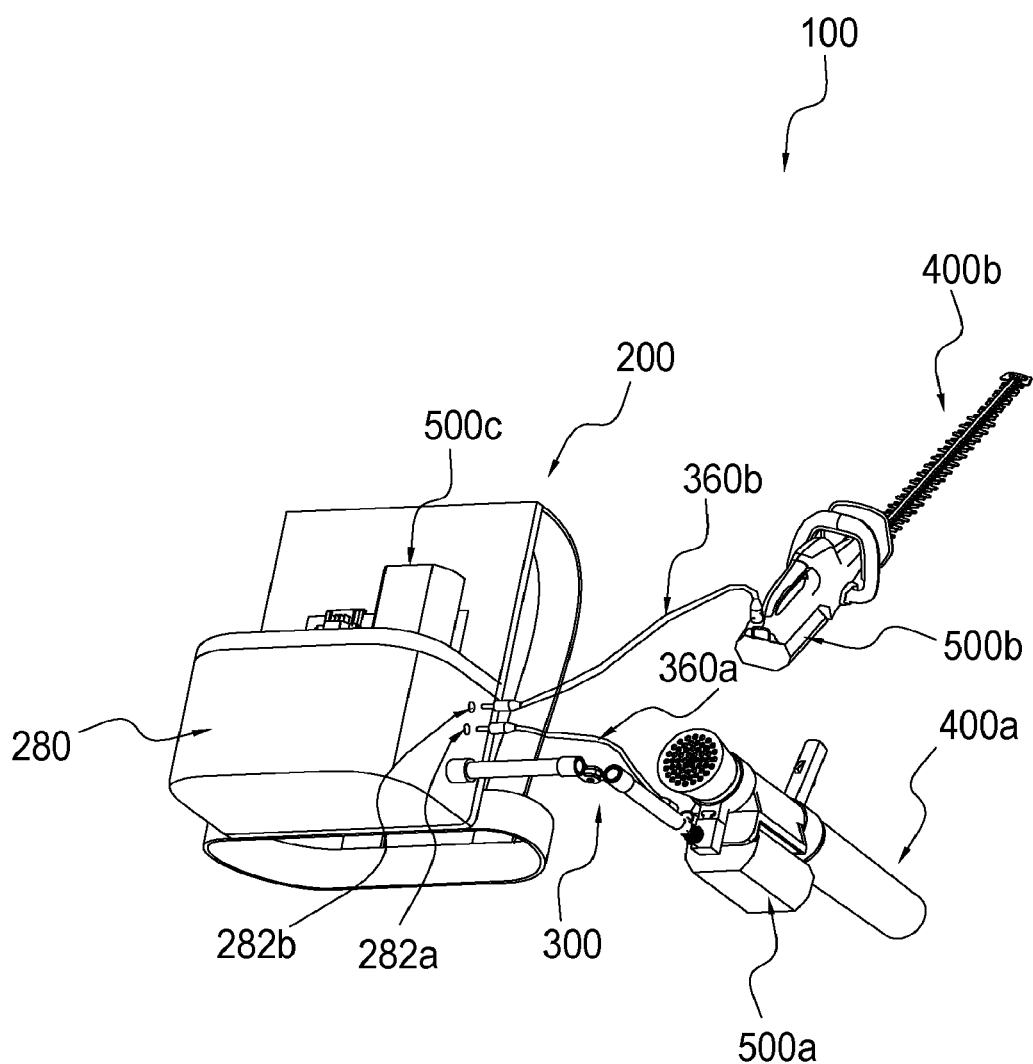
FIG. 33 illustrates a perspective view of another exemplary back-mounted power tool system, according to embodiments of the present disclosure.

FIG. 33 illustrates a perspective view of an exemplary back-mounted power tool system 100. System 100 may include more than one power tools 400, for example, power tools 400a and 400b. Exemplary system 100 illustrated in FIG. 33 is similar to exemplary system 100 illustrated in FIG. 28 with the exception that power tool 400a is connected to backpack apparatus 200 by connecting member 300. When two power tools 400a and 400b need to be operated at the same time, such configuration of system 100 facilitates the user's operation of the two power tools by providing support for, and thus increasing flexibility and comfort for controlling power tool 400a. For example, power tool 400a may be a blower. In some instances, since power tool 400b is not supported by connecting member 300, power tool 400b may be a small hand-held tool that is easily operable with one hand, such as a portable illumination device, an electric drill, a sander, etc. In such instances, power cord 360b connecting backpack apparatus 200 and power tool 400b may be any suitable length that increases the convenience and flexibility for the user's operation of power tool 400b.

Figure 34:
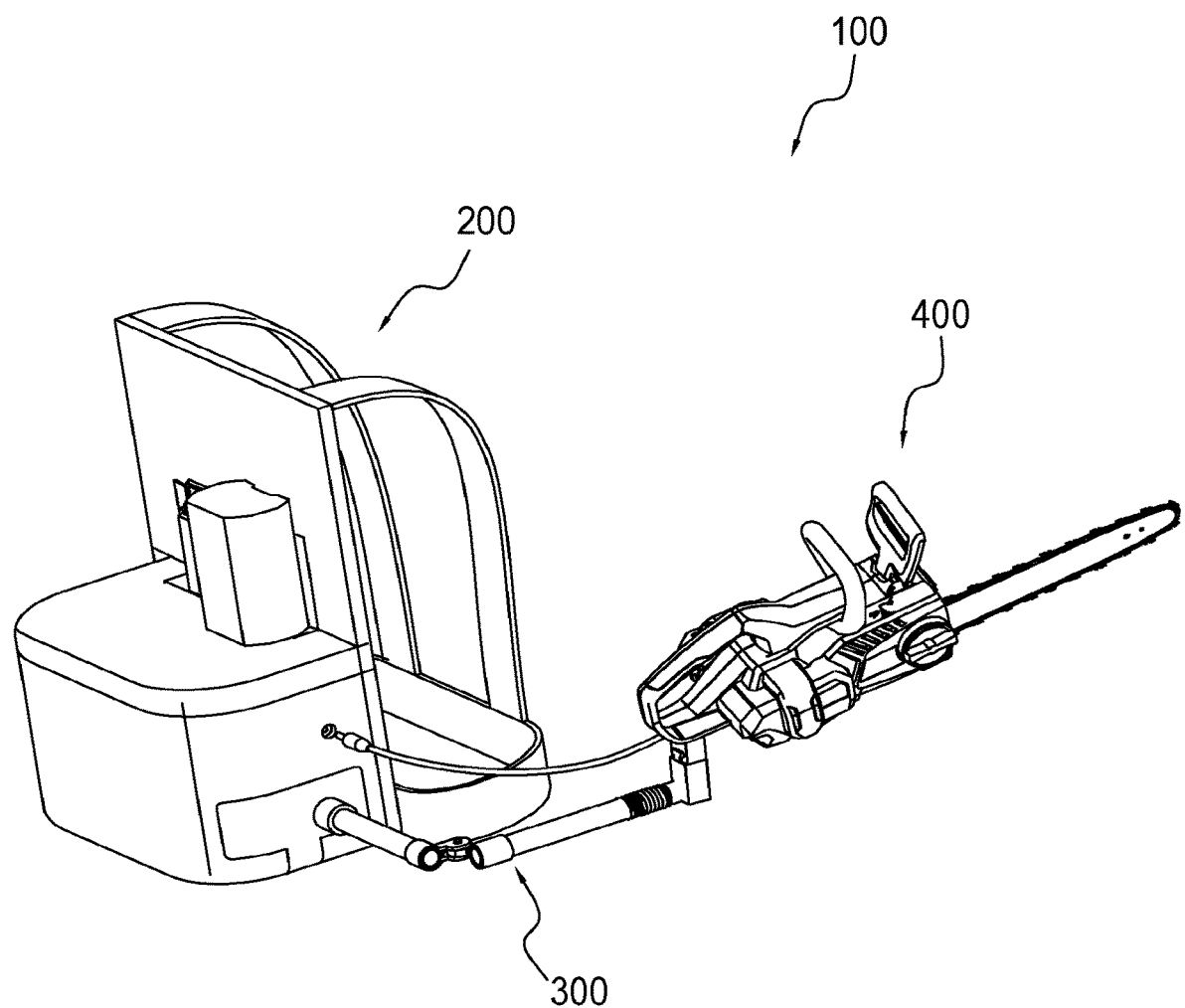
FIG. 34 illustrates a perspective view of another exemplary back-mounted power tool system, according to embodiments of the present disclosure.
Figure 35:
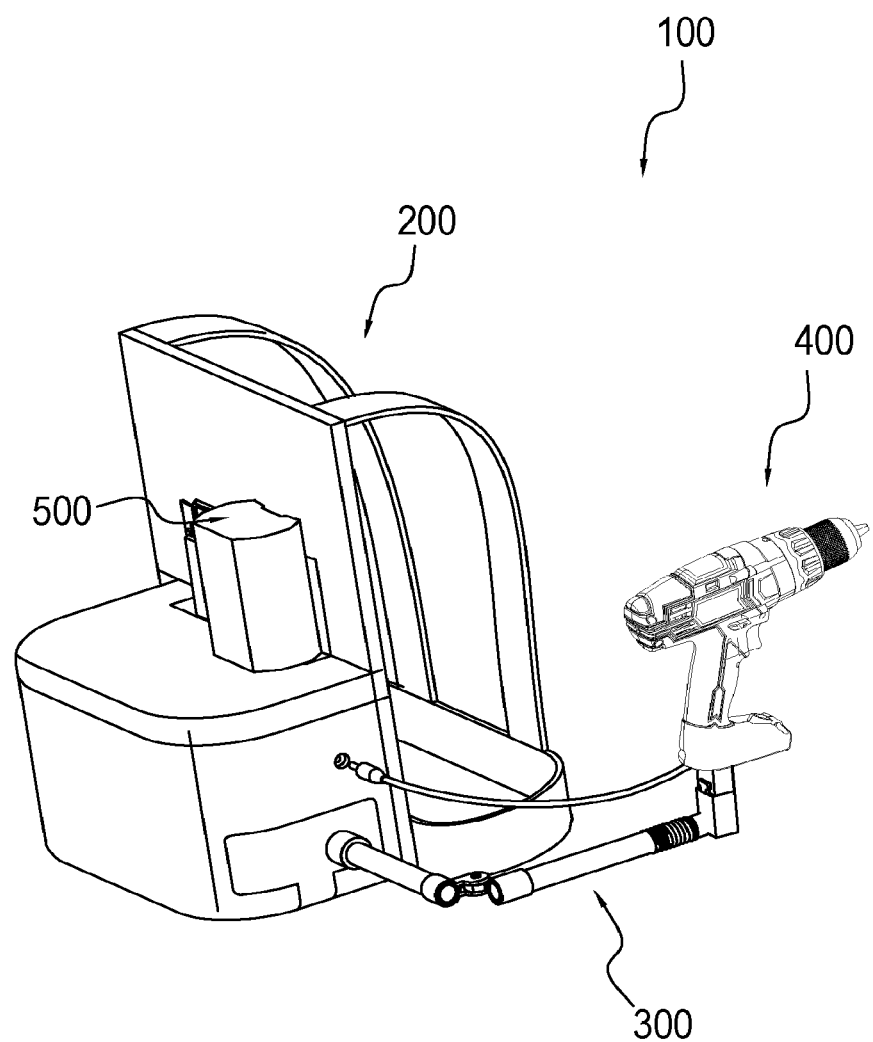
FIG. 35 illustrates a perspective view of another exemplary back-mounted power tool system, according to embodiments of the present disclosure.

As described above, power tool 400 may refer to any suitable power tool that can be powered by a battery and/or operated by a user with their hands, such as a blower, a vacuum, a blower vacuum, a mulcher, a trimmer, a chainsaw, a grass cutter, a brush cutter, a tying machine, a drill, a lawn mower, a circular saw, an angle grinder, a sander, or reciprocating saws. Such power tools may be selectively and interchangeably used in system 100. FIG. 34 illustrates a perspective view of an exemplary back-mounted power tool system 100 having an electrical chain saw as power tool 400. FIG. 35 illustrates a perspective view of an exemplary back-mounted power tool system 100 having an electrical drill as power tool 400.

Figure 36:
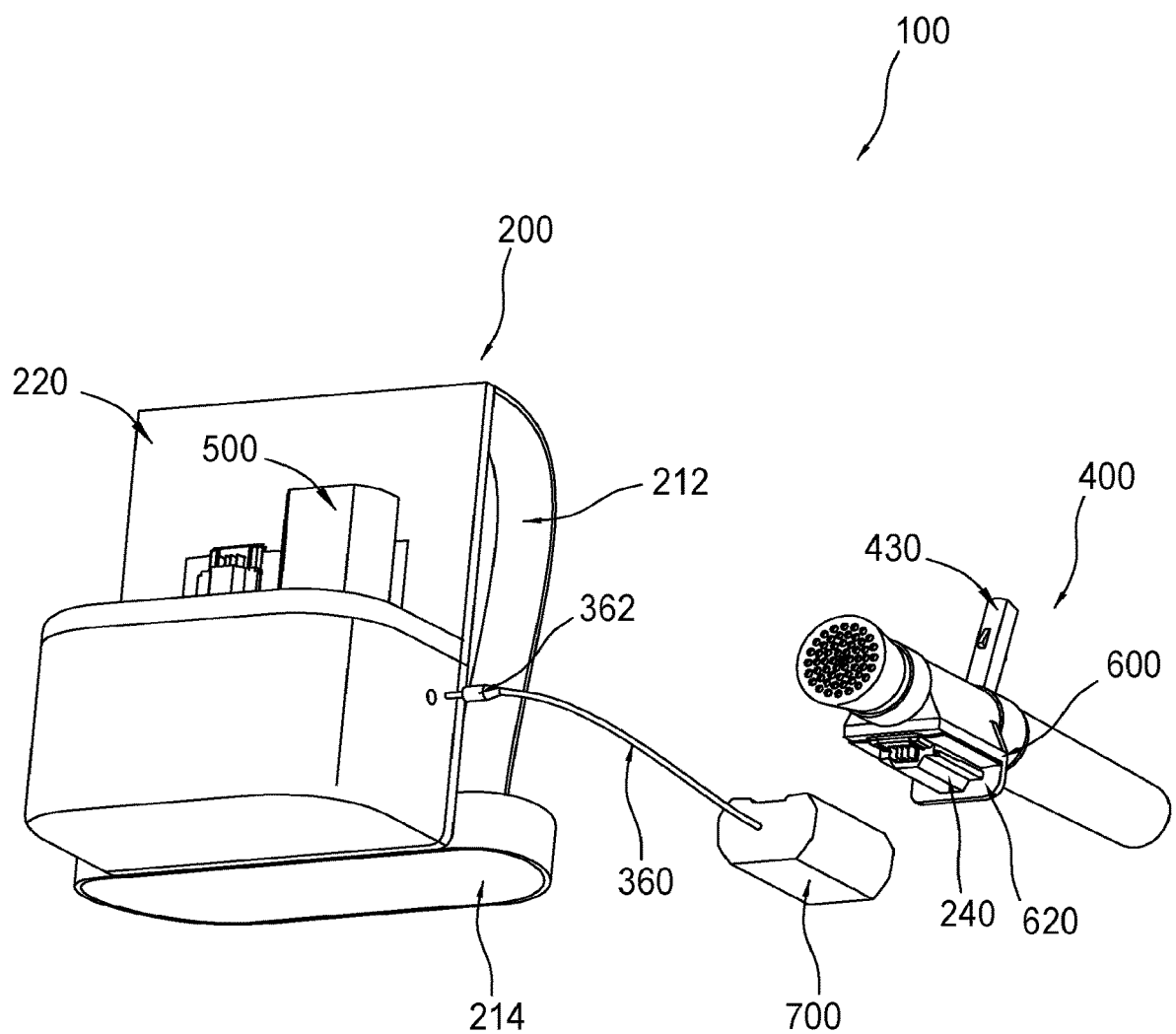
FIG. 36 illustrates a perspective view of another exemplary back-mounted power tool system, according to embodiments of the present disclosure.

To use various types of power tools, other embodiments of system 100 may be used. FIG. 36 illustrates a perspective view of an exemplary back-mounted power tool system 100. System 100 includes backpack apparatus 200, power tool 400, power cord 360, and an adapter 700. As shown in FIG. 36, power cord 360 has connector 362 at one end and connects to adaptor 700 at the other end. In some embodiments, power cord 360 may be fixedly connected to outlet 282 of backpack apparatus 200 such that power cord 360 and adaptor 700 become part of backpack apparatus 200. System 100 optionally includes connecting member 300 (not shown).

Figure 37:
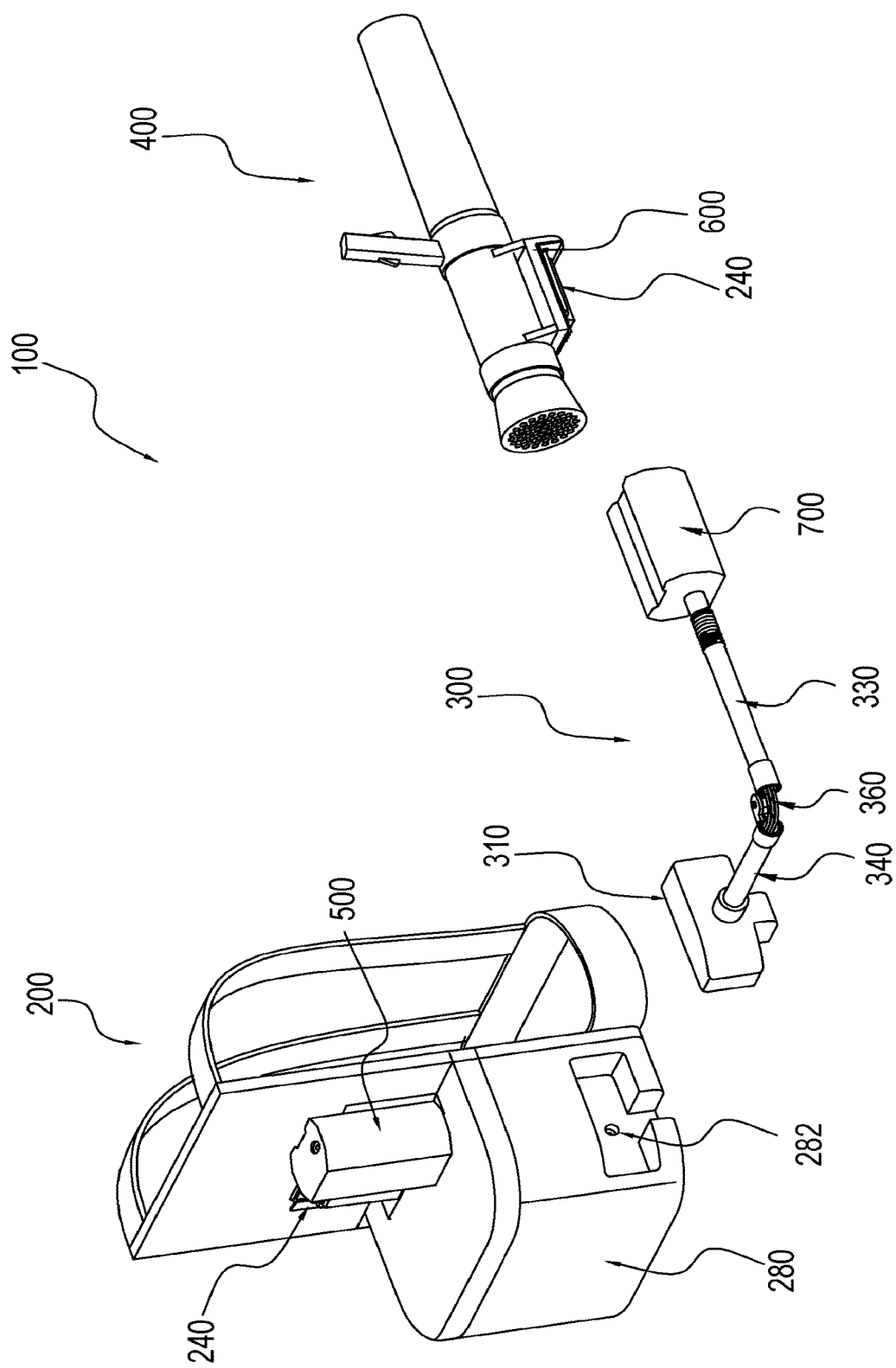
FIG. 37 illustrates a perspective view of another exemplary back-mounted power tool system, according to embodiments of the present disclosure.

As describe above, power cord 360 may affect the user's operation of power tool 400. For example, power cord 360 may add inconvenience for the user while moving power tool 400 by being in the way of the movement. FIG. 37 illustrates a perspective view of another exemplary back-mounted power tool system 100 that is partially disintegrated. System 100 backpack apparatus 200, power tool 400, power cord 360, connecting member 300, and an adapter 700.

As shown in FIG. 37, first arm 330 of connecting member 300 may be removably or fixedly connected to adaptor 700. To reduce the effect of power cord 360 on the operation of power tool 400, power cord 360 is placed inside connecting member 300, e.g., by passing through the inside of first arm 330 and second arm 340. In such instances, connector 362 of power cord 360 may be placed inside fitting member 310, and connects to power outlet 282 of backpack apparatus 200 when fitting member 310 is inserted and/or coupled to backpack apparatus 200. In other instances, fitting member 310 may include a connector (not shown) that connects power cord 360 to outlet 282 when fitting member 310 is inserted and/or coupled to backpack apparatus 200.

Adaptor 700 has the same fitting structures as that of battery package 500 and may couple to any connector 240 of system 100. Thus, adapter 700 may be coupled to connector 240 of battery connector 600 of power tool 400 in the same way as that of battery package 500. Adapter 700 may further include electronic circuits that transfers and/or regulates electrical power, voltage, and/or current. In such instances, electrical connection can be achieved between battery package 500 and power tool 400. For example, adaptor 700 may be coupled to battery connector 600 of power tool 400. Power cord 360 may connect to power outlet 282 of backpack apparatus 200 or connect to power outlet 520 of battery package 500 via connector 362 on one end, and connect to adaptor 700, e.g., the electronic circuits inside adaptor 700, on the other end.

Thus, in the above embodiments, battery package 500 provides electrical power and/or current to power tool 400 while adaptor 700 serves to transfer and/or regulate power and/or current to power tool 400. Thus, any power tool 400 that has battery connector 600 installed may be used interchangeably in system 100, which increases the versatility and compatibility of system 100.

As shown in FIGS. 36 and 37, the direction of battery connector 600 installed on power tool 400 is different from that shown in above embodiments. In some situations, this configuration of battery connector 600 shown in FIGS. 36 and 37 allows the user to couple adaptor 700 to power tool 400 by pushing adaptor 700 along with the movement of the user's arm until adaptor 700 is stopped by stopping wall 620 (shown in FIG. 26) of battery connector 600. In other situations, this configuration of battery connector 600 allows the user to decouple adaptor 700 from power tool 400 by pulling adaptor 700 along with the movement of the user's arm. Thus, this configuration of battery connector 600 shown in FIGS. 36 and 37 may increase the convenience and/or ease for the user to couple or remove adaptor 700 when installing or changing power tool 400.

Figure 38:
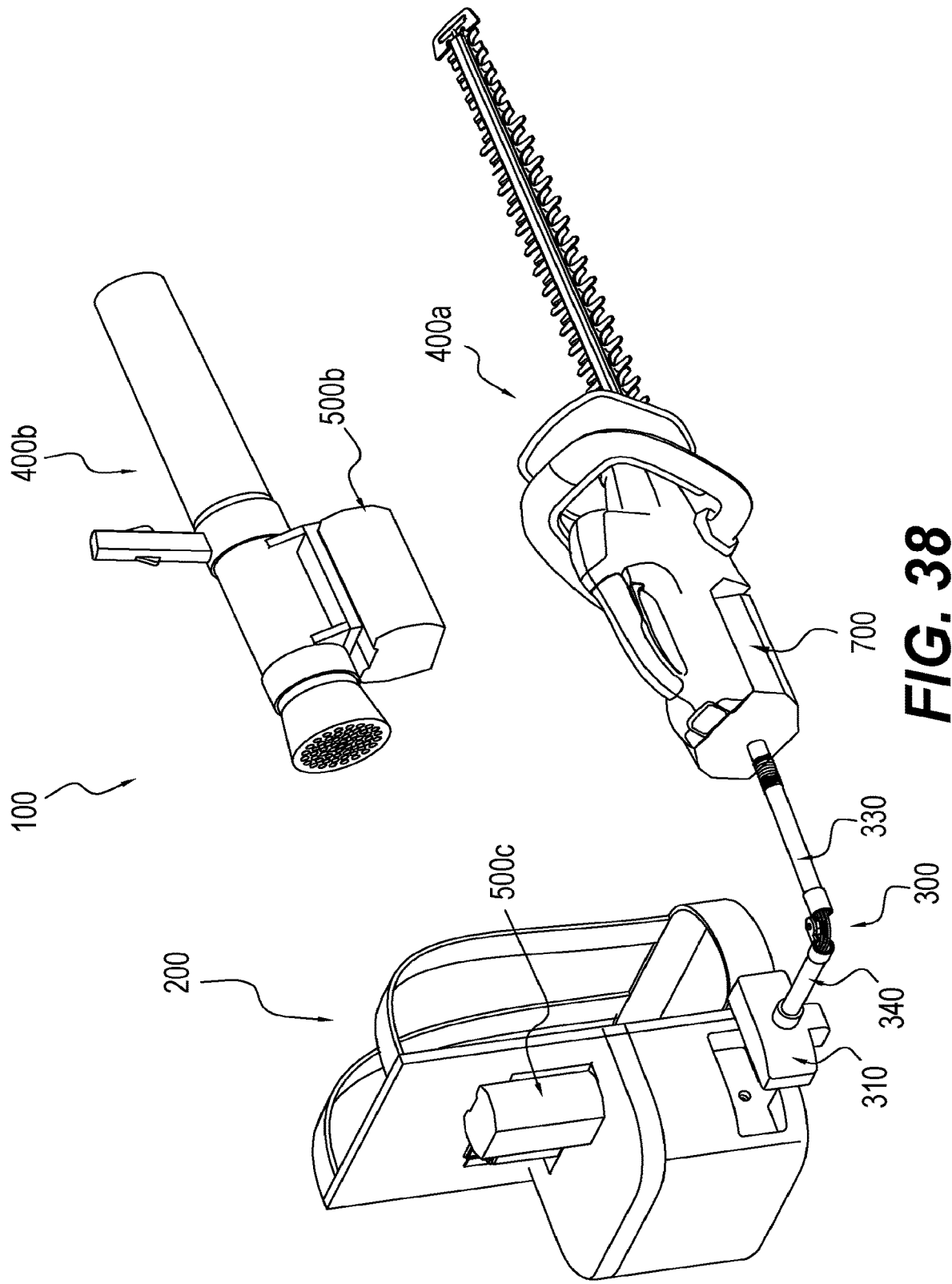
FIG. 38 illustrates a perspective view of another exemplary back-mounted power tool system, according to embodiments of the present disclosure.

FIG. 38 illustrates a perspective view of an exemplary system 100. System 100 includes may include more than one power tools 400, for example, power tools 400a and 400b. As described above, each of the power tools 400a and 400b may be any type of power tools selected by the user. For example, power tool 400a may be a trimmer and power tool 400b may be a blower. In some embodiments, power tool 400a may be connected to backpack apparatus 200 via adaptor 700 and connecting member 300. Thus, the weight of power tool 400a and/or the reaction force generated from the operation of power tool 400a may be transferred to connecting member 300 and then to backpack apparatus 200. Power tool 400b may be coupled to battery package 500b and thus may be operated separately from backpack apparatus 200. In such instances, both power tools 400a and 400b may be operated at the same time. For example, one may use one hand operating power tool 400a and the other hand operating power tool 400b.

Figure 39:
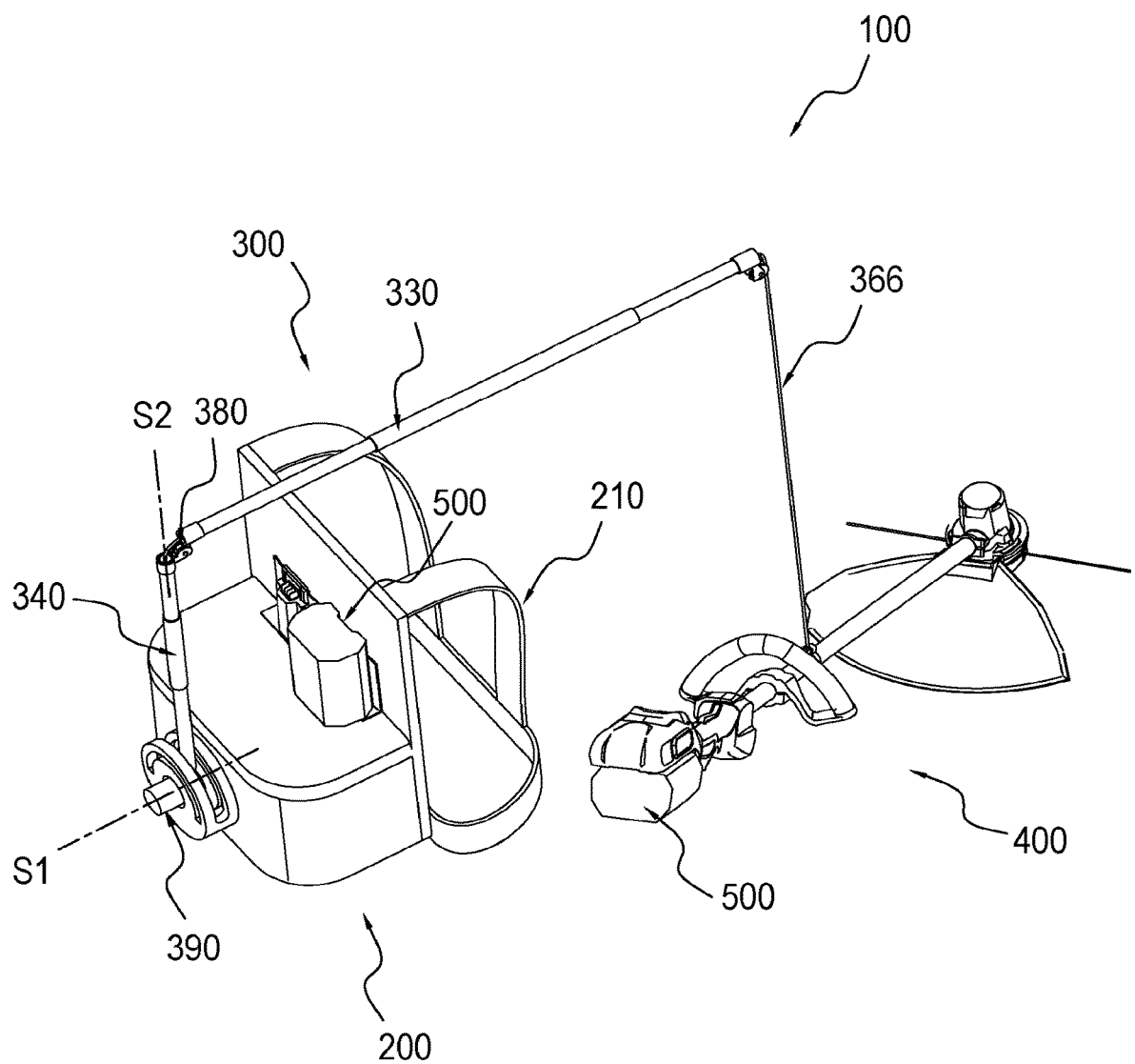
FIG. 39 illustrates a perspective view of another exemplary back-mounted power tool system, according to embodiments of the present disclosure.
Figure 40:
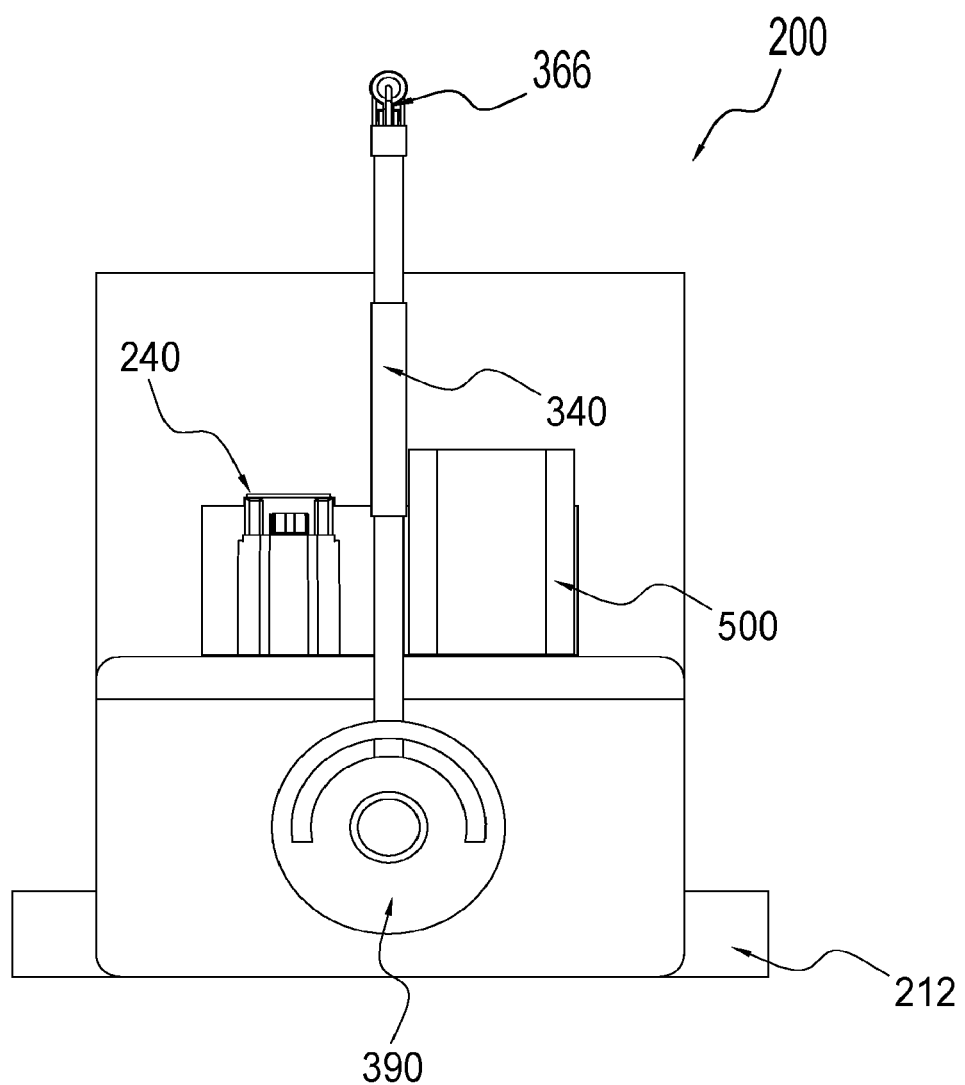
FIG. 40 illustrates a back view of the exemplary back-mounted power tool system of FIG. 39.
Figure 41:
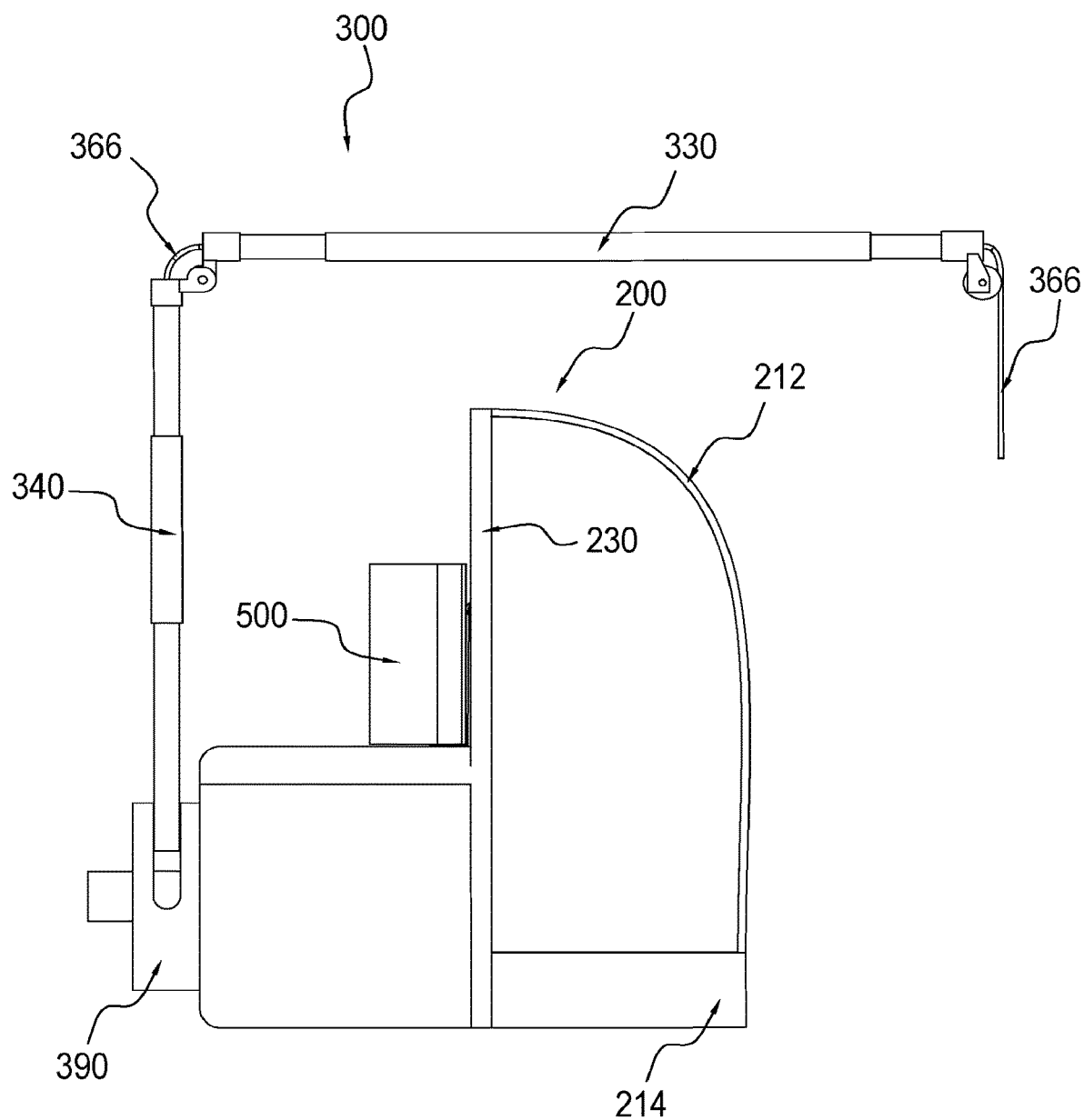
FIG. 41 illustrates a side view of the exemplary back-mounted power tool system of FIG. 39.
Figure 42:
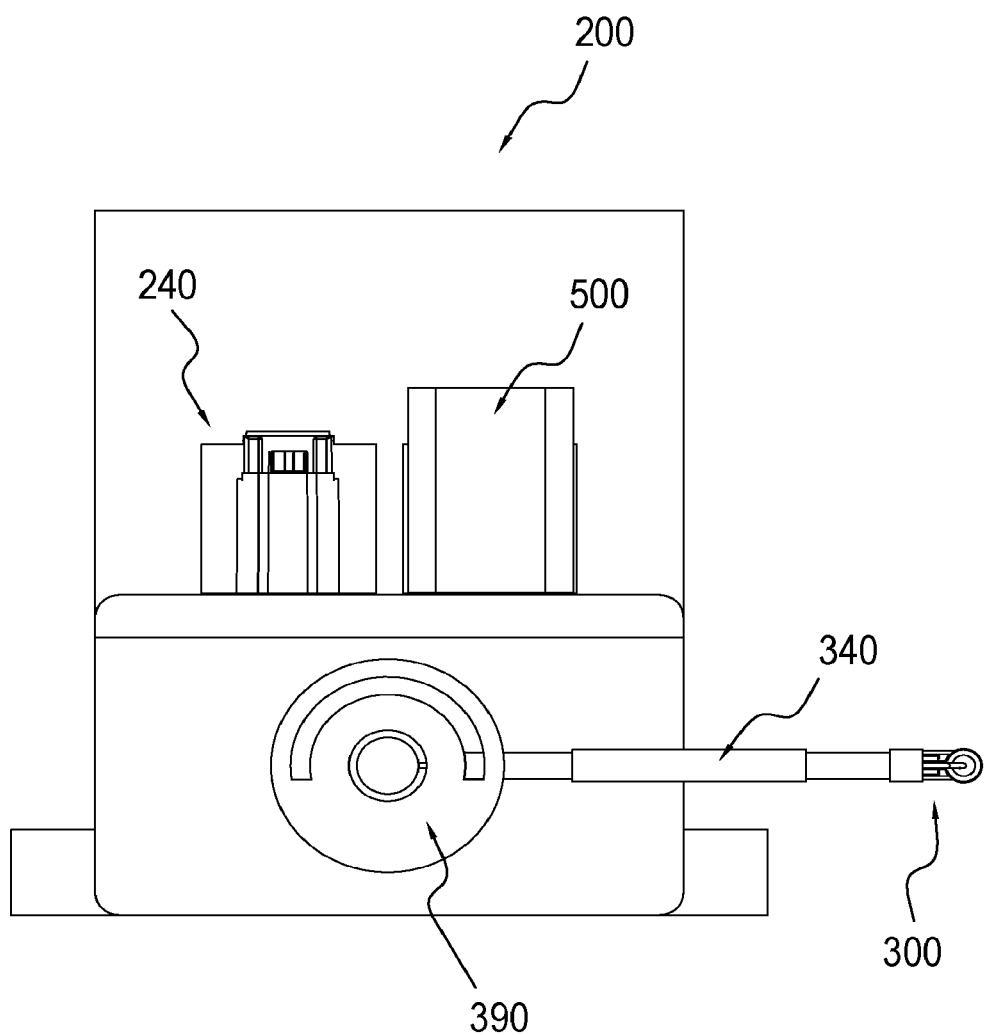
FIG. 42 illustrates a back view of the exemplary back-mounted power tool system of FIG. 39.
Figure 43:
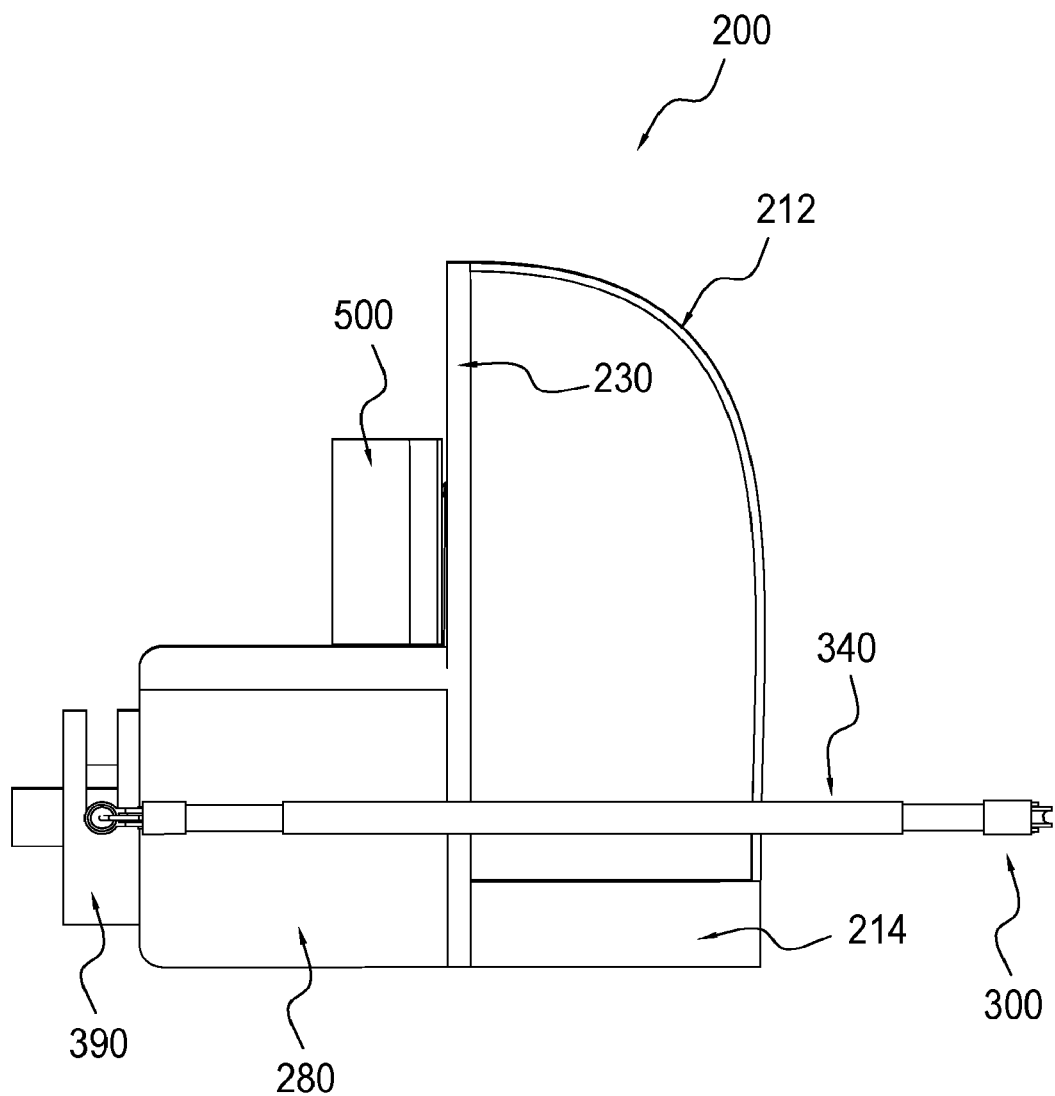
FIG. 43 illustrates a side view of the exemplary back-mounted power tool system of FIG. 39.

For some types of power tools 400, the connection between backpack apparatus 200 and connecting member 300, and/or the connection between connecting member 300 and/or power tool 400 may be arranged in alternative configurations to be more suitable for operating those power tools 400. For example, FIG. 39 illustrates a perspective view of an exemplary back-mounted power tool system 100. FIG. 40 illustrates a back view of system 100 of FIG. 39. FIG. 41 illustrates a side view of system 100 of FIG. 39. FIG. 42 illustrates another back view of system 100 of FIG. 39. FIG. 43 illustrates another side view of system 100 of FIG. 39. As shown in FIG. 39, in some embodiments, power tool 400 of system 100 is a grass cutter. As described herein, reference below to power tool 400 may refer to a grass cutter for illustrating exemplary embodiments of system 100 shown in FIGS. 39-43.

As shown in FIGS. 39-41, in some embodiments, connecting member 300 of system 100 includes first arm 330, second arm 340, and a cable 366. Backpack apparatus 200 includes a connector 390 that is rotatably coupled to second arm 340. The lengths of first arm 330 and second arm 340 may be adjustable, and may be locked to fixed lengths by the user. Cable 366 is attached to connector 390 at one end, passes through the inside of second arm 340 and first arm 330, and is attached to power tool 400 at the other end. Cable 366 thus may transfer at least a part of the weight of power tool 400 to connector 390, which then transfers the weight to backpack harness 210 to be carried by the shoulders, back, and/or waist of the user.

To better illustrate the movement of first arm 330 and second arm 340 for the control of power tool 400, two axes "S1" and "S2" are illustrated in FIG. 39. Axis S2 indicates a vertical direction and axis S1 indicates a horizontal direction. When backpack apparatus 200 is mounted on a user, axis S2 is substantially parallel to the direction of the gravitational force. Second arm 340 may rotate around or about axis S1 to allow connecting member 300 to be moved to a position desired by the user. For example, as shown in FIGS. 42 and 43, connecting member 300 is moved to the right of the user. In other instances, connecting member 300 may be moved to any suitable position around the user for operating power tool 400.

First arm 330 rotatably connects to second arm 340, e.g., via hinge 380, as shown in FIG. 39. The rotational angle between first arm 330 and second arm 340 may be adjustable. As shown in FIG. 39, the rotational axis of first arm 330 relative to second arm 340 is perpendicular to both axes S1 and S2. Thus, power tool 400 may be poisoned to be at a suitable height and/or angle by adjusting the rotational angle of first arm 330 relative to second arm 340. Similarly, the rotational angle between first arm 330 and second arm 340 may be adjusted such that any particular type of power tool 400 can be at a position with a suitable height and/or angle for the user to operate.

In some embodiments, connector 390 further includes a winding device, such as a reel that cable 366 may be wound. For example, the reel of the winding device may be turned manually or automatically to adjust the length of cable 366 such that power tool 400 is at a suitable height and/or angle. In some embodiments, power tool 400 may include a user control, such as a button or a nob, which is connected to electronic control circuits of backpack apparatus 200. The button or nob may allow the user to adjust the length of cable 366 as needed.

Figure 44:
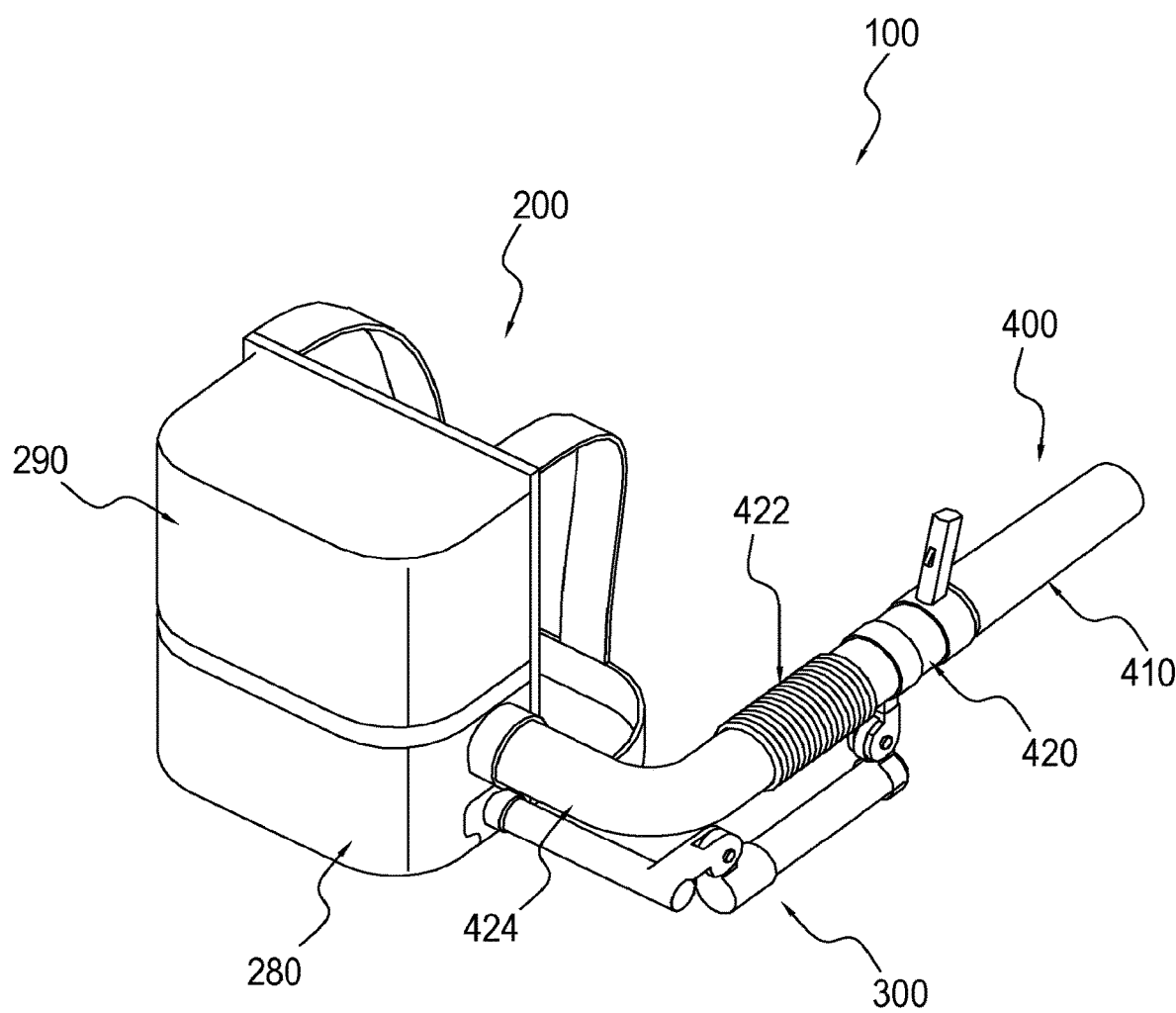
FIG. 44 illustrates a perspective view of another exemplary back-mounted power tool system, according to embodiments of the present disclosure.
Figure 45:
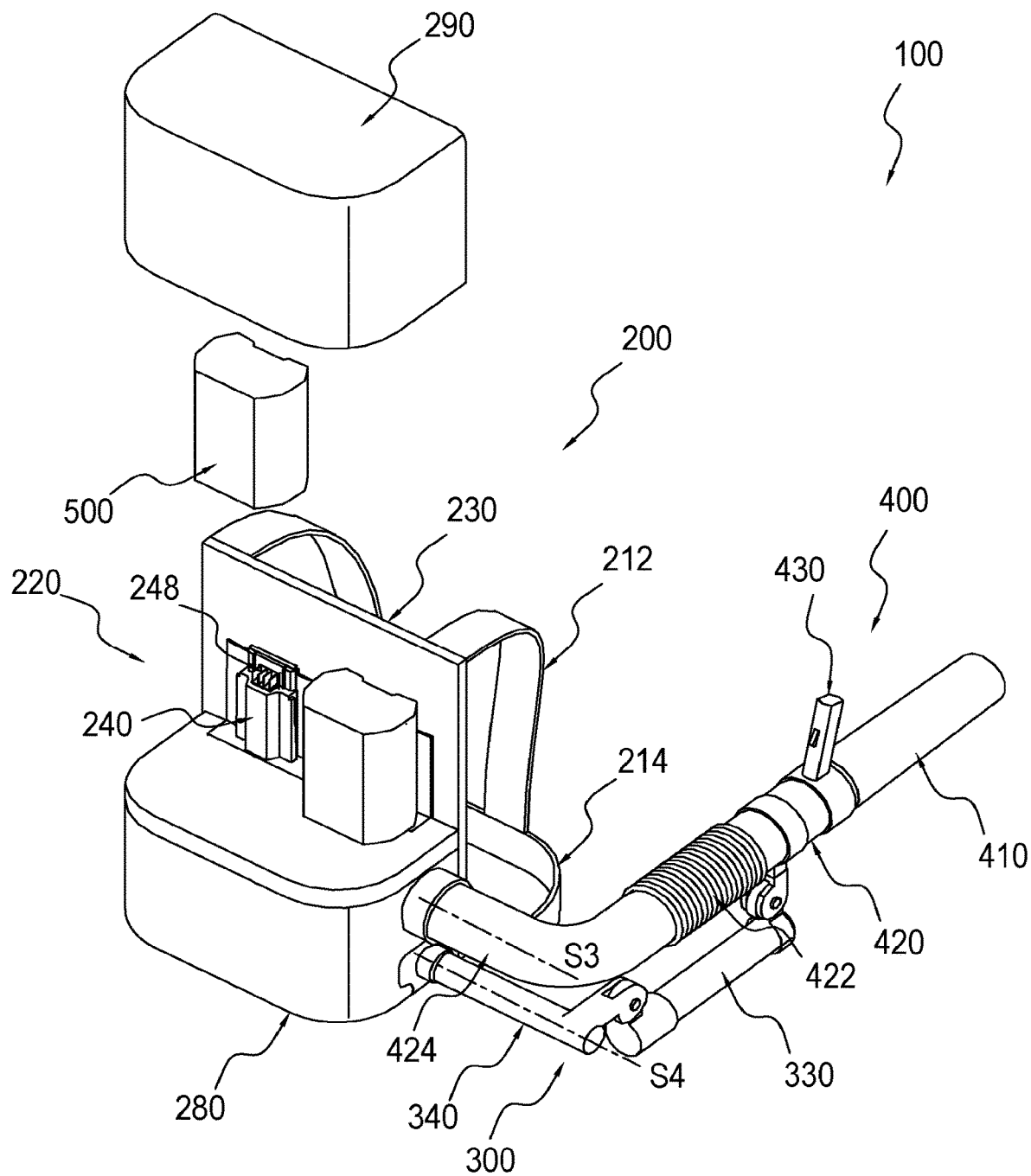
FIG. 45 illustrates a perspective view of the exemplary back-mounted power tool system of FIG. 44 with some parts illustrated in a partially exploded view.
Figure 46:
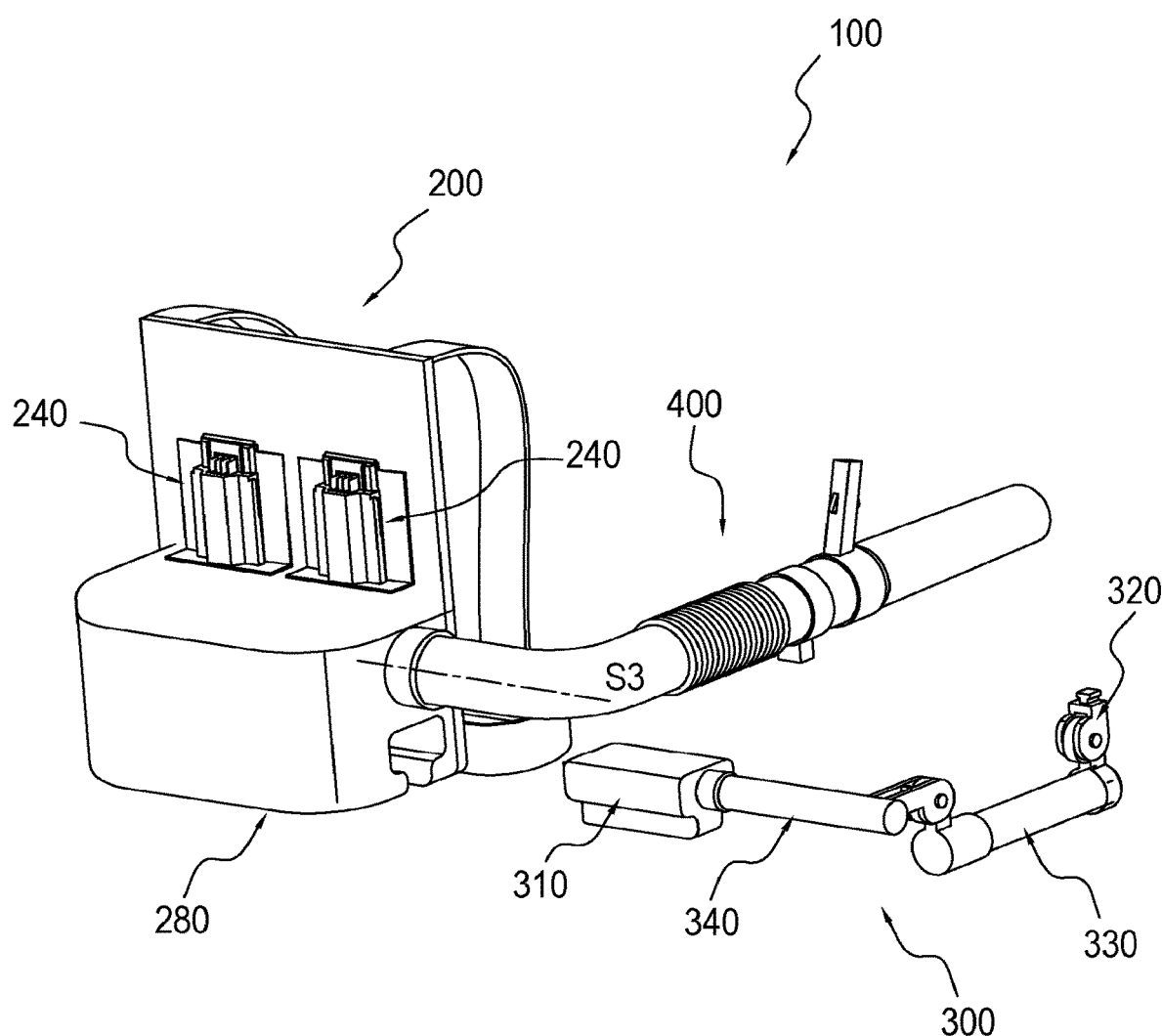
FIG. 46 illustrates a perspective view of the exemplary back-mounted power tool system of FIG. 44.
Figure 47:
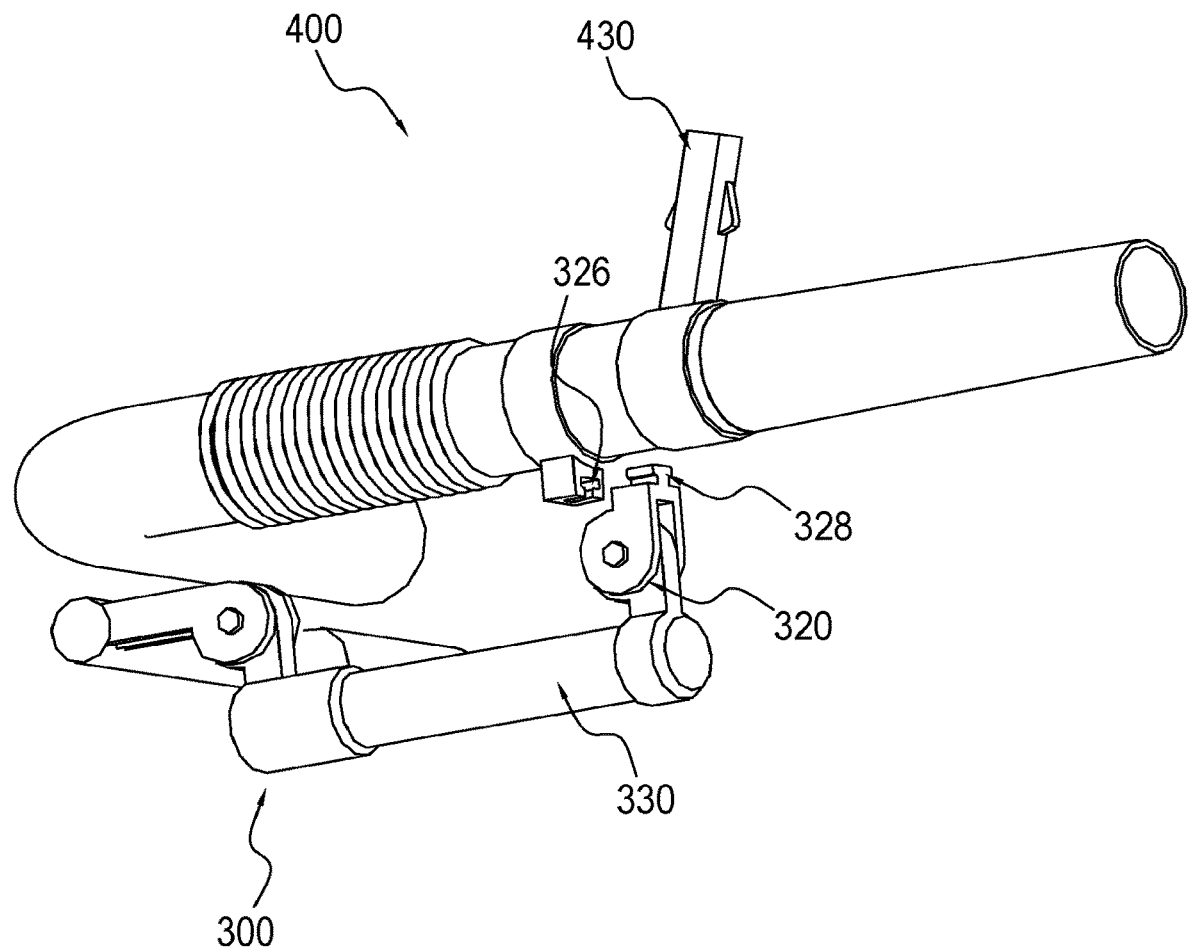
FIG. 47 illustrates a perspective view of some exemplary parts of the exemplary back-mounted power tool system of FIG. 44.

To further reduce the burden of the user's arm for operating power tool 400, the motor of power tool 400 may be placed in backpack apparatus 200. FIG. 44 illustrates a perspective view of an exemplary back-mounted power tool system 100. FIG. 45 illustrates a perspective view of system 100 of FIG. 44 with some parts illustrated in a partially exploded view. FIG. 46 illustrates a perspective view of system 100 of FIG. 44. FIG. 47 illustrates a perspective view of power tool 400 and connecting member 300 of system 100 of FIG. 44.

As shown in FIGS. 44 and 45, system 100 includes backpack apparatus 200, power tool 400, e.g., a blower, and connecting member 300. A motor (not shown) and an air-generating device (not shown) of power tool 400 are installed in chamber 280 of backpack apparatus 200. The air-generating device may be a centrifugal fan or a centrifugal propeller. In some embodiments, the air-generating device may be similar to air-generating device 470 shown in FIGS. 11 and 12. The motor may drive the air-generating device via e.g., a rotational shaft. The motor may be similar to motor 460 shown in FIGS. 11 and 12. Backpack apparatus 200 further includes a circuit board (not shown), which is electrically connected to the motor and/or user controls in handle 430. The circuit board (similar to circuit board 480 shown in FIGS. 11 and 12) may be installed in a chamber of backpack apparatus 200, e.g., chamber 280. In some embodiments, electrical energy or power is transferred from battery package 500 coupled to connector 240 to the circuit board, from which is transferred to the motor and/or user controls in handle 430.

In some embodiments, chamber 280 of backpack apparatus 200 includes an air flow passage (not shown). The air flow passage may be an integral part of backpack apparatus 200 or may be assembled by a plurality of parts. The air flow generated by the motor and the air-generating device passes through the air flow passage and enter power tool 400. For example, as shown in FIGS. 44 and 45, power tool 400 includes pipe 410, a compliant tube 422, and a connecting tube 424. The air flow generated by the motor and the air-generating device may pass through a passage formed by the air flow passage in chamber 280, connecting tube 424 and compliant tube 422, and pipe 410. In some embodiments, connecting tube 424 may have an arc shape suitable for directing the air flow to compliant tube 422 and pipe 410. For example, connecting tube 424 may have an arc shape similar to an elbow.

Compliant tube 422 is flexible and/or extendable. Compliant tube 422 may be moved around, e.g., from side to side in any direction, or upward or downward to allow the user to position power tool 400 at a suitable operational angle. Connecting tube 424 may be rotatably connected to backpack apparatus 200. To illustrate the rotational connections in system 100, FIG. 45 illustrate two axes S3 and S4. Axis S4 is substantially parallel to axis S3. As shown in FIG. 45, connecting tube 424 may rotate around or about axis S3. The rotation of connecting tube 424 around or about axis S3 may adjust the angle of pipe 410, and thus the direction of the air flow ejected from power tool 400.

As shown in FIGS. 45-47, connecting member 300 includes fitting member 310, power tool connector 320, first arm 330, and second arm 340. First arm 330 is perpendicular to second arm 340, and may rotate relative to second arm 340 around or about axis S4. Connecting member 300 removably connects to backpack apparatus 200 via coupling fitting member 310, and removably connects to power tool 400 via power tool connector 320. For example, as shown in FIG. 46, fitting member 310 may be inserted along axis S3 or an axis perpendicular to axis S3 to a recess of backpack apparatus 200, such as a slot in chamber 280. Power tool connector 320 may connect to power tool 400 via a sliding mechanism. For example, as shown in FIG. 47, power tool connector 320 includes a hinge and a protrusion 328. The hinge allows power tool connector 320 to rotatably connect to first arm 330. Protrusion 328 may be slid into a slot 326 of a clamp on power tool 400. The clamp may be a part of power tool 400 or may be installed on power tool 400. For example, the clamp may include half members 322 and 324 that may be assembled via any suitable mechanical structure that allows for quick assembly and release, e.g., structures that use friction fit, press fit, twist fit, snap fit, etc. Such sliding connection between power tool connector 320 and power tool 400 may allow connecting member 300 to be easily separated or connected to power tool 400.

Figure 48:
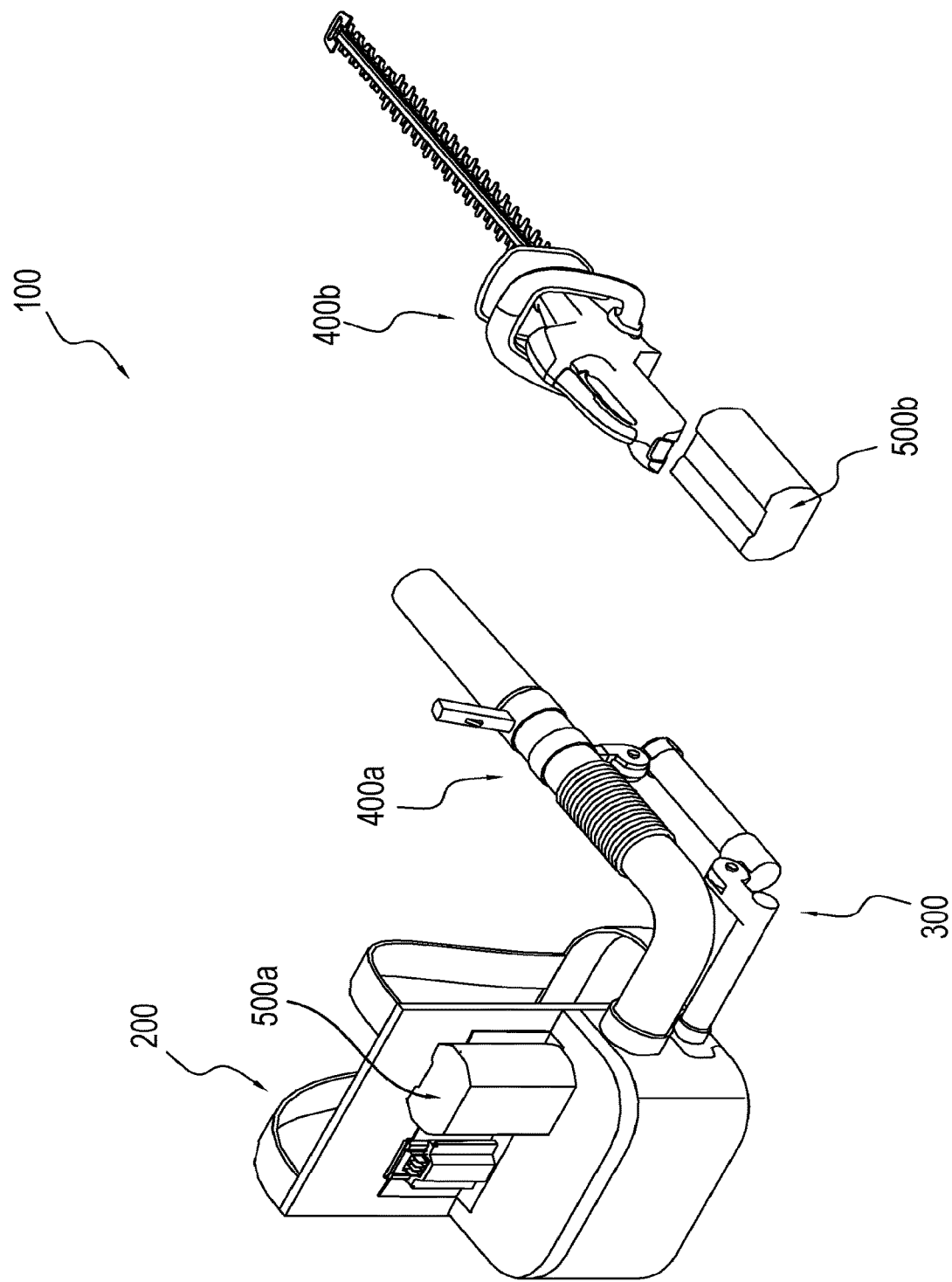
FIG. 48 illustrates a perspective view of another exemplary back-mounted power tool system, according to embodiments of the present disclosure.

FIG. 48 illustrates a perspective view of an exemplary back-mounted system 100. System 100 may include more than one power tools 400, for example, power tools 400a and 400b. Battery package 500b is decoupled from connector 240 of backpack apparatus 200 and coupled to power tool 400b. Power tool 400b may thus be operated separately from backpack apparatus 200. Power tool 400a is coupled to backpack apparatus 200 to obtain power supply from battery package 500a and obtain support from backpack apparatus 200. Power tools 400a and 400b may be used at the same time. One or more features of this system may be substantially similar to the embodiments described above.

Figure 49:
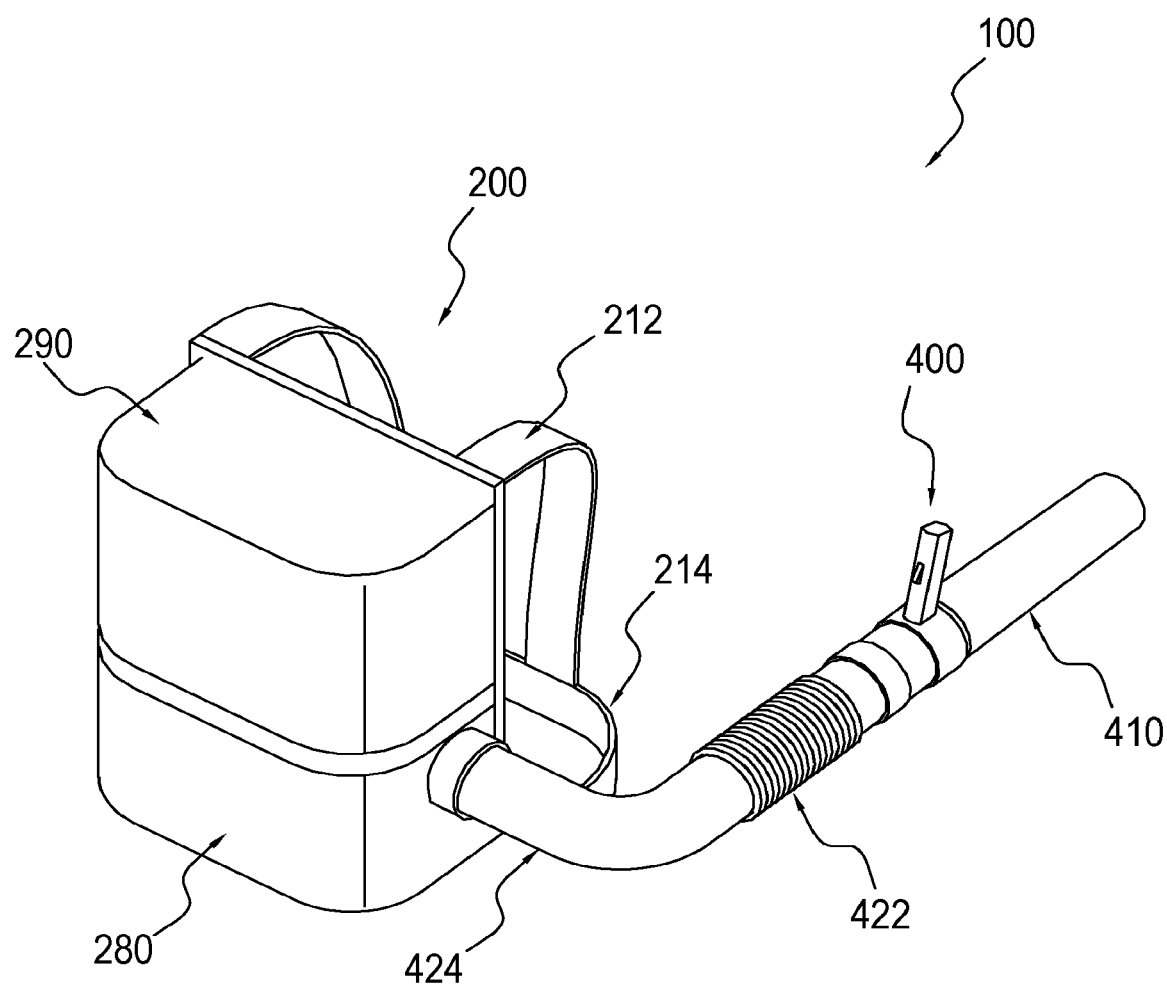
FIG. 49 illustrates a perspective view of another exemplary back-mounted power tool system, according to embodiments of the present disclosure.

FIG. 49 illustrates a perspective view of an exemplary back-mounted power tool system 100. As described above, a motor and an air-generating device may make up a substantial portion of the weight of power tool 400. In the embodiments of system 100, in which the motor and air-generating device are installed in chamber 280 of backpack apparatus 200, the weight of these two components is transferred to the shoulders, back, and/or waist of the user by backpack apparatus 200. Thus the amount of burden on the user's arm for operating power tool 400 is reduced. In such instances, system 100 may be simplified by not including connecting member 300. System 100 may still allow the user to operate power tool 400 for long periods of time at least because the reduced work and fatigue of the user's arm during the operation of power tool 400, and/or the power supply from battery package 500 or built-in battery cells of backpack apparatus 200.

Figure 50:
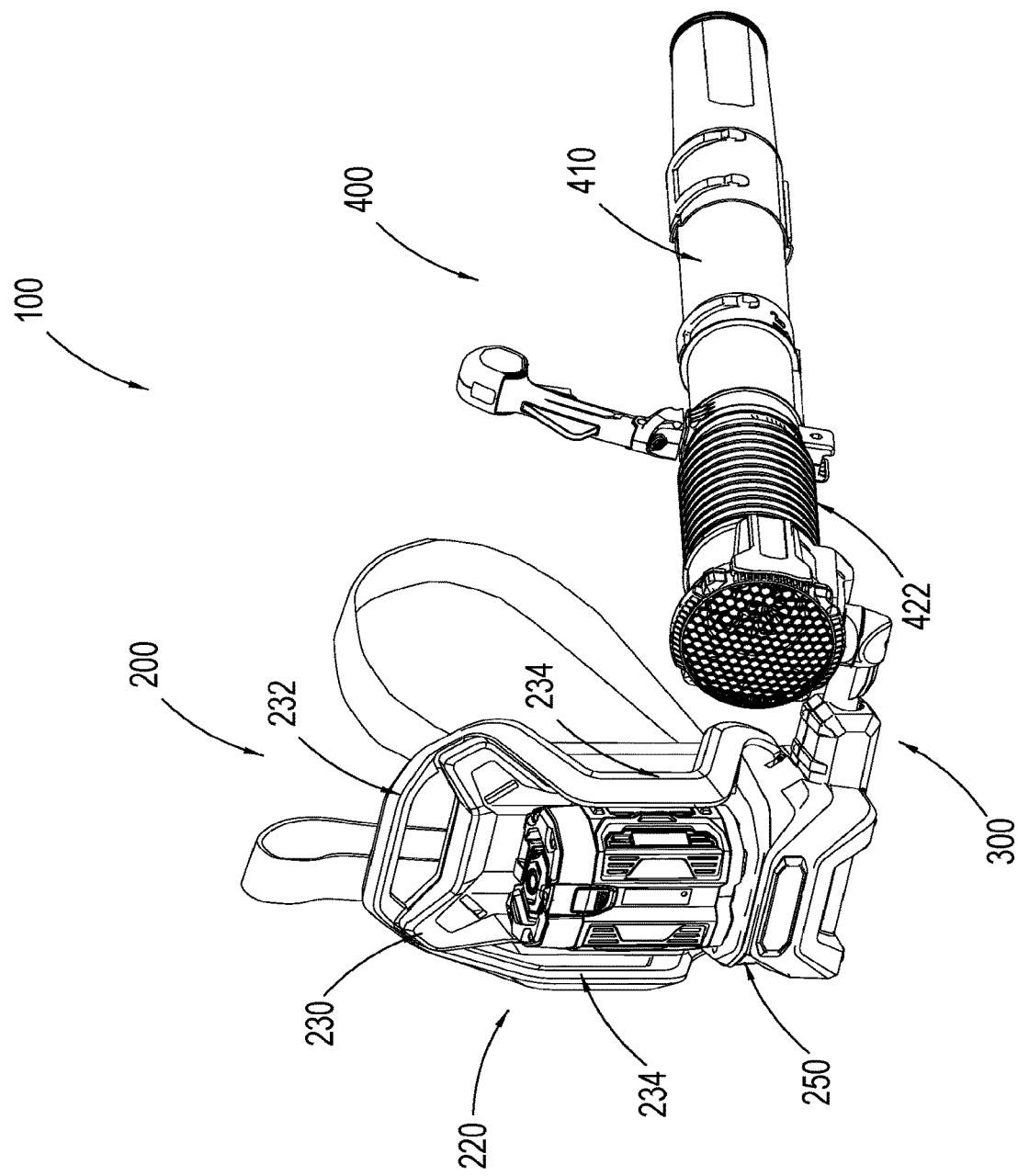
FIG. 50 illustrates a perspective view of another exemplary back-mounted power tool system, according to embodiments of the present disclosure.
Figure 51:
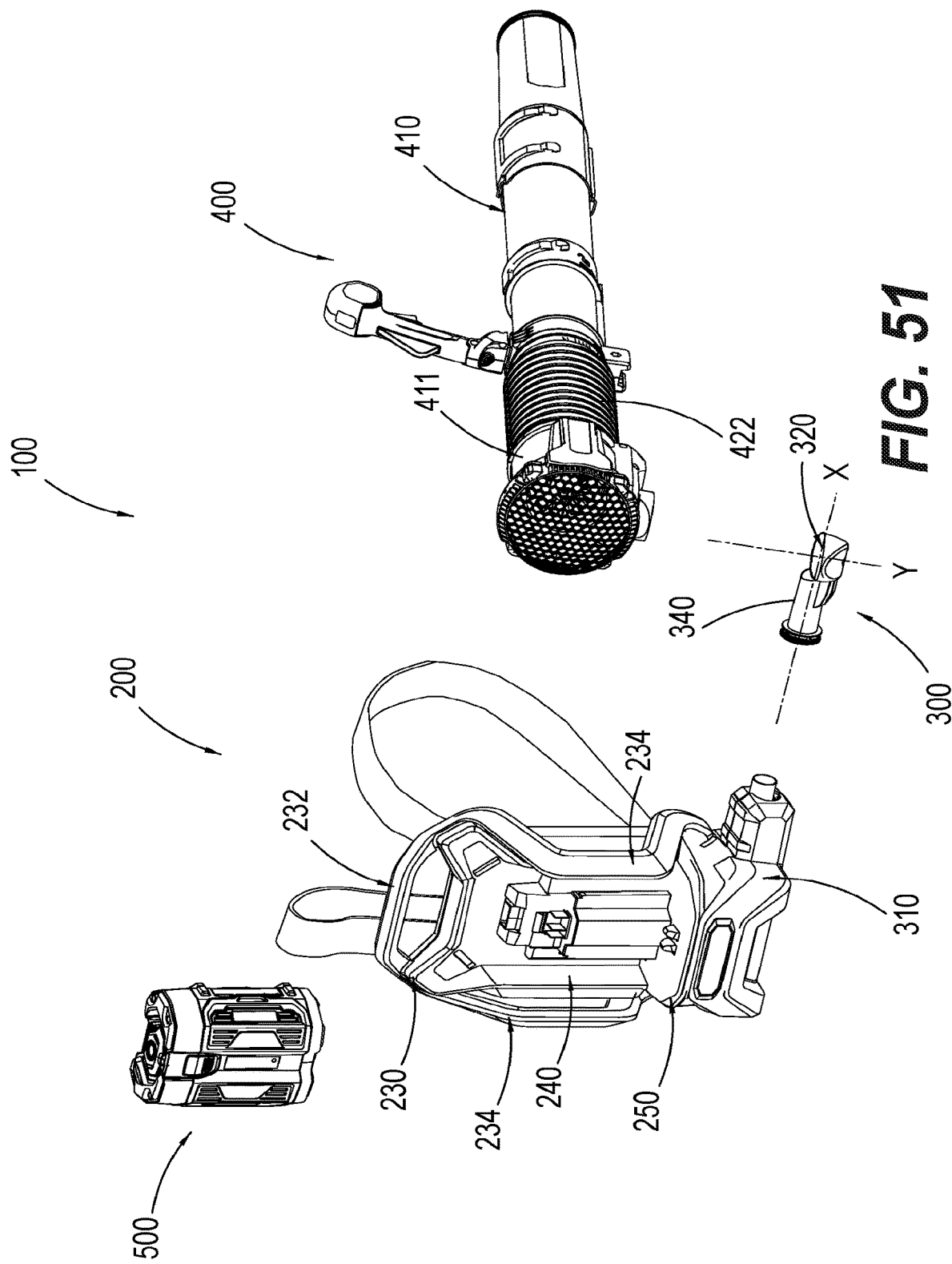
FIG. 51 illustrates a partial exploded perspective view of the exemplary back-mounted power tool system of FIG. 50.

FIG. 50 illustrates a perspective view of an exemplary back-mounted system 100. FIG. 51 illustrates a partial exploded perspective view of back-mounted power tool system 100 of FIG. 50. As described above, system 100 may include backpack apparatus 200, connecting member 300, and power tool 400. Body 220 of backpack apparatus 200 includes frame 230, connector 240 to couple battery package 500 to backpack apparatus 200, and/or base member 250. In some embodiments, frame 230 of backpack apparatus 200 includes one or more handles for the user to grab, hold, and/or carry backpack apparatus 200. For example, as shown in FIGS. 50 and 51, frame 230 may include a top handle 232 and/or a side handle 234 on the left and/or right side of backpack apparatus 200. One or more features of this system may be substantially similar to the embodiments described above.

In some embodiments, as shown in FIG. 51, connecting member 300 may include power tool connector 320 and one arm 340. Power tool connector 320 may rotatably and/or removably connect to power tool 400. Arm 340 may rotatably connect power tool connector 320 on one end, and may rotatably and/or removably connect to fitting member 310 that may form a complimentary fit with base member 250 of backpack apparatus 200 or with base member 250 on the other end. As described above, arm 340 may have a hollow structure that may provide a passage for electrical connections to motor 460 that is located inside pipe 410 (not shown), e.g., electrical wires connecting motor 460 to battery package 500 or backpack apparatus 200.

Figure 52B:
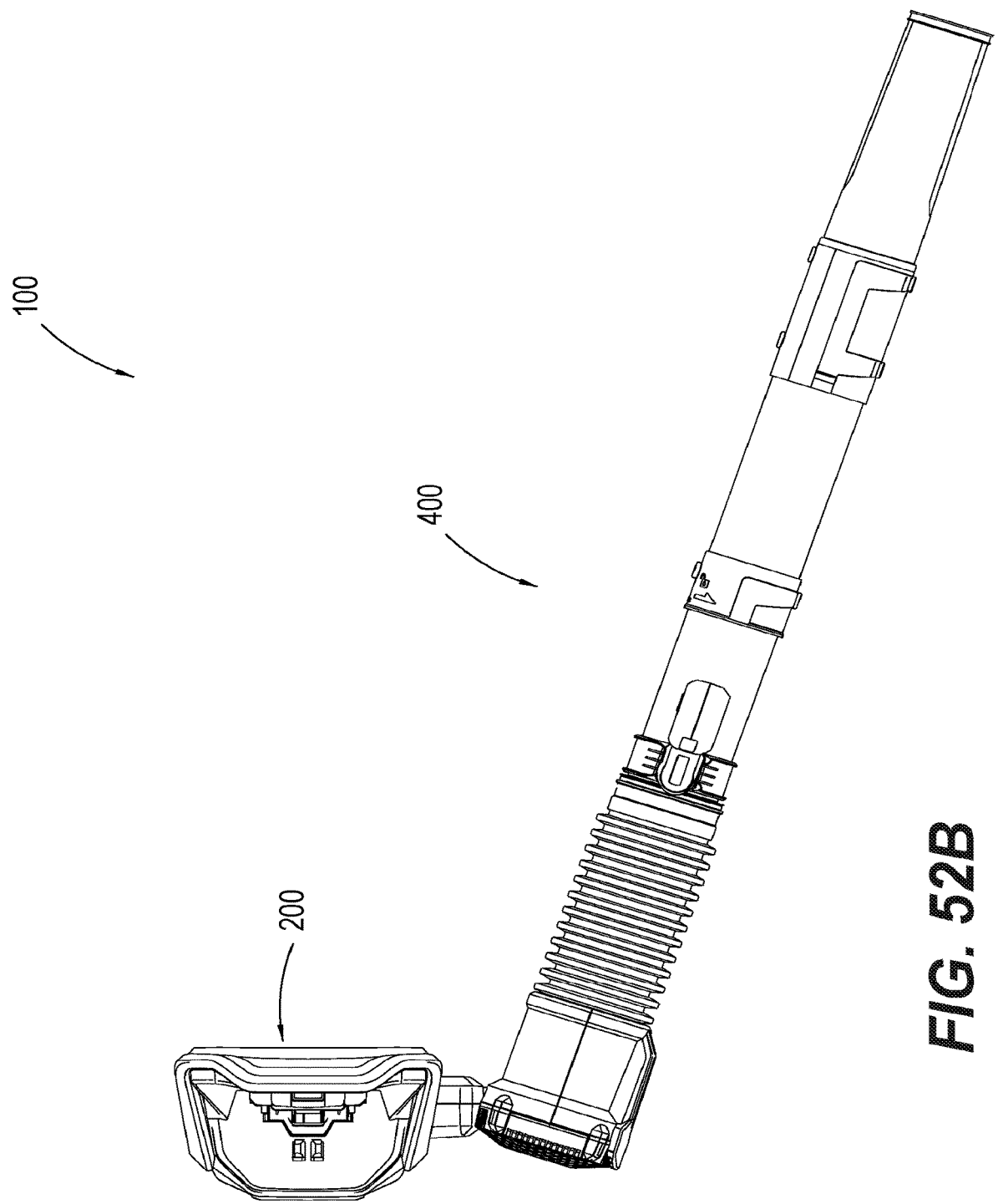
FIG. 52B illustrates a top view of an exemplary power tool of the back-mounted power tool system of FIG. 50.

The rotational connection between arm 340 and backpack apparatus 200 allows power tool 400 to be rotated around or about a first axis "X." The rotational connection between power tool connector 320 and power tool 400 allows power tool 400 to be rotated around or about a second axis "Y." For example, FIGS. 52A and 52B illustrate that the orientation of the longitudinal axis of power tool 400 may be adjusted by rotating power tool 400 around or about axis X or Y. FIG. 52A illustrates a side view of system 100. As shown in FIG. 52A, power tool 400 may be directed downward or upward to allow the user to position power tool 400 at a suitable operational angle relative to a horizontal plane, e.g., the ground. FIG. 52B illustrates a top view of system 100. As shown in FIG. 52B, power tool 400 may be directed rightward or leftward to allow the user to position power tool 400 at a suitable operational angle relative to the body of the user, for example. These rotational connections may allow power tool 400 to be oriented over a spherical space. Alternatively, these rotational connections may be designed to rotate power tool 400 within predetermined ranges to improve the safety of the user during operation and/or flexibility for controlling power tool 400.

Figure 53:
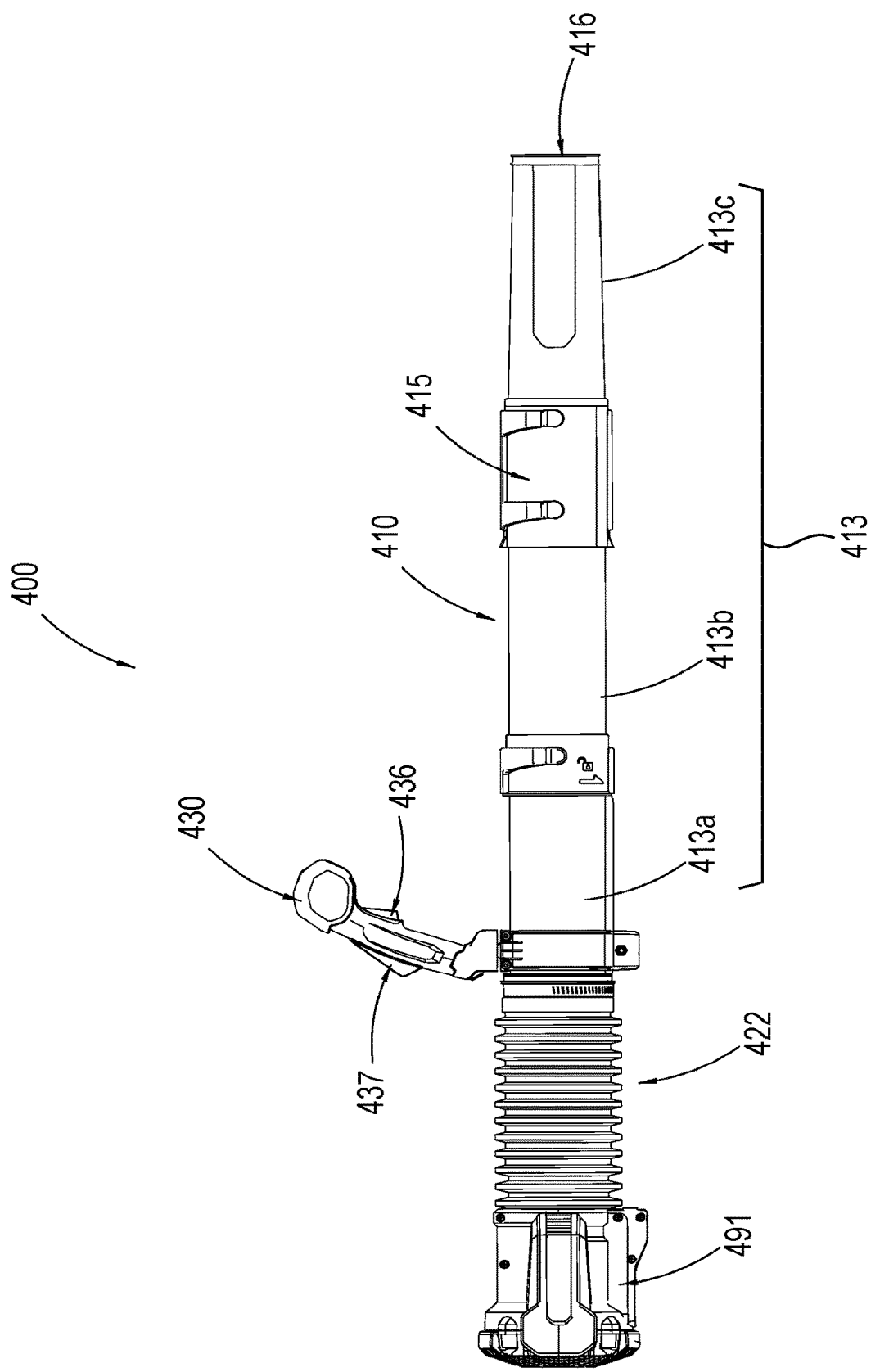
FIG. 53 illustrates an exemplary power tool of the exemplary back-mounted power tool system of FIG. 50.
Figure 54:
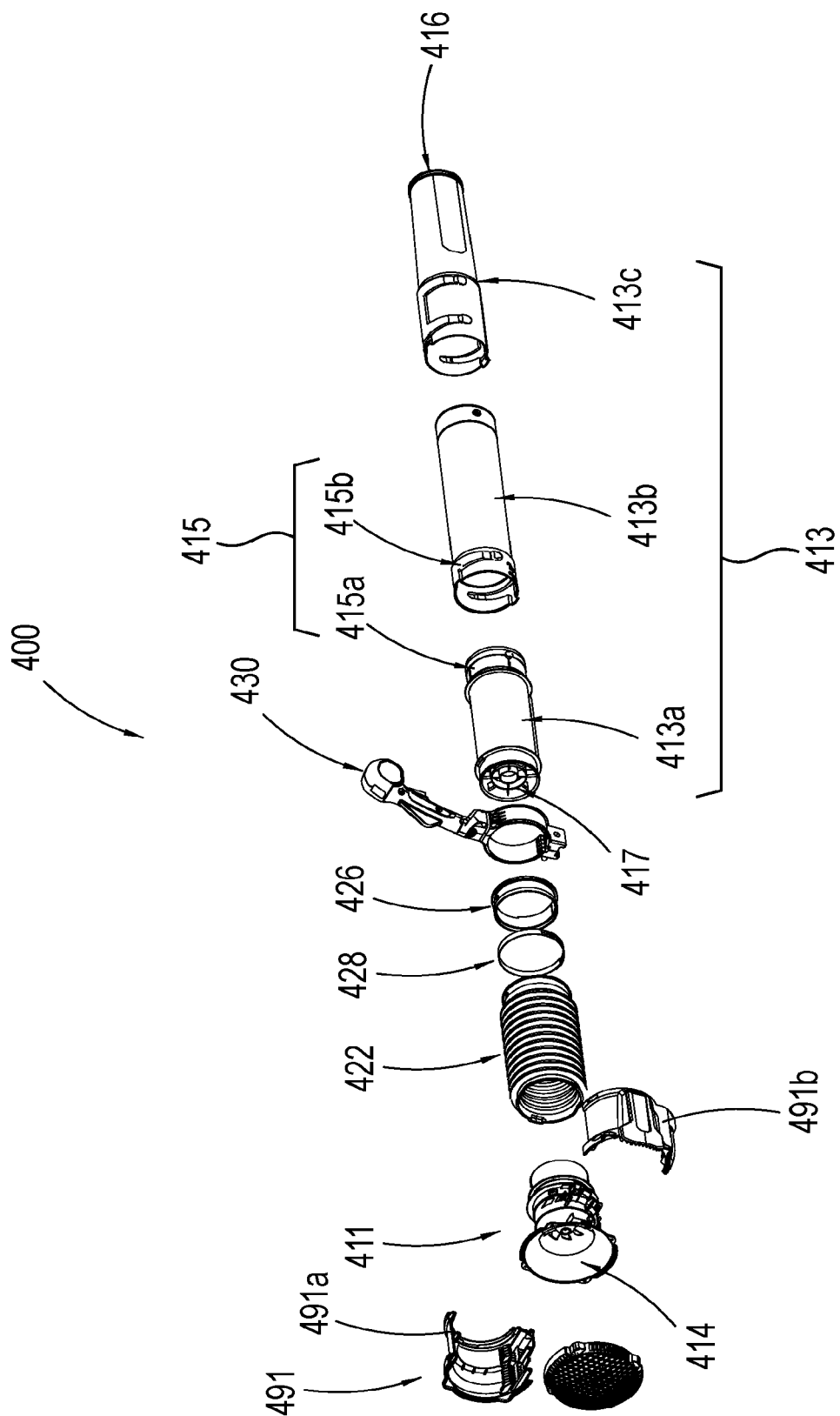
FIG. 54 illustrates an exploded perspective view of the exemplary power tool of FIG. 53.
Figure 55:
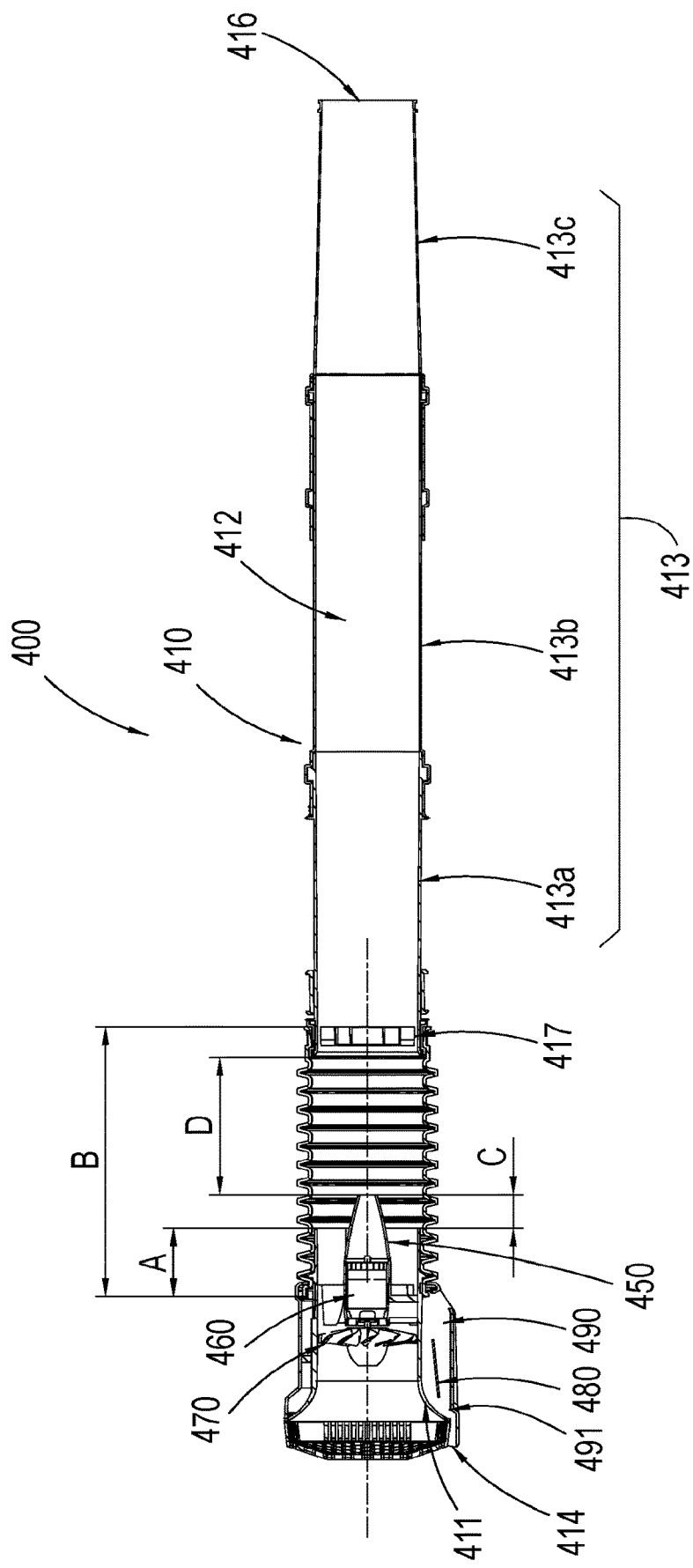
FIG. 55 illustrates a cross-section of the exemplary power tool of FIG. 53.

FIG. 53 illustrates an exemplary embodiment of power tool 400. FIG. 54 illustrates an exploded perspective view of power tool 400 of FIG. 53. FIG. 55 illustrates a cross-section of the power tool of FIG. 53. As shown in FIGS. 53-55, in some embodiments, pipe 410 of power tool 400 may include a plurality of parts. Pipe 410 may include an inlet pipe 411, an outlet pipe 413, and a compliant pipe 422 connecting inlet pipe 411 and outlet pipe 413. As described above, when power tool 400 is a blower, the air flow moves from inlet 414 of inlet pipe 411 to outlet 416 of outlet pipe 413. Airway 412 inside inlet pipe 411 may become narrower from inlet 414 along the length of inlet pipe 411. Pipe 410 may further include a protective housing 491 that may removably cover the external surface of inlet pipe 411. For example, protective housing 491 may include two half members 491*a* and 491*b* that may be clamped together via any suitable mechanical means, such as friction fit, press fit, twist fit, snap fit, etc. Protective housing 491 may create ventilated chamber 490 that is formed between the external surface of inlet pipe 411 and interior surface of protective housing 491. As described above, circuit board 480 may be installed in chamber 490 which may allow cooling of circuit board 480 when power tool 400 operates.

Compliant tube 422 may be removably or fixedly connected to inlet pipe 411. For example, at least a part of inlet pipe 411 may frictionally fit into compliant tube 422 via a suitable mechanical means, e.g., friction fit, press fit, twist fit, snap fit, overmolding or molding, thermal bonding, adhesive bonding, and/or welding. Protective housing 491 and/or two half members 491*a* and 491*b* may then clamp, tighten, and/or lock compliant pipe 422 onto inlet pipe 411. As shown in FIG. 55, in some embodiments, compliant pipe 422 may at least partially overlap with inlet pipe 411 and outlet pipe 413. For example, one end of compliant tube 422 may be at least partially concentrically enclosing inlet pipe 411, and the other end of compliant tube 422 may be at least partially concentrically enclosing outlet pipe 413.

Figure 56:
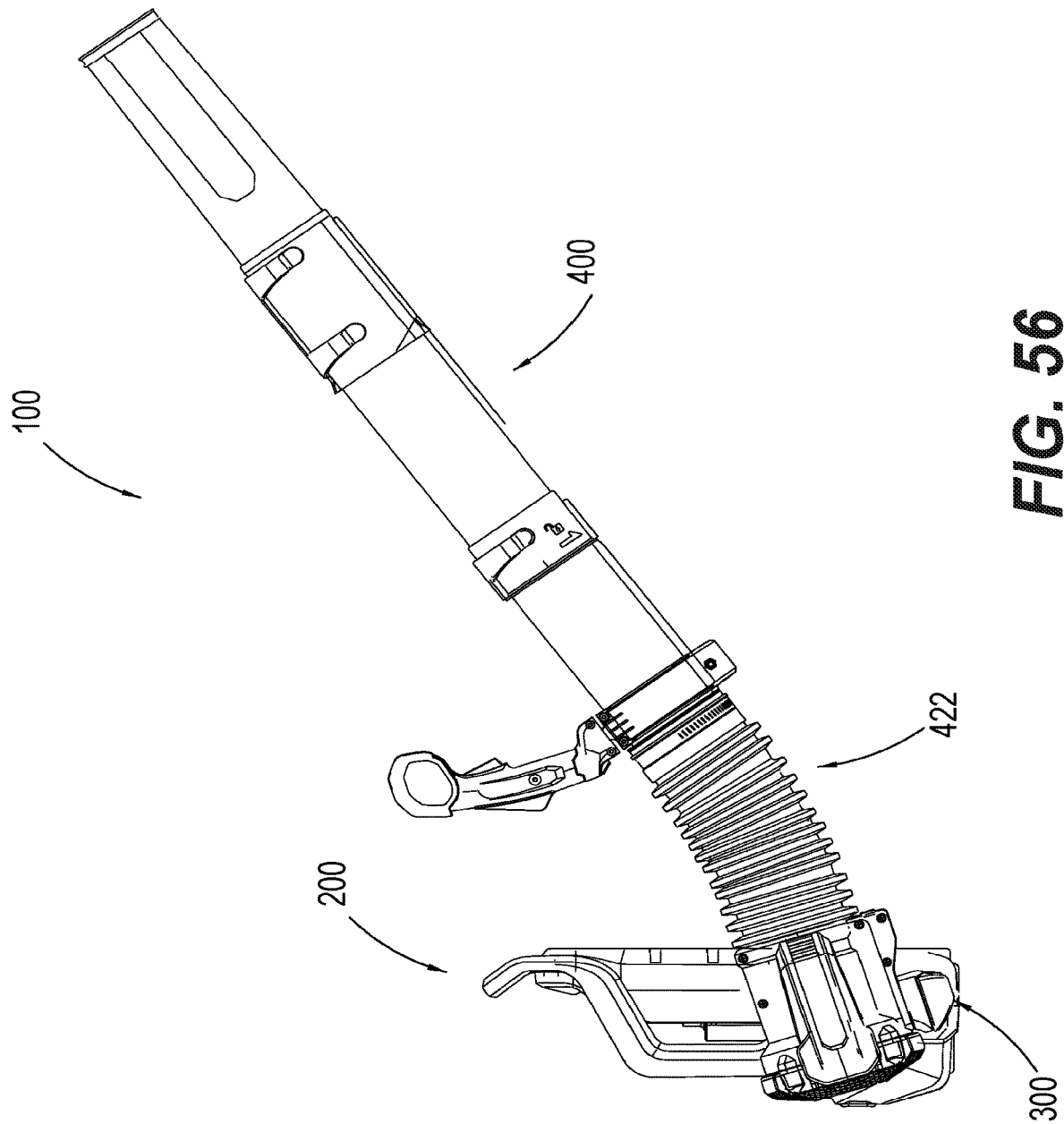
FIG. 56 illustrates a side view of an exemplary power tool of the back-mounted power tool system of FIG. 50.

Compliant pipe 422 is flexible, bendable, and/or extendable. Compliant pipe 422 may be moved around, e.g., from side to side in any direction, or upward or downward to allow the user to position power tool 400 at a suitable operational angle or toward a suitable direction. FIG. 56 illustrates a side view of system 100 including power tool 400 of FIG. 53. As shown in FIG. 56, power tool 400 may be oriented upward by rotating power tool 400 around or about power tool connector 320 and/or by extending and bending compliant pipe 422. Compliant pipe 422 may be bent and/or extended in any suitable direction as needed to facilitate and/or increase the convenience for the user's operation of power tool 400.

As described above and shown in FIG. 55, power tool 400 includes motor housing 450 having motor 460 installed therein. Motor 460 is connected to air-generating device 470 via a motor shaft. Motor housing 450 and air-generating device 470 may be located at any suitable position in airway 412 inside pipe 410, such as an suitable position in inlet pipe 411, compliant pipe 422, and/or outlet pipe 413. For example, as shown in FIG. 55, air-generating device 470 is located in inlet pipe 411 and motor housing 450 is at least partially located in inlet pipe 411 and partially extended into compliant pipe 422. The extension of motor housing 450 into compliant pipe 422 is determined such that the portion of motor housing 450 inside compliant pipe 422 may not substantially affect the bendability and/or flexibility of compliant pipe 422.

For example, as described herein and shown in FIG. 55, the natural length of compliant tube 422 (without any force applied) is referred to as length B. The amount of overlap between compliant tube 422 and inlet pipe 411 is referred to as length A. The length of motor housing 450 extended into compliant tube 422 is referred to as length C. The length of the part of compliant tube 422 that remain substantially flexible, i.e., not overlapping with inlet pipe 411, motor housing 450, and outlet pipe 413, is referred to as length D. In some embodiments, length A may range from about 20% to about 50% of length B. In some embodiments, length C may range from about 10% to 30% of length D.

In some embodiments, outlet pipe 413 may be extendible by including one or more extension pipes. The extension pipes may themselves be extendible or have extendible connections between them. For example, as shown in FIGS. 53-55, outlet pipe 413 includes three extension pipes 413*a*, 413*b*, and 413*c*. Outlet pipe 413 may be extended by adjusting extendible connections 415 between extension pipes 413*a* and 413*b* and between extension pipes 413*b* and 413*c*. Each extendible connection 415 may include a first fitting part 415a and a second fitting part 415b that are installed on or part of an extension pipe. The relative movement between fitting parts 415a and 415b may allow adjustment of the length of outlet pipe 413 by adjusting the amount of overlap between the extension pipes.

For example, fitting part 415a may be at one end of extension pipe 413a and fitting part 415b may be at one end of extension pipe 413b. Extension pipe 413a may partially and rotatably fit into extension pipe 413b by fitting part 415a into part 415b via a suitable mechanical means, e.g., friction fit, press fit, twist fit, snap fit, etc. Fitting part 415a may include a protrusion that may extend beyond the external surface of extension pipe 413a and that may fit into a channel spiraled around fitting part 415b. Rotating extension pipe 413b around extension pipe 413a or vice versa may allow the protrusion of fitting part 415a to move along the channel of fitting part 415b such that the overlap between fitting part 415a and 415b may be increased or decreased, depending on the direction of the rotation, e.g., clockwise or counterclockwise. Changing the overlap between fitting parts 415a and 415b and/or between extension pipes 413a and 413b may then change the length of outlet pipe 413. As described herein, extendible connection 415 between extension pipes 413b and 413c may use the same mechanical structure and mechanism as described above for adjusting the length of outlet pipe 413.

Outlet pipe 413 may rotatably connect to compliant pipe 422. For example, as shown in FIG. 54, a ring structure 426 may rotatably and/or frictionally fit onto one end of extension pipe 413a of outlet pipe 413. Extension pipe 413a together with ring structure 426 may then partially fit into compliant pipe 422. A tightening ring 428 may then tighten and/or clamp compliant tube 422 around ring structure 426 and thus extension pipe 413a. This allows the compliant tube 422 to rotate with ring structure 426 relative to extension pipe 413a. In some embodiments, extension pipe 413a may include a strengthening structure 417 inside that at least partially supports the interior surface of extension pipe 413a that is clamped and/or tightened by ring structure 426 and/or tightening ring 428.

In some embodiments, ring structure 426 may include one or more protrusions or recesses on its interior surface that are complimentary to one or more recesses or protrusions on the exterior surface of the end of extension pipe 413a. The complimentary protrusions and recesses allow the rotation between ring structure 426 and extension pipe 413a to stop at interval places where the protrusions fit into the recesses and to have certain amount of resistance. Such stoppable design of the rotatable connection between ring structure 426 and extension pipe 413a reduces the risk of using power tool 400 that may result from over flexible rotation between outlet pipe 413 and compliant tube 422, such as by losing control of the direction of power tool 400.

Figure 57:
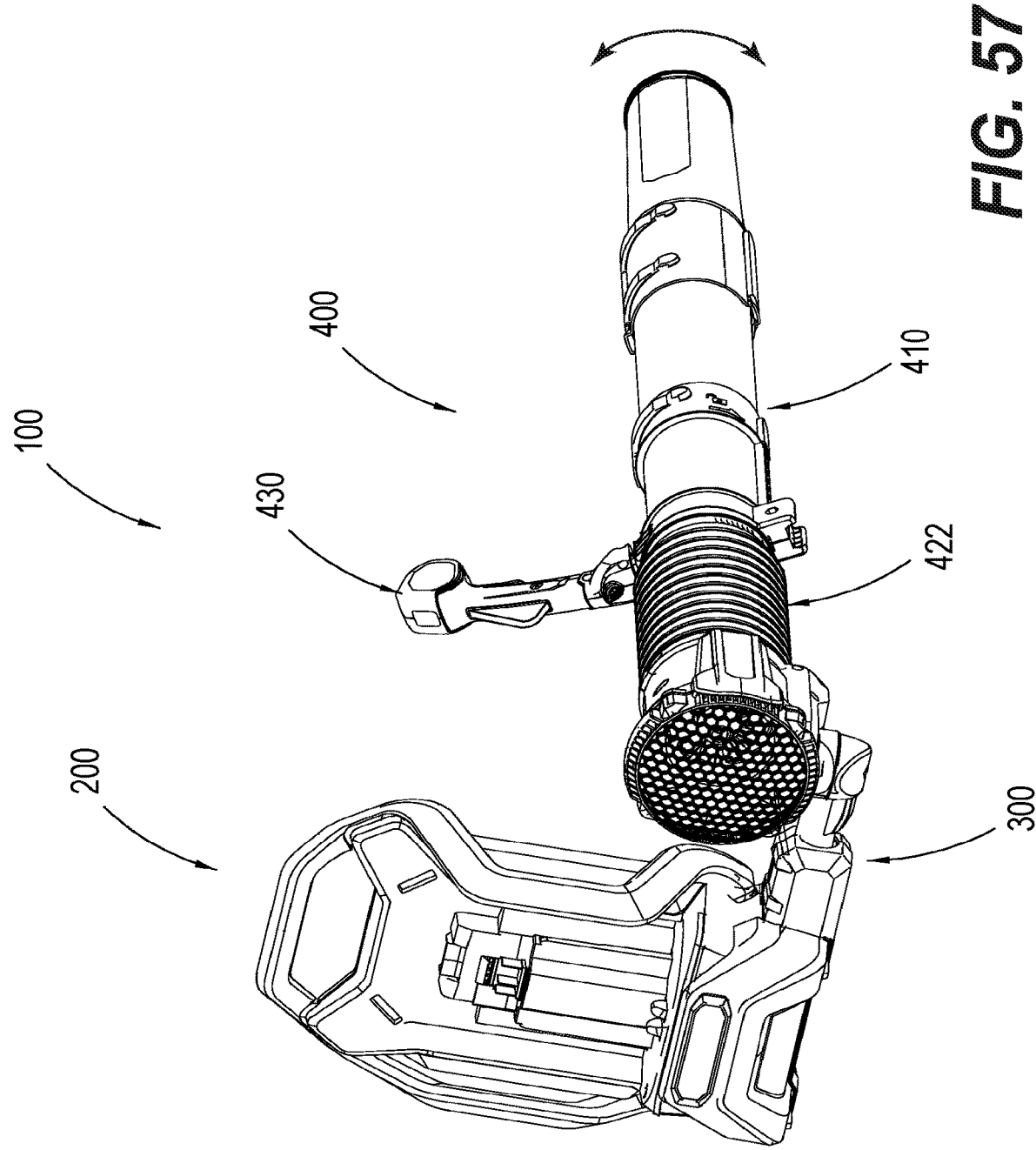
FIG. 57 illustrates a perspective view of an exemplary back-mounted power tool system, according to embodiments of the present disclosure.

As described above, power tool 400 may include handle 430 for carrying, steering, cruising, and/or controlling power tool 400. In some embodiments, as shown in FIGS. 53 and 54, handle 430 may be rotatably installed on pipe 410, e.g., via a clamp structure, for example. The rotatability of handle 430 around or about pipe 410 may increase the flexibility for operating power tool 400. For example, as shown in FIG. 57, handle 430 may be rotated clockwise or counterclockwise around or about the longitudinal axis of pipe 410 to allow the user to adjust their postures and/or their arms while operating power tool 400 so as to increase the convenience and flexibility of using power tool 400. Additionally or alternatively, handle 430 may be movable along the longitudinal axis of pipe 410 such that handle 430 may be moved to a position suitable for the length of the user's arm. Such movable design of handle 430 may increase the ease and convenience for operating power tool 400.

In some embodiments, as shown in FIG. 53, handle 430 may include an operational switch 436 and a safety switch 437 that may be operated by one hand of the user. Operational switch 436 and safety switch 437 may be located at different sides of handle 430, and may be operated by different fingers of the user's hand. Operational switch 436 may allow the user to switch on and/off of power tool 400. To increase the safety for operating power tool 400, in some situations, when safety switch 437 is switched on, power tool 400 cannot be switched on by operational switch 436. In some embodiments, handle 430 may include a power switch (not shown) that when switched on, allows power tool 400 to operate at maximum power, e.g., driving motor 460 at its maximum power.

The many features and advantages of the present disclosure are apparent from the detailed specification, and thus, it is intended by the appended claims to cover all such features and advantages of the present disclosure that fall within the true spirit and scope of the present disclosure. Further, since numerous modifications and variations will readily occur to those skilled in the art, it is not desired to limit the present disclosure to the exact construction and operation illustrated and described, and accordingly, all suitable modifications and equivalents may be resorted to, falling within the scope of the present disclosure.

Moreover, those skilled in the art will appreciate that the conception upon which this disclosure is based may readily be used as a basis for designing other structures, methods, and systems for carrying out the several purposes of the present disclosure. Accordingly, the claims are not to be considered as limited by the foregoing description.

What is claimed is:

1. A back-mounted power tool system, comprising:
   a power tool;
   a battery package that can be used on other power tool systems;
   a backpack apparatus, comprising a backpack surface to mount the backpack apparatus onto a user's body and at least one open slot configured to receive the battery package, the open slot comprising a first connector to couple the battery package to the backpack apparatus; and
   a connecting member to transfer a weight of the power tool and/or a force received from the power tool to the backpack apparatus by rotatably coupling the power tool to the backpack apparatus,
   wherein the connecting member enables the power tool to rotate about a first rotation axis and/or a second rotation axis.

2. The back-mounted power tool system of claim 1, wherein the battery package further comprises one or more battery cells, a case enclosing the battery cells, and an electrical terminal.

3. The back-mounted power tool system of claim 2, wherein the case further comprises fitting structures to couple the battery package to the first connector, the fitting structures comprising one or more fitting slots complementary to one or more fitting members of the first connector.

4. The back-mounted power tool system of claim 1, wherein the power tool is a blower or a blower vacuum, and further comprises:
   a propeller, which can be driven by a motor to generate an air flow;
   an airway providing a passage for the air flow;

an electronic board;
a power inlet; and
a user control.

5. The back-mounted power tool system of claim 4, wherein the power tool further comprises a board chamber that comprises an air inlet and an air outlet, wherein the electronic board is installed in the board chamber.

6. The back-mounted power tool system of claim 4, further comprising:
a motor;
a motor chamber having an air inlet and an air outlet; and
a fan connected to the motor,
wherein the motor and the fan are installed inside the motor chamber.

7. The back-mounted power tool system of claim 6, wherein the propeller and the fan are located on two opposite sides of the motor, and when driven by motor, generate air flows having two opposite directions.

8. The back-mounted power tool system of claim 4, wherein the user control is a handle to adjust movement of the power tool and is located adjacent to a center of gravity of the power tool.

9. The back-mounted power tool system of claim 8, wherein the handle comprises electronic circuits and/or components that control the motor's operation.

10. The back-mounted power tool system of claim 8, wherein the handle comprises one or more cushions at its bottom to damp an interaction between the power tool and the handle.

11. The back-mounted power tool system of claim 1, wherein the backpack apparatus further comprises a base member, the base member including an ejecting apparatus to eject the battery package.

12. The back-mounted power tool system of claim 11, wherein:
the base member further comprises a second connector; and
the connecting member further comprises a fitting member to couple an arm of the connecting member to the backpack apparatus, the fitting member having a first fitting element interlocked with the second connector and a second fitting element rotatably coupled to the arm of the connecting member.

13. The back-mounted power tool system of claim 1, wherein the connecting member further comprises a power tool connector and an arm, the power tool connector connecting the arm to the power tool and comprising a clamp that clamps to the body of the power tool.

14. The back-mounted power tool system of claim 13, wherein the connecting member further comprises a spring between the arm and the power tool connector to damp force between the power tool and the connecting member.

15. The back-mounted power tool system of claim 1, further comprising a power cord that electrically connects the battery package to the power tool, wherein the power cord passes through an inside of the connecting member.

16. The back-mounted power tool system of claim 1, wherein the power tool further comprises a battery connector configured to couple to the battery package when it is removed from the backpack apparatus.

17. The back-mounted power tool system of claim 1, wherein the power tool is selected from a blower, a vacuum, a blower vacuum, a mulcher, a trimmer, a chainsaw, a grass cutter, a brush cutter, a tying machine, a drill, a lawn mower, a circular saw, an angle grinder, a sander, and reciprocating saws.

18. The back-mounted power tool system of claim 1, wherein the weight of battery package ranges from 30% to 150% of the weight of the power tool.

19. The back-mounted power tool system of claim 1, further comprising a second power tool.

20. A power tool system, comprising:
a first power tool;
a second power tool;
one or more battery packages capable of providing power to the first power tool and/or second power tool;
a backpack apparatus, comprising a backpack surface to mount the backpack apparatus onto a user's body and having a plurality of open slots, including a first open slot and a second open slot, each of the first and second open slots being configured to receive a battery package and comprising a connector to couple the battery package to the backpack apparatus; and
a connecting member to transfer a weight of the second power tool and/or a force received from the second power tool to the backpack apparatus by rotatably coupling the second power tool to the backpack apparatus,
wherein the connecting member enables the second power tool to rotate about a first rotation axis and/or a second rotation axis.

21. The power tool system of claim 20, wherein the first power tool further comprises a battery connector, and a battery package can be removed from the backpack apparatus and coupled to the battery connector of the first power tool.

22. The power tool system of claim 20, wherein the first power tool or the second power tool is selected from a blower, a vacuum, a blower vacuum, a mulcher, a trimmer, a chainsaw, a grass cutter, a brush cutter, a tying machine, a drill, a lawn mower, a circular saw, an angle grinder, a sander, and reciprocating saws.

23. A back-mounted power tool system, comprising:
a power tool;
a second power tool;
one or more battery packages capable of providing power to other power tools,
a backpack apparatus, comprising a backpack surface to mount the backpack apparatus onto a user's body and having a plurality of open slots, including a first open slot and a second open slot, each of the first and second open slots configured to removably receive a battery package and having a connector to couple the battery package to the backpack apparatus; and
a connecting member to transfer a weight of the power tool and/or a force received from the power tool to the backpack apparatus by rotatably coupling the power tool to the backpack apparatus,
wherein the connecting member comprises a first arm coupled to the power tool and a second arm coupled to the backpack apparatus.

24. The back-mounted power tool system of claim 23, wherein the first arm is configured to be rotatably joined with the second arm, the first arm operates to rotate about a first rotation axis passing through a joint of the first arm and the second arm, and the second arm operates to rotate about a second rotation axis extending through the second arm and perpendicular to the first rotation axis.

25. The back-mounted power tool system of claim 23, wherein the first power tool further comprises a battery connector configured to couple to a battery package when it is removed from the backpack apparatus.

26. The back-mounted power tool system of claim 23, wherein the first power tool or the second power tool is selected from a blower, a vacuum, a blower vacuum, a mulcher, a trimmer, a chainsaw, a grass cutter, a brush cutter, a tying machine, a drill, a lawn mower, a circular saw, an angle grinder, a sander, and reciprocating saws.

27. A backpack apparatus for a back-mounted power tool system, wherein the back-mounted power tool system comprises one or more power tools, and the backpack apparatus comprises:
- a backpack surface to mount the backpack apparatus onto a user's body;
- a battery package capable of being a power supply of other power tools, wherein the weight of the battery package ranges from 30% to 150% of the weight of a power tool; and
- a plurality of open slots including a first open slot and a second open slot, each of the first and second open slots configured to receive the battery package and having a connector to couple the battery package to the backpack apparatus.

28. A backpack apparatus for a back-mounted power tool system, wherein the back-mounted power tool system comprises one or more power tools, and the backpack apparatus comprises:
- a backpack surface to mount the backpack apparatus onto a user's body;
- at least one battery package capable of being used as a power supply of other power tools, wherein the weight of the at least one battery package ranges from 30% to 150% of the weight of a power tool; and
- a plurality of connectors including a first connector and a second connector, each of the first and second connectors configured to couple a battery package to the backpack apparatus.

29. A backpack apparatus for a back-mounted power tool system, wherein the back-mounted power tool system comprises one or more power tools, and the backpack apparatus comprises:
- a backpack surface to mount the backpack apparatus onto a user's body; and
- a battery interface configured to removably receive a plurality of battery packs including a first battery pack and a second battery pack, each of the first and second battery packs capable of being used as a power source of a handheld electric power tool,
- wherein the weight of the first battery pack or the weight of the second battery pack ranges from 30% to 150% of the weight of a power tool.

* * * * *

UNITED STATES PATENT AND TRADEMARK OFFICE
CERTIFICATE OF CORRECTION

Page 1 of 1

PATENT NO. : 10,736,403 B2
APPLICATION NO. : 15/935572
DATED : August 11, 2020
INVENTOR(S) : Toshinari Yamaoka et al.

It is certified that error appears in the above-identified patent and that said Letters Patent is hereby corrected as shown below:

On the Title Page

Item (30), under "Foreign Application Priority Data,":
"May 25, 2015 [CN]    2015 1 0272506
May 25, 2015 [CN]    2015 1 0272609
May 29, 2015 [CN]    2015 1 0287347
Sep 25, 2015 [CN]    2015 1 0621441
Sep 25, 2015 [CN]    2015 1 0623933
Sep 25, 2015 [CN]    2015 1 0624884
Feb 1, 2016 [CN]     2016 1 0070425"

Should read as:
--May 25, 2015 [CN]   201510272506.2
May 25, 2015 [CN]    201510272609.9
May 29, 2015 [CN]    201510287347.3
Sep 25, 2015 [CN]    201510621441.8
Sep 25, 2015 [CN]    201510623933.0
Sep 25, 2015 [CN]    201510624884.2
Feb 1, 2016 [CN]     201610070425.9--.

Signed and Sealed this
Sixteenth Day of March, 2021

Drew Hirshfeld
*Performing the Functions and Duties of the
Under Secretary of Commerce for Intellectual Property and
Director of the United States Patent and Trademark Office*